US012570901B2

(12) United States Patent
Shiraiwa et al.

(10) Patent No.: US 12,570,901 B2
(45) Date of Patent: Mar. 10, 2026

(54) CURED PRODUCT, CURABLE RESIN COMPOSITION, OPTICAL MEMBER, LENS, DIFFRACTIVE OPTICAL ELEMENT, MULTILAYER DIFFRACTIVE OPTICAL ELEMENT, AND COMPOUND

(71) Applicant: FUJIFILM Corporation, Tokyo (JP)

(72) Inventors: Naozumi Shiraiwa, Ashigarakami-gun (JP); Naoyuki Morooka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 633 days.

(21) Appl. No.: 17/881,333

(22) Filed: Aug. 4, 2022

(65) Prior Publication Data

US 2022/0403245 A1 Dec. 22, 2022

Related U.S. Application Data

(63) Continuation of application No. PCT/JP2021/007485, filed on Feb. 26, 2021.

(30) Foreign Application Priority Data

Feb. 28, 2020 (JP) ................................ 2020-034244

(51) Int. Cl.

| | |
|---|---|
| ***C09K 19/38*** | (2006.01) |
| ***C08F 222/24*** | (2006.01) |
| ***G02B 1/04*** | (2006.01) |
| ***G02B 5/18*** | (2006.01) |
| *C09K 19/04* | (2006.01) |

(52) U.S. Cl.

CPC ........ *C09K 19/3861* (2013.01); *C08F 222/24* (2013.01); *G02B 1/041* (2013.01); *G02B 5/1814* (2013.01); *G02B 5/1833* (2013.01); *C08F 2800/20* (2013.01); *C09K 2019/0448* (2013.01)

(58) Field of Classification Search

None

See application file for complete search history.

(56) References Cited

U.S. PATENT DOCUMENTS

| | | | | |
|---|---|---|---|---|
| 10,479,844 | B2 * | 11/2019 | Endo | C08F 2/44 |
| 11,078,180 | B2 * | 8/2021 | Morooka | G02B 1/041 |
| 11,396,613 | B2 * | 7/2022 | Shiraiwa | C07D 241/42 |
| 11,518,916 | B2 * | 12/2022 | Nakayama | C08F 222/1025 |
| 11,522,165 | B2 * | 12/2022 | Kashiwagi | H05B 33/02 |
| 11,697,695 | B2 * | 7/2023 | Endo | C08F 2/50<br>252/299.61 |
| 11,702,595 | B2 * | 7/2023 | Chappellet | C09K 19/04<br>252/299.01 |
| 11,971,566 | B2 * | 4/2024 | Kasai | B32B 7/023 |
| 12,110,439 | B2 * | 10/2024 | Kasai | C09K 19/582 |
| 2015/0148442 | A1 | 5/2015 | Yofu | |
| 2018/0362558 | A1 | 12/2018 | Yokoi et al. | |
| 2018/0362847 | A1 | 12/2018 | Saito et al. | |
| 2020/0199095 | A1 | 6/2020 | Morooka et al. | |
| 2021/0395418 | A1 | 12/2021 | Shiraiwa et al. | |

FOREIGN PATENT DOCUMENTS

| | | | |
|---|---|---|---|
| CN | 104540902 | A | 4/2015 |
| CN | 108699173 | A | 10/2018 |
| JP | 2012-77057 | A | 4/2012 |
| WO | 2017/098988 | A1 | 6/2017 |
| WO | 2019/044863 | A1 | 3/2019 |
| WO | 2020/171197 | A1 | 8/2020 |

OTHER PUBLICATIONS

International Search Report dated Apr. 27, 2021, issued in International Application No. PCT/JP2021/007485.

Written Opinion dated Apr. 27, 2021, issued in International Application No. PCT/JP2021/007485.

International Preliminary Report on Patentability dated Mar. 29, 2022, issued in International Application No. PCT/JP2021/007485.

Notice of Reasons for Refusal dated Jan. 24, 2023 from the Japanese Patent Office in corresponding Japanese Application No. 2022-503766.

Chinese Office Action dated Dec. 7, 2023 in corresponding Application No. 202180011224.0.

* cited by examiner

*Primary Examiner* — Sanza L. McClendon

(74) *Attorney, Agent, or Firm* — Sughrue Mion, PLLC

(57) ABSTRACT

Provided are a cured product of a curable composition including a compound represented by General Formula (1), in which a birefringence Δn at a wavelength of 587 nm is $0.00 \leq \Delta n \leq 0.01$; an optical member; a lens; a compound represented by General Formula (1); a curable resin composition containing the compound; a cured product; a diffractive optical element; and a multilayer diffractive optical element.

$$Pol^1\text{-}Sp^a\text{-}L^1\text{-}Ar\text{-}L^2\text{-}Sp^b\text{-}Pol^2 \quad \text{Genera Formula (1)}$$

Ar represents an aromatic ring group represented by a specific formula, $L^1$ and $L^2$ represent —O—, $Sp^a$ and $Sp^b$ represent a linking group having the shortest atom number of 11 or more and linking Pol and L, $Pol^1$ and $Pol^2$ represent a polymerizable group, and in $Sp^a$ and $Sp^b$, a linking portion to $L^1$ or $L^2$ is $—CH_2—$ and a linking portion to $Pol^1$ or $Pol^2$ is a carbon atom.

5 Claims, 1 Drawing Sheet

CURED PRODUCT, CURABLE RESIN COMPOSITION, OPTICAL MEMBER, LENS, DIFFRACTIVE OPTICAL ELEMENT, MULTILAYER DIFFRACTIVE OPTICAL ELEMENT, AND COMPOUND

CROSS-REFERENCE TO RELATED APPLICATIONS

This application is a Continuation of PCT International Application No. PCT/JP2021/007485 filed on Feb. 26, 2021, which claims priority under 35 U.S.C. § 119 (a) to Japanese Patent Application No. 2020-034244 filed in Japan on Feb. 28, 2020. Each of the above applications is hereby expressly incorporated by reference, in its entirety, into the present application.

BACKGROUND OF THE INVENTION

1. Field of the Invention

The present invention relates to a cured product, a curable resin composition, an optical member, a lens, a diffractive optical element, a multilayer diffractive optical element, and a compound.

2. Description of the Related Art

In the related art, glass materials have been used for an optical member of an imaging module such as a camera, a video camera, a mobile phone with a camera, a video phone, or a door phone with a camera. The glass material has optical characteristics suitable for the optical member of the imaging module, can impart desired optical characteristics, and has excellent environmental resistance.

However, it is not easy to reduce a weight and size of the glass material, and a workability and productivity are also deteriorated. On the other hand, since a resin cured product can be mass-produced and has excellent workability, with the miniaturization of the imaging module in the related art, the resin cured product has been used as an optical member to replace the glass material.

With the miniaturization of the imaging module, the optical member thereof is also required to be miniaturized. However, as the optical member is smaller, the problem of chromatic aberration arises. Accordingly, in an optical member formed of the resin cured product, examinations have been conducted regarding adjusting an Abbe number using a monomer of a curable composition and additives, thereby correcting chromatic aberrations.

For example, WO2019/044863A discloses that, by using a curable composition containing a compound (monomer) having an aromatic ring group such as benzodithiol and benzodithiazole, a cured product having a low Abbe number (νD) and a high partial dispersion ratio (θg, F value) is obtained.

SUMMARY OF THE INVENTION

Since the optical member of the imaging module is used in a light irradiation environment such as outdoors, high light resistance is required. However, as a result of studies by the present inventors, it has been found that the cured product disclosed in WO2019/044863A does have sufficient light resistance, and it needs further improvement.

An object of the present invention is to provide a cured product which has an aromatic ring group having absorption in a near-ultraviolet region, such as benzodithiol and benzodithiazole, and has excellent light resistance, and an optical member or a lens including this cured product.

Another object of the present invention is to provide a compound suitable for obtaining the cured product.

Another object of the present invention is to provide a curable resin composition suitable for obtaining the cured product, a cured product obtained from the curable resin composition, and a diffractive optical element and a multilayer diffractive optical element including this cured product.

As a result of intensive studies to solve the above-described problems, the present inventors have found that, in a compound (monomer) having an aromatic ring group such as benzodithiol and benzodithiazole, by setting a chain connecting the aromatic ring group and a polymerizable group to a certain length or longer, a light resistance of the obtained cured product can be sufficiently enhanced.

That is, the above-described objects of the present invention have been achieved by the following methods.

<1>

A cured product of a curable composition including a compound represented by General Formula (1), in which a birefringence $\Delta n$ at a wavelength of 587 nm is $0.00 \le \Delta n \le 0.01$, $$Pol^1\text{-}Sp^a\text{-}L^1\text{-}Ar\text{-}L^2\text{-}Sp^b\text{-}Pol^2 \qquad \text{Genera Formula(I)}$$

in the formula, Ar represents an aromatic ring group represented by any of General Formula (2-1), . . . , or (2-4), $L^1$ and $L^2$ represent —O—, $Sp^a$ represents a linking group having a shortest atom number of 11 or more and linking $Pol^1$ and $L^1$, and $Sp^b$ represents a linking group having a shortest atom number of 11 or more and linking $Pol^2$ and $L^2$, $Pol^1$ and $Pol^2$ represent a polymerizable group, and a linking portion of $Sp^a$ to $L^1$ and a linking portion of $Sp^b$ to $L^2$ are both —$CH_2$—, and a linking portion of $Sp^a$ to $Pol^1$ and a linking portion of $Sp^b$ to $Pol^2$ are both a carbon atom, General Formula (2-1)

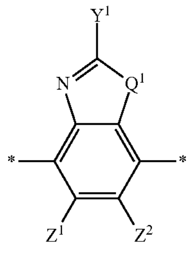

General Formula (2-2)

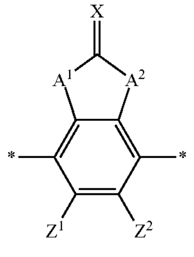

-continued

General Formula (2-3)

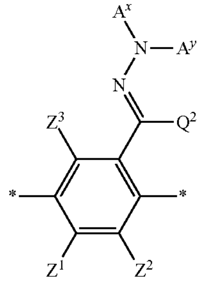

General Formula (2-4)

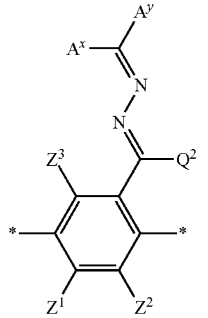

in the formula, $Q^1$ represents —S—, —O—, or >$NR^{11}$, and $R^{11}$ represents a hydrogen atom or an alkyl group having 1 to 6 carbon atoms, $Y^1$ represents an alkyl group having 1 to 6 carbon atoms, an aromatic hydrocarbon group having 6 to 12 carbon atoms, or an aromatic heterocyclic group having 3 to 12 carbon atoms, $Z^1$, $Z^2$, and $Z^3$ represent a hydrogen atom, an aliphatic hydrocarbon group having 1 to 20 carbon atoms, an alkoxy group having 1 to 20 carbon atoms, an alicyclic hydrocarbon group having 3 to 20 carbon atoms, an aromatic hydrocarbon group having 6 to 20 carbon atoms, a halogen atom, a cyano group, a nitro group, —$NR^{12}R^{13}$, or —$SR^{12}$, $Z^1$ and $Z^2$ may be bonded to each other to form an aromatic hydrocarbon ring or an aromatic heterocyclic ring, $R^{12}$ and $R^{13}$ represent a hydrogen atom or an alkyl group having 1 to 6 carbon atoms, $A^1$ and $A^2$ represent a group selected from —O—, >$NR^{21}$, —S—, and >C(═O), and $R^{21}$ represents a hydrogen atom or a substituent, X represents ═O, ═S, a carbon atom to which a hydrogen atom or a substituent is bonded, or a nitrogen atom to which a hydrogen atom or a substituent is bonded, $A^x$ represents an organic group having 1 to 30 carbon atoms, which has at least one aromatic ring selected from an aromatic hydrocarbon ring or an aromatic heterocyclic ring, $A^y$ represents a hydrogen atom, an alkyl group having 1 to 6 carbon atoms, or an organic group having 1 to 30 carbon atoms, which has at least one aromatic ring selected from an aromatic hydrocarbon ring or an aromatic heterocyclic ring, $A^x$ and $A^y$ may be bonded to each other to form a ring, $Q^2$ represents a hydrogen atom or an alkyl group having 1 to 6 carbon atoms, and

* represents a bonding position with $L^1$ or $L^2$.

<2>

The cured product according to <1>, in which Ar is the aromatic ring group represented by General Formula (2-2).

<3>

The cured product according to <2>, in which the aromatic ring group represented by General Formula (2-2) is an aromatic ring group represented by General Formula (2-21a), Formula (2-21a)

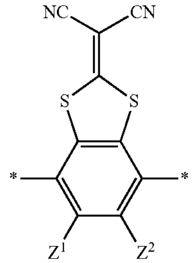

in the formula, $Z^1$ and $Z^2$ have the same meaning as $Z^1$ and $Z^2$ in General Formula (2-2), respectively.

<4>

The cured product according to any one of <1> to <3>, in which $Sp^a$ and $Sp^b$ are a linear alkylene group having 11 to 30 carbon atoms or a group in which, in a linear alkylene group having 11 to 30 carbon atoms, one or two or more —$CH_2$—'s excluding a linking portion to $L^1$ or $L^2$ are substituted by a group selected from —O—, —S—, >C(═O), and >$NR^{201}$, and $R^{201}$ represents a hydrogen atom or an alkyl group having 1 to 3 carbon atoms, where the linking portion to $Pol^1$ or $Pol^2$ in $Sp^a$ and $Sp^b$ is a carbon atom.

<5>

The cured product according to <4>, in which $Sp^a$ and $Sp^b$ are a linear alkylene group having 11 to 30 carbon atoms or a group in which, in a linear alkylene group having 11 to 30 carbon atoms, one or two or more —$CH_2CH_2$—'s excluding a linking portion to $L^1$ or $L^2$ are substituted by a group selected from —C(═O)O— and —OC(═O)—, where the linking portion to $Pol^1$ or $Pol^2$ in $Sp^a$ and $Sp^b$ is a carbon atom.

<6>

The cured product according to any one of <1> to <5>, in which $Pol^1$ and $Pol^2$ are a (meth)acryloyloxy group.

<7>

An optical member comprising:

the cured product according to any one of <1> to <5>.

<8>

A lens comprising:

the cured product according to any one of <1> to <5>.

<9>

A compound represented by General Formula (1), $Pol^1$-$Sp^a$-$L^1$-Ar-$L^2$-$Sp^b$-$Pol^2$    Genera Formula (1)

in the formula, Ar represents an aromatic ring group represented by General Formula (2-2), $L^1$ and $L^2$ represent —O—, $Sp^a$ and $Sp^b$ represent a linear alkylene group having 11 to 30 carbon atoms or a group in which, in a linear alkylene group having 11 to 30 carbon atoms, one or two or more —$CH_2$—'s excluding a linking portion to $L^1$ or $L^2$ are substituted by a group selected from —O—, —S—, >C(═O), and >$NR^{201}$, $R^{201}$ represents a hydrogen atom or an alkyl group having 1 to 3 carbon atoms, a linking portion of $Sp^a$ to $Pol^1$ and a linking portion of $Sp^b$ to $Pol^2$ are both a carbon atom, and $Pol^1$ and $Pol^2$ represent a polymerizable group, General Formula (2-2)

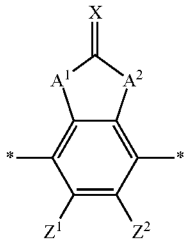

in the formula, $Z^1$ and $Z^2$ represent a hydrogen atom, an aliphatic hydrocarbon group having 1 to 20 carbon atoms, an alkoxy group having 1 to 20 carbon atoms, an alicyclic hydrocarbon group having 3 to 20 carbon atoms, a monovalent aromatic hydrocarbon group having 6 to 20 carbon atoms, a halogen atom, a cyano group, a nitro group, $—NR^{12}R^{13}$, or $—SR^{12}$, $Z^1$ and $Z^2$ may be bonded to each other to form an aromatic hydrocarbon ring or an aromatic heterocyclic ring, $R^{12}$ and $R^{13}$ represent a hydrogen atom or an alkyl group having 1 to 6 carbon atoms, $A^1$ and $A^2$ represent a group selected from —O—, $>NR^{21}$, —S—, and >C(═O), and $R^{21}$ represents a hydrogen atom or a substituent, X represents ═O, ═S, a carbon atom to which a hydrogen atom or a substituent is bonded, or a nitrogen atom to which a hydrogen atom or a substituent is bonded, and

* represents a bonding position with $L^1$ or $L^2$.

<10>

A curable resin composition comprising:

a compound represented by General Formula (1); and indium tin oxide particles, $$Pol^1\text{-}Sp^a\text{-}L^1\text{-}Ar\text{-}L^2\text{-}Sp^b\text{-}Pol^2 \qquad \text{Genera Formula (1)}$$

in the formula, Ar represents an aromatic ring group represented by any of General Formula (2-1), . . . , or (2-4), $L^1$ and $L^2$ represent —O—, $Sp^a$ represents a linking group having a shortest atom number of 11 or more and linking $Pol^1$ and $L^1$, and $Sp^b$ represents a linking group having a shortest atom number of 11 or more and linking $Pol^2$ and $L^2$, $Pol^1$ and $Pol^2$ represent a polymerizable group, and a linking portion of $Sp^a$ to $L^1$ and a linking portion of $Sp^b$ to $L^2$ are both $—CH_2—$, and a linking portion of $Sp^a$ to $Pol^1$ and a linking portion of $Sp^b$ to $Pol^2$ are both a carbon atom and both $Sp^a$ and $Sp^b$ have no ring structure, General Formula (2-1)

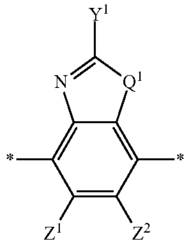

-continued

General Formula (2-2)

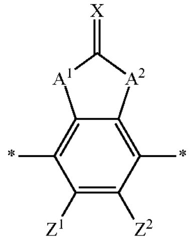

General Formula (2-3)

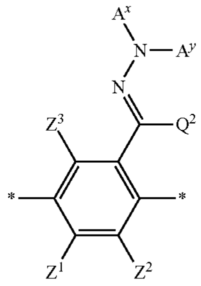

General Formula (2-4)

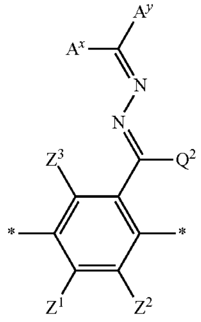

in the formula, $Q^1$ represents —S—, —O—, or $>NR^{11}$, and $R^{11}$ represents a hydrogen atom or an alkyl group having 1 to 6 carbon atoms, $Y^1$ represents an alkyl group having 1 to 6 carbon atoms, an aromatic hydrocarbon group having 6 to 12 carbon atoms, or an aromatic heterocyclic group having 3 to 12 carbon atoms, $Z^1$, $Z^2$, and $Z^3$ represent a hydrogen atom, an aliphatic hydrocarbon group having 1 to 20 carbon atoms, an alkoxy group having 1 to 20 carbon atoms, an alicyclic hydrocarbon group having 3 to 20 carbon atoms, an aromatic hydrocarbon group having 6 to 20 carbon atoms, a halogen atom, a cyano group, a nitro group, $—NR^{12}R^{13}$, or $—SR^{12}$, $Z^1$ and $Z^2$ may be bonded to each other to form an aromatic hydrocarbon ring or an aromatic heterocyclic ring, $R^{12}$ and $R^{13}$ represent a hydrogen atom or an alkyl group having 1 to 6 carbon atoms, $A^1$ and $A^2$ represent a group selected from —O—, $>NR^{21}$, —S—, and >C(═O), and $R^{21}$ represents a hydrogen atom or a substituent, X represents ═O, ═S, a carbon atom to which a hydrogen atom or a substituent is bonded, or a nitrogen atom to which a hydrogen atom or a substituent is bonded, $A^x$ represents an organic group having 1 to 30 carbon atoms, which has at least one aromatic ring selected from an aromatic hydrocarbon ring or an aromatic heterocyclic ring, $A^y$ represents a hydrogen atom, an alkyl group having 1 to 6 carbon atoms, or an organic group having 1 to 30 carbon atoms, which has at least one aromatic ring selected from an aromatic hydrocarbon ring or an aromatic heterocyclic ring, $A^x$ and $A^y$ may be bonded to each other to form a ring, $Q^2$ represents a hydrogen atom or an alkyl group having 1 to 6 carbon atoms, and

* represents a bonding position with $L^1$ or $L^2$.

<11>

The curable resin composition according to <10>, further comprising:

a polymer having a constitutional unit represented by General Formula (P) and having an acidic group at one terminal, General Formula (P)

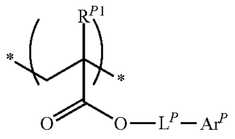

in the formula, $L^P$ represents a single bond or a divalent linking group, $Ar^P$ represents a phenyl group, $R^{P1}$ represents a hydrogen atom or a methyl group, $Ar^P$ does not include the acidic group, and * represents a bonding portion.

<12>

The curable resin composition according to <10> or <11>, further comprising:

a monofunctional or bi- or higher functional (meth) acrylate monomer compound.

<13>

A cured product of the curable resin composition according to any one of <10> to <12>.

<14>

A diffractive optical element comprising:

the cured product according to <13>, in which the diffractive optical element includes a surface having a diffraction grating shape and formed of the cured product.

<15>

A multilayer diffractive optical element comprising:

a first diffractive optical element; and a second diffractive optical element, in which the first diffractive optical element is the diffractive optical element according to <14>, and the surface of the first diffractive optical element, which has a diffraction grating shape, and a surface of the second diffractive optical element, which has a diffraction grating shape, face each other.

In the present invention, in a case of a plurality of substituents, linking groups, and the like (hereinafter, referred to as a substituent and the like) represented by a specific reference or formula, or in a case of simultaneously defining a plurality of the substituent and the like, unless otherwise specified, the substituent and the like may be the same or different from each other (regardless of the presence or absence of an expression "each independently", the substituent and the like may be the same or different from each other). The same applies to the definition of the number of substituents and the like. In a case where a plurality of substituents and the like are near (particularly, adjacent to each other), unless otherwise specified, the substituents and the like may be linked to each other to form a ring. In addition, unless otherwise specified, a ring, for example, an alicyclic ring, an aromatic ring, or a heterocyclic ring may be further condensed to form a fused ring.

In the present invention, unless otherwise specified, with regard to a double bond, in a case where E-form and Z-form are present in the molecule, the double bond may be any one of these forms, or may be a mixture thereof.

In addition, in the present invention, unless otherwise specified, in a case where a compound has one or two or more asymmetric carbons, for such stereochemistry of asymmetric carbons, either an (R)-form or an (S)-form can be independently taken. As a result, the compound may be a mixture of optical isomers or steric isomers such as diastereoisomers, or may be racemic.

In addition, in the present invention, the expression of the compound means that a compound having a partially changed structure is included within a range which does not impair the effects of the present invention. Further, a compound which is not specifically described as substituted or unsubstituted may have an optional substituent within a range which does not impair the effects of the present invention.

In the present invention, with regard to a substituent (the same applies to a linking group and a ring) in which whether it is substituted or unsubstituted is not specified, within a range not impairing the desired effect, it means that the group may have an optional substituent. For example, "alkyl group" means to include both an unsubstituted alkyl group and a substituted alkyl group.

In the present invention, in a case where the number of carbon atoms in a certain group is specified, the number of carbon atoms means the number of carbon atoms in the entire group, unless otherwise specified in the present invention or the present specification. That is, in a case of an aspect in which the group has a substituent, it means the total number of carbon atoms including the substituent.

In the present invention, a numerical range represented by using "to" means a range including numerical values described before and after "to" as a lower limit value and an upper limit value.

In the present invention, each component may be used alone or in combination of two or more thereof.

In a description of a content of each component in the curable composition used for producing the cured product according to an aspect of the present invention, a solid content in the curable composition used for producing the cured product according to the aspect of the present invention means, in addition to the compound represented by General Formula (1), components remaining in the cured product obtained from the curable composition used for producing the cured product according to the aspect of the present invention. Usually, a remainder after removing a solvent is the "solid content". This also applies to a description of a content of each component in the curable resin composition according to an aspect of the present invention.

In the present invention, "(meth)acrylate" represents either one or both of acrylate and methacrylate, and "(meth) acryloyl" represents either one or both of acryloyl and methacryloyl. The monomer in the present invention is distinguished from an oligomer and a polymer, and refers to a compound having a weight-average molecular weight of 1000 or less.

In the present invention, the term aliphatic hydrocarbon group indicates a group obtained by removing one optional hydrogen atom from a linear or branched alkane, a linear or branched alkene, or a linear or branched alkyne. In the present specification, the aliphatic hydrocarbon group is preferably an alkyl group obtained by removing one optional hydrogen atom from a linear or branched alkane. Examples of the alkyl group include a methyl group, an ethyl group, a propyl group, an isopropyl group, a butyl group, an isobutyl group, a sec-butyl group, a tert-butyl group, a pentyl group, an 1-methylbutyl group, a 3-methylbutyl group, a hexyl group, an 1-methylpentyl group, a 4-methylpentyl group, a heptyl group, an 1-methylhexyl group, a 5-methylhexyl group, a 2-ethylhexyl group, an octyl group, an 1-methylheptyl group, a nonyl group, an 1-methyloctyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group.

In addition, in the present invention, the aliphatic hydrocarbon group (unsubstituted) is preferably an alkyl group having 1 to 12 carbon atoms, and particularly preferably a methyl group or an ethyl group.

In the present invention, the term alkyl group indicates a linear or branched alkyl group. Examples of the alkyl group include the above-described examples. The same applies to an alkyl group in a group (an alkoxy group, an alkoxycarbonyl group, and the like) including the alkyl group.

In addition, in the present invention, examples of a linear alkylene group include a group obtained by removing one hydrogen atom bonded to a terminal carbon from a linear alkyl group among the above-described alkyl groups.

In the present invention, the term alicyclic hydrocarbon ring means a saturated hydrocarbon ring (cycloalkane). Examples of the alicyclic hydrocarbon ring include cyclopropane, cyclobutane, cyclopentane, cyclohexane, cycloheptane, cyclooctane, cyclononane, and cyclodecane.

In the present invention, the term unsaturated hydrocarbon ring means a hydrocarbon ring having a carbon-carbon unsaturated double bond, which is not an aromatic ring. Examples of the unsaturated hydrocarbon ring include indene, indane, and fluorene.

In the present invention, the term alicyclic hydrocarbon group means a cycloalkyl group obtained by removing one optional hydrogen atom from a cycloalkane. Examples of the alicyclic hydrocarbon group include a cyclopropyl group, a cyclobutyl group, a cyclopentyl group, a cyclohexyl group, a cycloheptyl group, a cyclooctyl group, a cyclononyl group, and a cyclodecyl group, and a cycloalkyl group having 3 to 12 carbon atoms is preferable.

In the present invention, a cycloalkylene group refers to a divalent group obtained by removing two optional hydrogen atoms from a cycloalkane. Examples of the cycloalkylene group include a cyclohexylene group.

In the present invention, the term aromatic ring means either one or both of an aromatic hydrocarbon ring and an aromatic heterocyclic ring.

In the present invention, the term aromatic hydrocarbon ring means an aromatic ring in which a ring is formed only by carbon atoms. The aromatic hydrocarbon ring may be a monocyclic ring or a fused ring. An aromatic hydrocarbon ring having 6 to 14 carbon atoms is preferable. Examples of aromatic hydrocarbon rings include a benzene ring, a naphthylene ring, an anthracene ring, a phenanthrene ring, and the like. In the present specification, in a case where the aromatic hydrocarbon ring is bonded to another ring, it is sufficient that the aromatic hydrocarbon ring may be substituted on another ring as a monovalent or divalent aromatic hydrocarbon group.

In the present invention, in a case where a monovalent group is referred to as an aromatic hydrocarbon group, it indicates a monovalent group obtained by removing any one hydrogen atom from an aromatic hydrocarbon ring. As the monovalent aromatic hydrocarbon group is preferably an aromatic hydrocarbon group having 6 to 14 carbon atoms, and examples of the monovalent aromatic hydrocarbon group include a phenyl group, a biphenyl group, an 1-naphthyl groups, a 2-naphthyl groups, an 1-anthracenyl group, a 2-anthracenyl group, a 3-anthracenyl group, a 4-anthracenyl group, a 9-anthracenyl group, an 1-phenanthryl group, a 2-phenanthryl group, a 3-phenanthryl group, a 4-phenanthryl group, and a 9-phenanthryl group. Among these, a phenyl group is preferable.

In the present invention, in a case where a divalent group is referred to as an aromatic hydrocarbon group, it indicates a divalent group obtained by removing any one hydrogen atom from the above-described monovalent aromatic hydrocarbon group. Examples of divalent aromatic hydrocarbon groups include a phenylene group, a biphenylene group, a naphthylene group, a phenanthrylene group, and the like, and a phenylene group is preferable and a 1,4-phenylene group is more preferable.

In the present invention, an aromatic heterocyclic ring means an aromatic ring in which a ring is formed by a carbon atom and a heteroatom. Examples of the heteroatom include an oxygen atom, a nitrogen atom, and a sulfur atom. The aromatic heterocyclic ring may be a monocyclic ring or a fused ring, and the number of atoms constituting the ring is preferably 5 to 20 and more preferably 5 to 14. The number of heteroatoms in the atoms constituting the ring is not particularly limited, but is preferably 1 to 3 and more preferably 1 or 2. Examples of the aromatic heterocyclic ring include a furan ring, a thiophene ring, a pyrrole ring, an imidazole ring, an isothiazole ring, an isoxazole ring, a pyridine ring, a pyrazine ring, a quinoline ring, a benzofuran ring, a benzothiazole ring, a benzoxazole ring, and examples of nitrogen-containing fused aromatic ring described later. In the present specification, in a case where the aromatic heterocyclic ring is bonded to another ring, it is sufficient that the aromatic heterocyclic ring may be substituted on another ring as a monovalent or divalent aromatic heterocyclic group.

In the present invention, in a case where a monovalent group is referred to as an aromatic heterocyclic group, it indicates a monovalent group obtained by removing any one hydrogen atom from an aromatic heterocyclic ring. Examples of the monovalent aromatic heterocyclic group include a furyl group, a thienyl group, a pyrrolyl group, an imidazolyl group, an isothiazolyl group, an isooxazolyl group, a pyridyl group, a pyrazinyl group, a quinolyl group, a benzofuranyl group (preferably, a 2-benzofuranyl group), a benzothiazolyl group (preferably, a 2-benzothiazolyl group), and a benzoxazolyl group (preferably, a 2-benzoxazolyl group). Among these, a furyl group, a thienyl group, a benzofuranyl group, a benzothiazolyl group, or a benzoxazolyl group is preferable, and a 2-furyl group or a 2-thienyl group is more preferable.

In the present invention, the term divalent aromatic heterocyclic group refers to a divalent group obtained by removing two optional hydrogen atoms from the aromatic hetero ring, and examples thereof include a divalent group obtained by removing one optional hydrogen atom from the above-described (monovalent) aromatic heterocyclic group.

In the present invention, examples of a halogen atom include a fluorine atom, a chlorine atom, a bromine atom, and an iodine atom.

The cured product according to the aspect of the present invention has excellent light resistance. Therefore, the optical member and lens according to the aspect of the present invention, which include this cured product as a constituent member, are excellent in light resistance and are unlikely to cause deterioration in performance even in a case of being used outdoors, for example.

In addition, the compound according to the aspect of the present invention is suitable as a main raw material for a cured product having the above-described excellent light resistance.

In addition, in the curable resin composition according to the aspect of the present invention, by using a cured product obtained from this composition as a constituent member of one of diffraction gratings, it is possible to obtain a diffractive optical element and a multilayer diffractive optical element having excellent diffraction efficiency.

DESCRIPTION OF THE PREFERRED EMBODIMENTS

Figure 1:
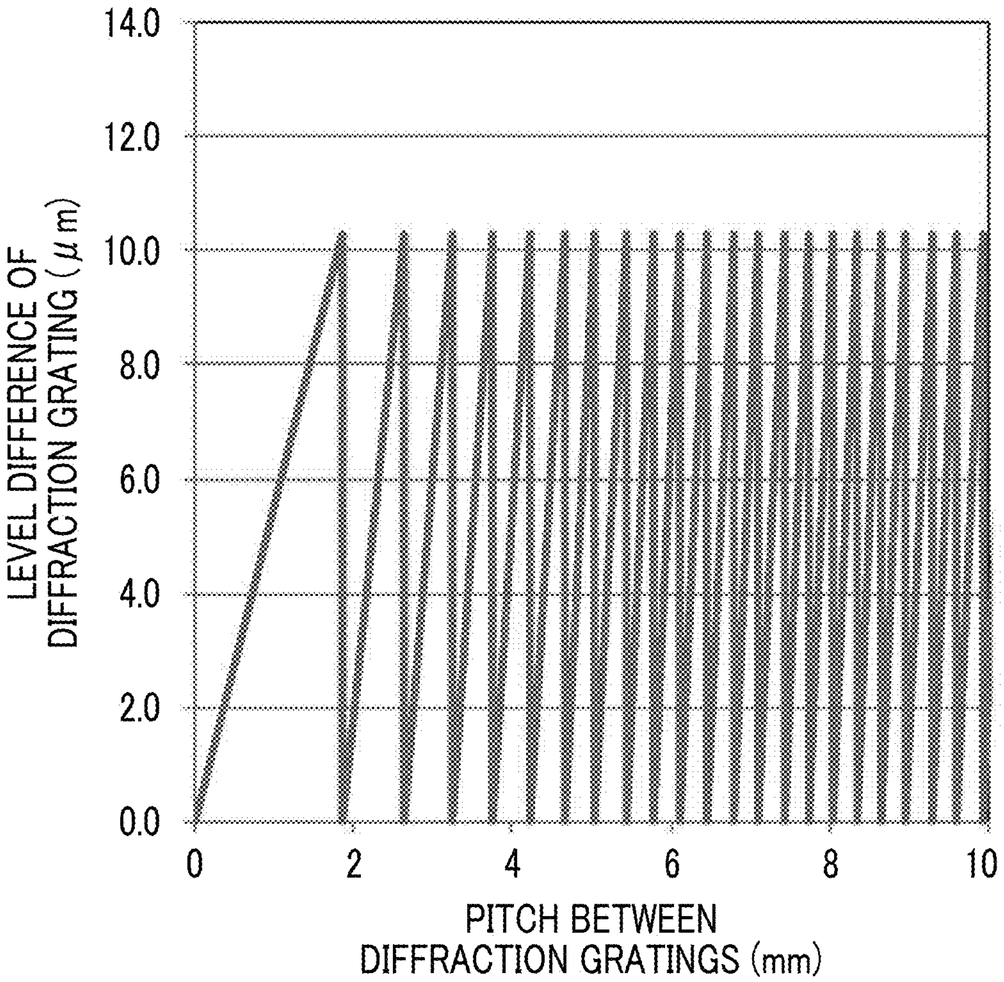
FIG. 1 is a graph illustrating a shape of a diffraction grating included in a mold used in Example 2. In the graph of FIG. 1, the horizontal axis is a pitch of the diffraction grating shape, in which a central portion in a cross section of a diffraction grating portion of the mold is set to 0 mm and a pitch from the central portion to an end portion (10 mm) is shown, and the vertical axis shows a level difference of a mold grid.

The present invention will be described in detail. The description of configuration requirements described below may be based on representative embodiments, specific examples, and the like, but the present invention is not limited to those embodiments except as specified in the present invention.

[Cured Product]

A cured product according to an embodiment of the present invention is a cured product of a curable composition including a compound represented by General Formula (1) described later, in which a birefringence Δn of the cured product at a wavelength of 587 nm is $0.00 \le \Delta n \le 0.01$.

The cured product according to the embodiment of the present invention is obtained by advancing a polymerization reaction of a monomer including the compound represented by General Formula (1) and curing the monomer. The cured product according to the embodiment of the present invention may include an unreacted monomer (for example, the compound represented by General Formula (1)) and the like.

The cured product according to the embodiment of the present invention is a cured product which is three-dimensionally crosslinked by light irradiation or heating, and the monomer used is incorporated into the cured product, so that a structure thereof cannot be specified by analysis or the like.

The cured product according to the embodiment of the present invention has an aromatic ring having a specific structure represented by Ar (hereinafter, abbreviated as an "aromatic ring Ar"), which is derived from the compound represented by General Formula (1). As described above, as described in WO2019/044863A, the cured product obtained from the curable composition including a compound represented by General Formula 1 of WO2019/044863A, which has the aromatic ring Ar, has a low Abbe number (νd) as a dispersion characteristic of the refractive index, has a high partial dispersion ratio (θg, F value), and exhibits excellent optical characteristics. However, it cannot be said that this cured product has sufficient light resistance.

The present inventors have considered that the cause of the deteriorated light resistance is that, after the aromatic ring Ar is excited by light absorption, the lowest excited triplet state $T_1$ causes a hydrogen abstraction reaction or the like and decomposes, and have been studied intensively thereon. As a result, by using, as a polymerizable monomer, the compound represented by General Formula (1), in which the aromatic ring Ar and polymerizable groups represented by $Pol^1$ and $Pol^2$ are linked by specific linking groups represented by $L^1$-$Sp^a$ and $L^2$-$Sp^b$, it has been found that the light resistance of the obtained cured product is effectively enhanced.

The reason for this is not clear, but it is presumed that, by setting a chain length of the linking group represented by $Sp^a$ and $Sp^b$ to a specific length such that the shortest number of atoms linking $Pol^1$ and $L^1$ or $Pol^2$ and $L^2$ is 11 or more, a mobility around the aromatic ring Ar (for example, a relaxation behavior of a side chain portion to heat) is improved, and by forming $L^1$ and $L^2$ as an ether bond, the ether bond affects that a stability of the bond between the aromatic ring Ar and $Sp^a$ and $Sp^b$ is enhanced. That is, it is presumed that, for the excited molecules by light irradiation, a path returning to a ground state by heat deactivation has priority over the above-described decomposition path, and as a result, the decomposition of the aromatic ring Ar is suppressed and excellent light resistance is realized.

The birefringence Δn of the cured product according to the embodiment of the present invention at a wavelength of 587 nm (hereinafter, also referred to as a birefringence Δn (587 nm)) is $0.00 \le \Delta n \le 0.01$. The birefringence Δn (587 nm) is preferably 0.001 or less and more preferably less than 0.001. By using a cured product having such a low birefringence index for an optical member of an imaging module, it is possible to obtain a clear image in which an imaging position is unlikely to shift. The lower limit value of the birefringence Δn (587 nm) may be 0.00001 or 0.0001.

The birefringence Δn (587 nm) of the cured product can be determined by the following method. A film-shaped sample is produced, and using a birefringence evaluation device (for example, WPA-100, manufactured by Photonic Lattice, Inc.), a birefringence within a 10 mm diameter circle including the center of the sample is measured. Thereafter, the birefringence Δn (587 nm) can be obtained by obtaining the average value of birefringence at a wavelength of 587 nm.

Δn Abbe number (νd) and a partial dispersion ratio (eg, F) of the cured product are values measured using a Kalnew precision refractometer KPR-2000 (manufactured by Shimadzu Device Corporation). Specifically, the curable composition is poured into a transparent glass mold having a diameter of 20 mm and a thickness of 2 mm, and irradiated with ultraviolet rays of 1000 mJ/cm$^2$ from above the transparent glass mold in an atmosphere having an oxygen concentration of 1% or less to mold a cured product (a ultraviolet irradiating step), and an Abbe number (νd) and a partial dispersion ratio (θg, F) of this cured product are measured. The Abbe number (νd) and the partial dispersion ratio (θg, F) of the cured product are calculated by the following expressions. In a case of molding a cured product, a heating step may be employed instead of the above-described ultraviolet irradiating step, or both of the heating step and the ultraviolet irradiating step may be employed.

$$\nu d=(nd-1)/(nF-nC)$$

$$\theta g,F=(Ng-nF)/(nF-nC)$$

Here, nd represents a refractive index at a wavelength of 587.56 nm, nF represents a refractive index at a wavelength of 486.13 nm, nC represents a refractive index at a wavelength of 656.27 nm, and ng represents a refractive index at a wavelength of 435.83 nm.

The Abbe number of the cured product according to the embodiment of the present invention is not particularly limited, but is preferably 30 or less, more preferably 27 or less, still more preferably 25 or less, and particularly preferably 23 or less. In addition, the Abbe number of the cured product according to the embodiment of the present invention is not particularly limited, but it is preferably 1 or more, more preferably 3 or more, still more preferably 5 or more, and particularly preferably 7 or more.

The partial dispersion ratio (θg, F) of the cured product according to the embodiment of the present invention is not particularly limited, but it is preferably 0.65 or more, more preferably 0.70 or more, and still more preferably 0.75 or more. In addition, the partial dispersion ratio (θg, F) of the cured product according to the embodiment of the present invention is not particularly limited, but it is preferably 2 or less, more preferably 1.8 or less, and still more preferably 1.7 or less.

A glass transition temperature (Tg) of the cured product according to the embodiment of the present invention is not particularly limited, but it is preferably 40° C. to 200° C. and more preferably 50° C. to 180° C.

The above-described glass transition temperature is measured by a method described in Examples described later.

[Curable Composition]

The above-described curable composition contains a compound represented by General Formula (1).

<Compound Represented by General Formula (1)>

The cured product according to the embodiment of the present invention is obtained by curing a curable composition containing a compound represented by General Formula (1).

$$Pol^1\text{-}Sp^a\text{-}L^1\text{-}Ar\text{-}L^2\text{-}Sp^b\text{-}Pol^2$$ Genera Formula(I)

In the formula, Ar represents an aromatic ring group represented by any of General Formula (2-1), . . . , or (2-4), $L^1$ and $L^2$ represent —O—, $Sp^a$ represents a linking group having a shortest atom number of 11 or more and linking $Pol^1$ and $L^1$, and $Sp^b$ represents a linking group having a shortest atom number of 11 or more and linking $Pol^2$ and $L^2$, $Pol^1$ and $Pol^2$ represent a polymerizable group, a linking portion of $Sp^a$ to $L^1$ and a linking portion of $Sp^b$ to $L^2$ are both —$CH_2$—, and a linking portion of $Sp^a$ to $Pol^1$ and a linking portion of $Sp^b$ to $Pol^2$ are both a carbon atom.

Hereinafter, Ar, $Sp^a$ and $Sp^b$, and $Pol^1$ and $Pol^2$ will be described in detail.

(1) Ar

Ar is an aromatic ring group represented by any of General Formula (2-1), . . . , or (2-4).

General Formula (2-1)

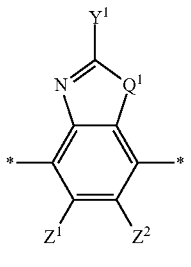

-continued

General Formula (2-2)

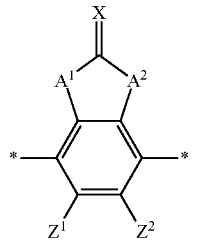

General Formula (2-3)

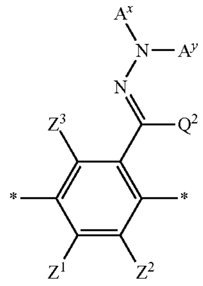

General Formula (2-4)

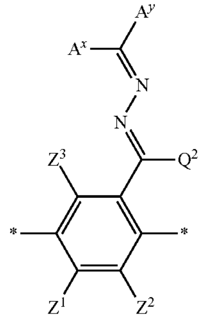

In the formula, $Q^1$ represents —S—, —O—, or >$NR^{11}$, and $R^{11}$ represents a hydrogen atom or an alkyl group having 1 to 6 carbon atoms, $Y^1$ represents an alkyl group having 1 to 6 carbon atoms, an aromatic hydrocarbon group having 6 to 12 carbon atoms, or an aromatic heterocyclic group having 3 to 12 carbon atoms, $Z^1$, $Z^2$, and $Z^3$ represent a hydrogen atom, an aliphatic hydrocarbon group having 1 to 20 carbon atoms, an alkoxy group having 1 to 20 carbon atoms, an alicyclic hydrocarbon group having 3 to 20 carbon atoms, an aromatic hydrocarbon group having 6 to 20 carbon atoms, a halogen atom, a cyano group, a nitro group, —$NR^{12}R^{13}$, or —$SR^{12}$, $Z^1$ and $Z^2$ may be bonded to each other to form an aromatic hydrocarbon ring or an aromatic heterocyclic ring, $R^{12}$ and $R^{13}$ represent a hydrogen atom or an alkyl group having 1 to 6 carbon atoms, $A^1$ and $A^2$ represent a group selected from —O—, >$NR^{21}$, —S—, and >C(═O), $R^{21}$ represents a hydrogen atom or a substituent, in which a hydrogen atom or an alkyl group having 1 to 6 carbon atoms is preferable, X represents ═O (oxygen atom), ═S (sulfur atom), a carbon atom to which a hydrogen atom or a substituent is bonded, or a nitrogen atom to which a hydrogen atom or a substituent is bonded, $A^x$ represents an organic group having 1 to 30 carbon atoms, which has at least one aromatic ring selected from an aromatic hydrocarbon ring or an aromatic heterocyclic ring, $A^y$ represents a hydrogen atom, an alkyl group having 1 to 6, or an organic group having 1 to 30 carbon atoms, which has at least one aromatic ring selected from an aromatic hydrocarbon ring or an aromatic heterocyclic ring, $A^x$ and $A^y$ may be bonded to each other to form a ring, $Q^2$ represents a hydrogen atom or an alkyl group having 1 to 6 carbon atoms, and

* represents a bonding position with $L^1$ or $L^2$.

With regard to the definition and preferred range of each substituent in General Formulae (2-1) to (2-4), unless otherwise noted, the descriptions regarding $Y^1$, $Q^1$, and $Q^2$ in the compound (A) described in JP2012-21068A can be adopted as they are to $Y^1$, $Z^1$, and $Z^2$, the descriptions regarding $A_1$, $A_2$, and X in the compound represented by General Formula (I) described in JP2008-107767A can be adopted as they are to $A^1$, $A^2$, and X in General Formula (2-2), the descriptions regarding $A^x$, $A^y$, and $Q^1$ in the compound represented by General Formula (I) described in WO2013/018526A can be adopted as they are to $A^x$, $A^y$, and $Q^2$ in General Formula (2-3), and the descriptions regarding $A^a$, $A^b$, and $Q^{11}$ in the compound represented by General Formula (II) described in WO2013/018526A can be adopted as they are to $A^x$, $A^y$, and $Q^2$ in General Formula (2-4). The description regarding $Q^1$ in the compound (A) described in JP2012-21068A can be adopted as they are to $Z^3$.

X in General Formula (2-2) is preferably a carbon atom to which two substituents are bonded, and both $A^1$ and $A^2$ are preferably —S—. In General Formula (2-3), as the ring in a case where $A^x$ and $A^y$ are bonded to each other to form a ring, an alicyclic hydrocarbon ring, an aromatic hydrocarbon ring, or an aromatic heterocyclic ring is preferable, and an aromatic heterocyclic ring is more preferable. In General Formula (2-4), as the ring in a case where $A^x$ and $A^y$ are bonded to each other to form a ring, an unsaturated hydrocarbon ring is preferable.

Ar in General Formula (1) is preferably the aromatic ring group represented by General Formula (2-2).

As the aromatic ring group represented by General Formula (2-2), an aromatic ring group represented by General Formula (2-21) is preferable.

Formula (2-21)

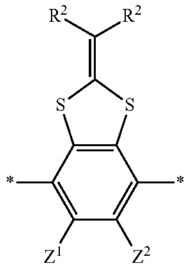

In the formula, R represents a substituent, and $Z^1$ and $Z^2$ have the same meaning as $Z^1$ and $Z^2$ in General Formula (2-2), respectively.

Examples of the substituent represented by $R^z$ include substituents which may be included in a linear alkylene group in $Sp^a$ and $Sp^b$, which will be described later, and preferred examples thereof include an alkyl group, an alkoxy group, an alkoxycarbonyl group, a halogen atom, and a cyano group. Two $R^z$'s may be the same or different from each other.

In addition, two $R^z$'s may be bonded to each other to form a ring, and in this case, the ring to be formed is preferably a 5-membered ring or a 6-membered ring, and more preferably includes a nitrogen atom or an oxygen atom as an atom constituting the ring. The ring formed by bonding two R's to each other is more preferably a ring represented by any of the following structures.

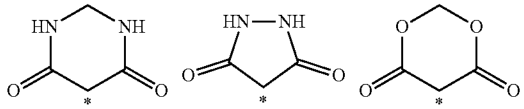

In the above formulae, * represents a position of a carbon atom where the two $R^z$'s are bonded in General Formula (2-21), respectively. As the substituent in this case, an alkyl group having 1 to 6 carbon atoms is preferable, and a linear alkyl group having 1 to 4 carbon atoms is more preferable.

As the aromatic ring group represented by General Formula (2-21), an aromatic ring group in which at least one of $R^z$'s is a cyano group or an aromatic ring group in which two $R^z$'s are bonded to each other to form a ring is preferable, and from the viewpoint of further improving light resistance of the cured product, an aromatic ring group represented by General Formula (2-21a), in which two $R^z$'s are cyano groups, is more preferable.

In a case where the Ar is an aromatic ring group represented by General Formula (2-21a), the adhesiveness can be further improved.

Formula (2-21a)

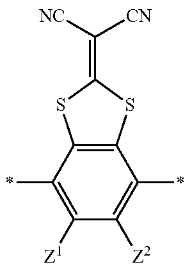

In the formula, $Z^1$ and $Z^2$ have the same meaning as $Z^1$ and $Z^2$ in General Formula (2-2), respectively.

(2) $Sp^a$ and $Sp^b$ $Sp^a$ represents a linking group having a shortest atom number of 11 or more and linking $Pol^1$ and $L^1$, and $Sp^b$ represents a linking group having the shortest atom number of 11 or more and linking $Pol^2$ and $L^2$. However, a linking portion of $Sp^a$ to $L^1$ and a linking portion of $Sp^b$ to $L^2$ are both —$CH_2$—, and a linking portion of $Sp^a$ to $Pol^1$ and a linking portion of $Sp^b$ to $Pol^2$ are both a carbon atom. The regulation of these linking portions also applies to the following descriptions relating to $Sp^a$ and $Sp^b$.

As an example of the above-described "linking group having the shortest atom number of 11 or more", in -$L^2$-$Sp^b$-$Pol^2$ shown below, the shortest number of atoms linking —O— as $L^2$ and a methacryloyloxy group as $Pol^2$ is 10.

The above-described shortest atom number is preferably 11 to 30, more preferably 11 to 25, and still more preferably 12 to 25, and particularly preferably 12 to 20.

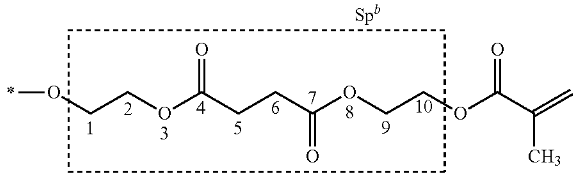

As the above-described linking group represented by $Sp^a$ or $Sp^b$, a linear alkylene group having 11 to 30 carbon atoms or a group in which, in a linear alkylene group having 11 to 30 carbon atoms, one or two or more $-CH_2-$'s excluding a linking portion to $L^1$ or $L^2$ are substituted by a group selected from $-O-$, $-S-$, $>C(=O)$, and $>NR^{201}$ is preferable, and a linear alkylene group having 11 to 30 carbon atoms or a group in which, in a linear alkylene group having 11 to 30 carbon atoms, one or two or more $-CH_2-$'s excluding a linking portion to $L^1$ or $L^2$ are substituted by a group selected from $-O-$ and $>C(=O)$ is more preferable.

The $R^{201}$ represents a hydrogen atom or an alkyl group having 1 to 3 carbon atoms.

The carbon atoms in the above-described "linear alkylene group having 11 to 30 carbon atoms" mean the carbon number in a state without a substituent. Therefore, as the carbon number in the linear alkylene group having 11 to 30 carbon atoms, the preferred carbon number described in the above-described shortest atom number can be adopted. In this regard, in a case where the "linear alkylene group having 11 to 30 carbon atoms" has a substituent, an alkyl group can also be taken as the substituent. In this case, the alkylene group is a branched alkylene group as a whole, but a linear moiety consisting of the "shortest atom number" of the above-described "shortest atom number of 11 or more" in $Sp^a$ and $Sp^b$ corresponds to the "linear alkylene group having 11 to 30 carbon atoms".

Examples of the substituent which may be included in the linear alkylene group of $Sp^a$ and $Sp^b$ described above include an alkyl group, a cycloalkyl group, an alkoxy group, an acyl group, an acyloxy group, an alkoxycarbonyl group, an amide group, an amino group, a halogen atom, a nitro group, and a cyano group, and an alkyl group is preferable, an alkyl group having 1 to 3 carbon atoms is more preferable, and a methyl group is still more preferable.

The number of substituents is not particularly limited, and for example, may be 1 to 4.

The above-described substitution of one or two or more $-CH_2-$'s, excluding the linking portion to $L^1$ or $L^2$ by the group selected from $-O-$, $-S-$, $>C(=O)$, and $>NR^{201}$ is not particularly limited in the number, type, and the like of the substitution as long as the substitution can function as the linking group.

Specific examples of the above-described substitution are shown below.

"Substitution of $-CH_2-$":

Examples thereof include a substitution of $-CH_2-$ by $-O-$, $-S-$, $>C(=O)$, or $>NR^{201}$, and a substitution by $-O-$ or $>C(=O)$ is preferable, and a substitution by $-O-$ is more preferable.

"Substitution of $-CH_2CH_2-$":

Examples thereof include a substitution of $-CH_2{}^{CH}{}_2-$ by $-C(=O)O-$, $-NR^{201}C(=O)-$, or $-SC(=O)-$, and a substitution by $-C(=O)O-$ or $-NR^{201}C(=O)-$ is preferable, and a substitution by $-C(=O)O-$ is more preferable.

"Substitution of $-CH_2CH_2CH_2-$":

Examples thereof include a substitution of $-CH_2CH_2CH_2-$ by $-OC(=O)O-$, $-NR^{201}C(=O)O-$, and a substitution by $-OC(=O)O-$ is preferable.

The above-described substitution by $-C(=O)O-$, $-NR^{201}C(=O)-$, $-NR^{201}C(=O)O-$, or $-SC(=O)-$ may be in a form in which either the left or right bonding site is substituted so as to be located on the $L^1$ side or the $L^2$ side.

As the above-described linking group represented by $Sp^a$ or $Sp^b$, from the viewpoint of further improving light resistance of the cured product, a linear alkylene group having 11 to 30 carbon atoms or a group in which, in a linear alkylene group having 11 to 30 carbon atoms, one or two or more $-CH_2CH_2-$'s excluding a linking portion to $L^1$ or $L^2$ are substituted by a group selected from $-C(=O)O-$ and $-OC(=O)-$ is still more preferable.

In a case where the above-described linking group represented by $Sp^a$ or $Sp^b$ is the still more preferred group, the adhesiveness can be further improved.

$Sp^a$ and $Sp^b$ may be the same or different from each other, but it is preferable that $Sp^a$ and $Sp^b$ are the same.

(3) $Pol^1$ and $Pol^2$ $Pol^1$ and $Pol^2$ represent a polymerizable group.

The polymerizable group may be a group including any of a vinylidene structure, an oxyrane structure, or an oxetane structure. From the viewpoint of convenience in synthesizing the compound represented by General Formula (1), the polymerizable group is preferably a group in which the linking part to $Sp^a$ or $Sp^b$ is an oxygen atom and which includes any of a vinylidene structure, an oxyrane structure, or an oxetane structure, and examples thereof include polymerizable groups represented by any of Formulae (Pol-1) to (Pol-6).

Formula (Pol-1)

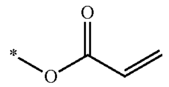

Formula (Pol-2)

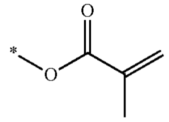

Formula (Pol-3)

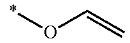

Formula (Pol-4)

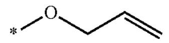

Formula (Pol-5)

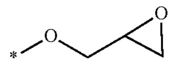

Formula (Pol-6)

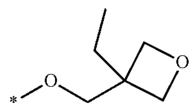

* represents a bonding position.

Among these, a (meth)acryloyloxy group represented by Formula (Pol-1) or Formula (Pol-2) is preferable, and a methacryloyloxy group represented by Formula (Pol-2) is more preferable.

It is preferable that any one of $Pol^1$ or $Pol^2$ is a (meth) acryloyloxy group, and it is more preferable that the both are (meth)acryloyloxy groups.

$Pol^1$ and $Pol^2$ may be the same or different from each other, but it is preferable that $Pol^1$ and $Pol^2$ are the same.

Examples of a specific structure of $Pol^1$-$Sp^a$-$L^1$- or $Pol^2$-$Sp^b$-$L^2$- include a structure of $Pol^1$-$Sp^a$-$L^1$- or $Pol^2$-$Sp^b$-$L^2$- described in the specific example of the compound represented by General Formula (1), which will be described later.

$Pol^1$-$SP^a$-$L^1$- and $Pol^2$-$Sp^b$-$L^2$- may be the same or different from each other, but it is preferable that $Pol^1$-$SP^a$-$L^1$- and $Pol^2$-$Sp^b$-$L^2$- are the same.

In the present specification, the structure represented by the following notation indicates an isopropylene structure. This isopropylene structure may be any of two structural isomers in which a methyl group is bonded to one of carbons constituting an ethylene group, and these structural isomers may be mixed.

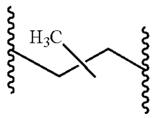
or
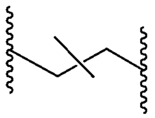

As described above, in the compound represented by General Formula (1), in a case where a linear alkylene group has a structure in which a substituent is substituted, structural isomers having different substitution positions of the substituent may exist. The compound represented by General Formula (1) may be a mixture of such structural isomers.

The compound represented by General Formula (1) is preferably a non-liquid crystalline compound. That is, from the viewpoint of using as a lens material, it is preferable that the $Sp^a$ and $Sp^b$ are linking groups having no ring structure.

Hereinafter, preferred specific examples of the compound represented by General Formula (1) are listed, but the present invention is not limited to these compounds. In the following structural formulae, Me represents a methyl group, Et represents an ethyl group, nPr represents an n-propyl group, iPr represents an isopropyl group, nBu represents an n-butyl group, and tBu represents a t-butyl group.

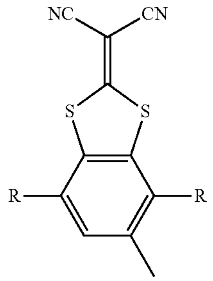

I-1

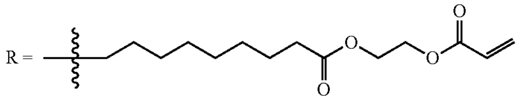

I-2

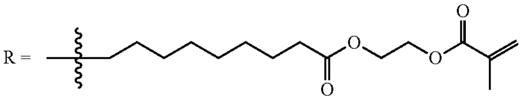

I-3

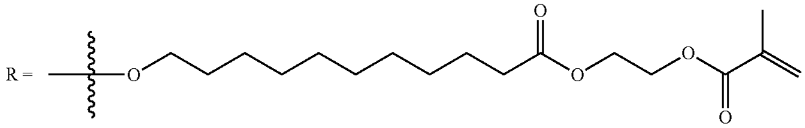

I-4

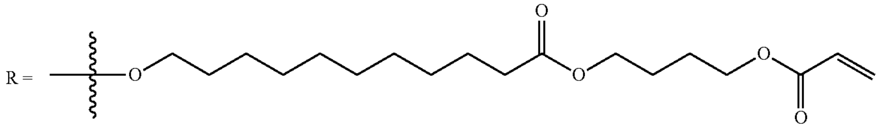

I-5

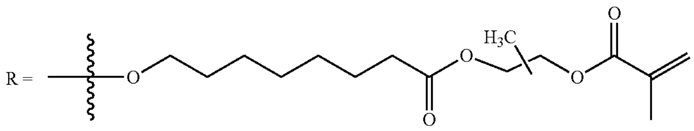

I-6

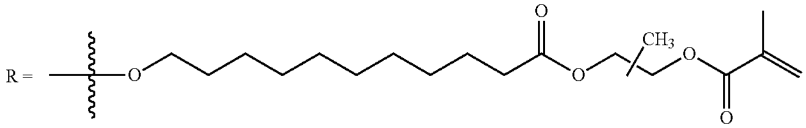

-continued
I-7
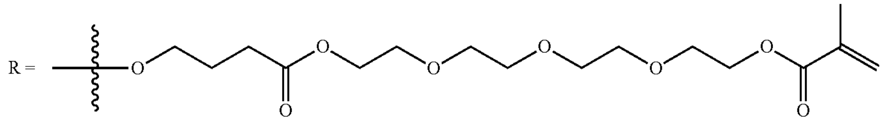
I-8
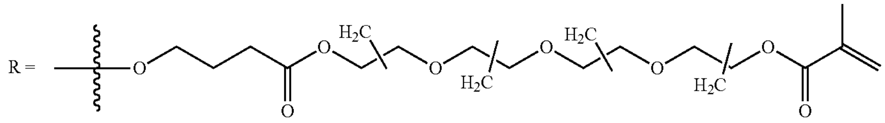
I-9
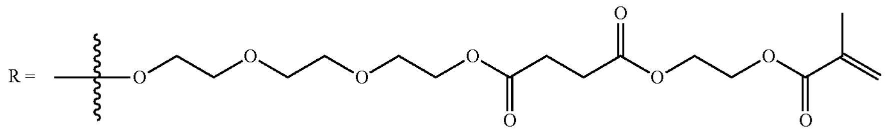
I-10
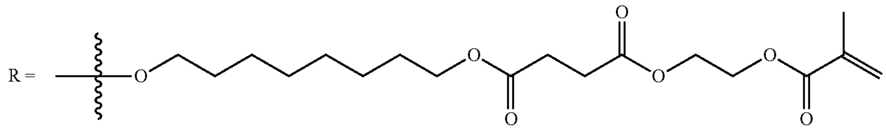
I-11
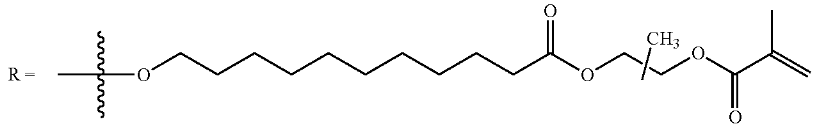
I-12
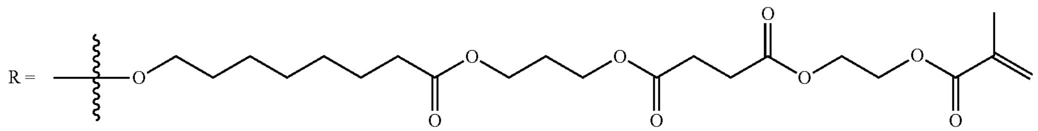
I-13
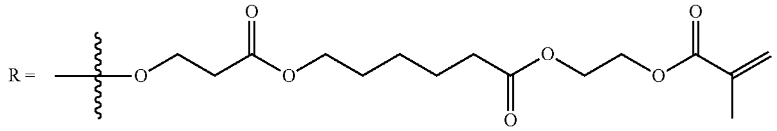
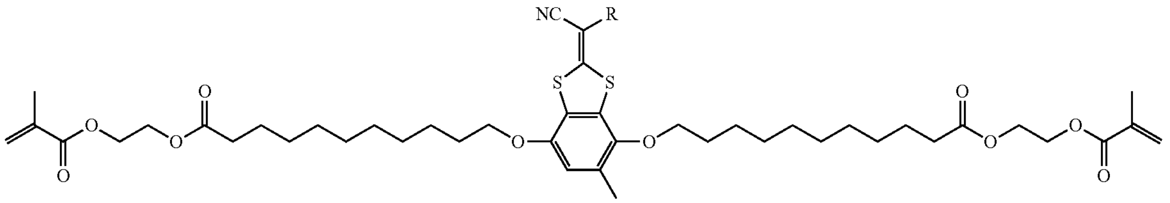
II-1
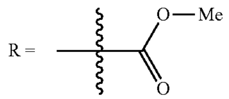
II-2
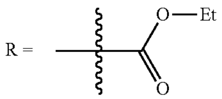
II-3
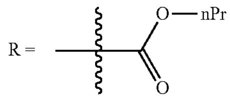

-continued

II-4

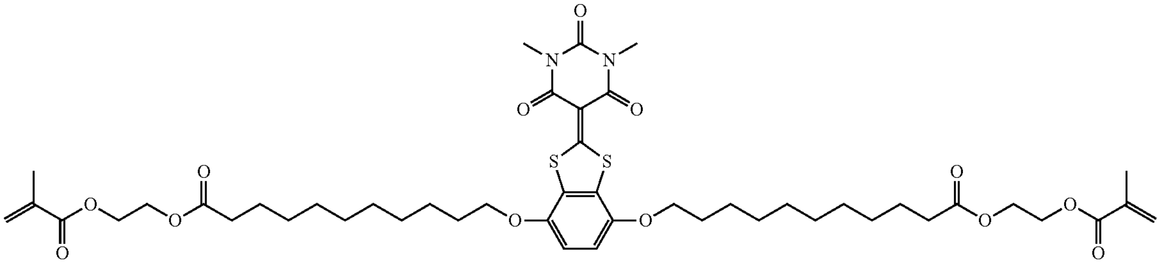

II-5

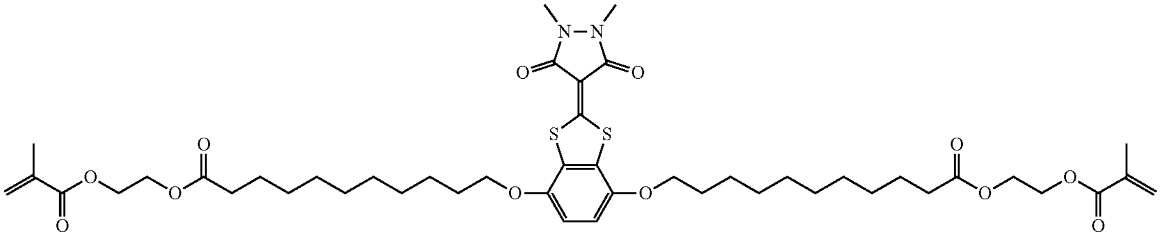

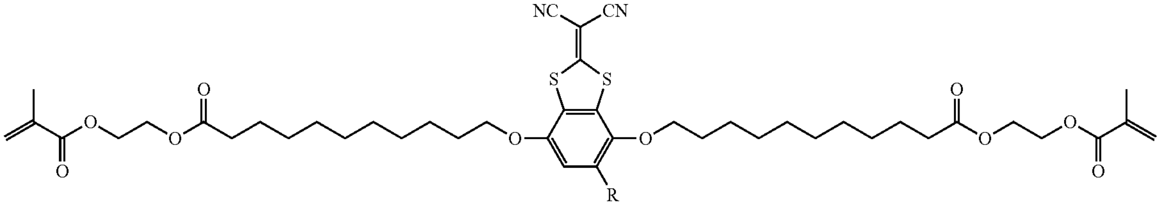

III-1

R = 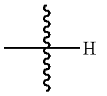

III-2

R = 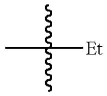

III-3

R = 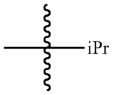

III-4

R = 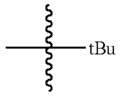

III-5

R = 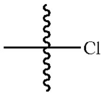

III-6

R = 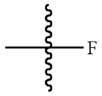

III-7

R = 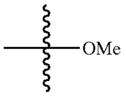

III-8

R = 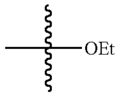

III-9

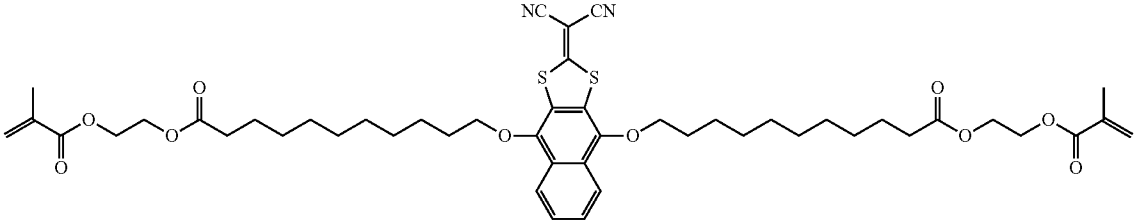

In the present invention, from the viewpoint of adjusting refractive index, a content of the compound represented by General Formula (1) in the curable composition is preferably 20% to 99% by mass, more preferably 25% by mass to 98% by mass, and still more preferably 30% to 96% by mass.

Two or more kinds of the compounds represented by General Formula (1) may be contained in the above-described curable composition. In a case of containing two or more kinds of the compounds represented by General Formula (1), the total content is preferably within the above-described range.

<Other Components>

The above-described curable composition may further include other components in addition to the compound represented by General Formula (1). Examples of the other components include a (meth)acrylate monomer, a polymer having a radically polymerizable group in the side chain, and a polymerization initiator.

((Meth)Acrylate Monomer)

The above-described curable composition may include a (meth)acrylate monomer. The (meth)acrylate monomer may be a polyfunctional (meth)acrylate monomer having two or more (meth)acryloyl groups in the molecule, or may be a monofunctional (meth)acrylate monomer having one (meth) acryloyl group in the molecule. The upper limit of the number of (meth)acryloyl groups included in the (meth) acrylate monomer is not particularly limited, and may be, for example, 8 functional or less.

Specific examples of the (meth)acrylate monomer include the following monomer 1 (phenoxyethyl acrylate), monomer 2 (benzyl acrylate), monomer 3 (tricyclodecanedimethanol diacrylate), and monomer 4 (dicyclopentanyl acrylate). In addition, specific examples thereof include M-1 (1,6-hexanediol diacrylate), M-2 (1,6-hexanediol dimethacrylate), M-3 (benzyl acrylate), M-4 (isobornyl methacrylate), M-5 (dicyclopentanyl methacrylate), M-6 (dodecyl methacrylate), M-7 (2-ethylhexyl acrylate), M-8 (2-hydroxyethyl acrylate), M-9 (hydroxypropyl acrylate), M-10 (4-hydroxybutyl acrylate), M-II (2-ethylhexyl methacrylate), and M-12 (decyl methacrylate). In addition to the above, examples thereof include (meth)acrylate monomers described in paragraphs 0037 to 0046 of JP2012-107191A.

Among the above, as the (meth)acrylate monomer, 2-ethylhexyl methacrylate, decyl methacrylate, or dodecyl methacrylate is preferable, and from the viewpoint of more excellent light resistance and transmittance, decyl methacrylate or dodecyl methacrylate is more preferable.

A molecular weight of the (meth)acrylate monomer is preferably 100 to 500.

Monomer 1

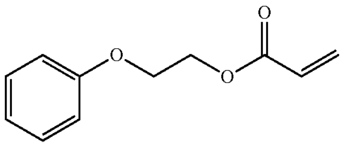

Monomer 2

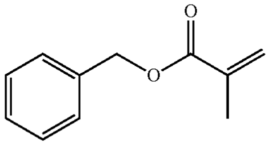

Monomer 3

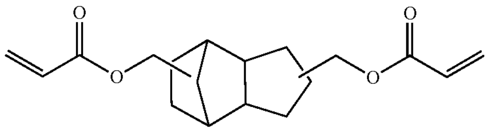

Monomer 4

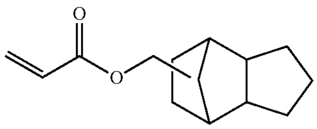

(M-1)

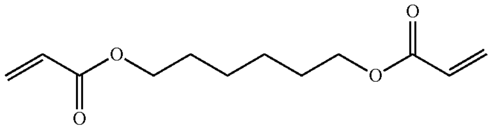

-continued (M-2)

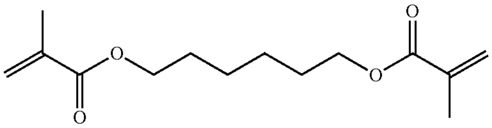

(M-3)

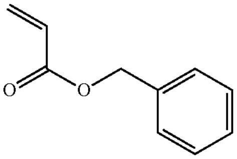

(M-4)

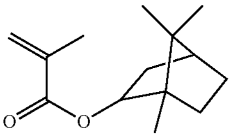

(M-5)

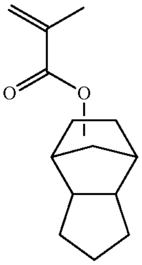

(M-6)

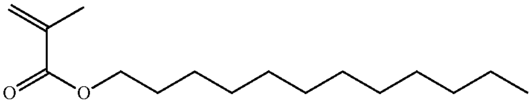

(M-7)

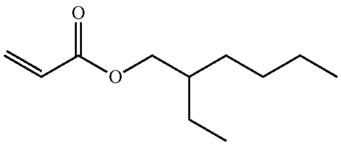

(M-8)

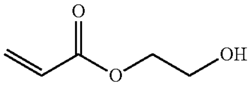

(M-9)

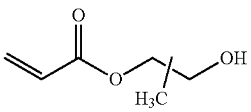

(M-10)

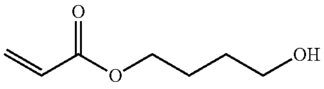

(M-11)

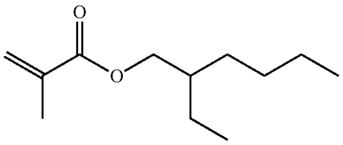

-continued (M-12)

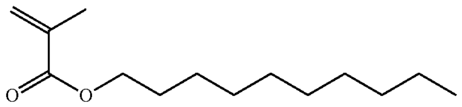

A method for obtaining the (meth)acrylate monomer is not particularly limited, and the (meth)acrylate compound may be obtained commercially or may be synthesized by a conventional method.

In a case of being obtained commercially, for example, Viscoat #192 PEA (monomer 1 described above) (manufactured by OSAKA ORGANIC CHEMICAL INDUSTRY LTD.), Viscoat #160 BZA (monomer 2 described above) (manufactured by OSAKA ORGANIC CHEMICAL INDUSTRY LTD.), Lightester Bz (monomer 2 described above) (manufactured by KYOEISHA CHEMICAL Co., LTD.), A-DCP (monomer 3 described above) (manufactured by Shin-Nakamura Chemical Co., Ltd.), FA-513AS (monomer 4 described above) (manufactured by Hitachi Chemical Co., Ltd.), A-HD-N (M-1 described above) (manufactured by Shin-Nakamura Chemical Co., Ltd.), HD-N (M-2 described above) (manufactured by Shin-Nakamura Chemical Co., Ltd.), FA-BZA (M-3 described above) (manufactured by Hitachi Chemical Co., Ltd.), Lightester IB-X (M-4 described above) (manufactured by KYOEISHA CHEMICAL Co., LTD.), FA-513M (M-5 described above) (manufactured by Hitachi Chemical Co., Ltd.), Lightester L (M-6 described above) (manufactured by KYOEISHA CHEMICAL Co., LTD.), 2EHA (M-7 described above) (manufactured by TOAGOSEI CO., LTD.), HEA (M-8 described above) (manufactured by OSAKA ORGANIC CHEMICAL INDUSTRY LTD.), Lightester HOP-A(N) (M-9 described above) (manufactured by KYOEISHA CHEMICAL Co., LTD.), or 4-HBA (M-10 described above) (manufactured by OSAKA ORGANIC CHEMICAL INDUSTRY LTD.) can be preferably used.

In addition, in a case where it is necessary to increase the hardness and rub resistance of the surface of the cured product, the curable composition preferably includes a polyfunctional (meth)acrylate monomer having three or more (meth)acryloyl groups in the molecule. By including a polyfunctional (meth)acrylate monomer having three or more (meth)acryloyl groups in the molecule, the crosslink density of the cured product can be effectively improved, so that the surface hardness and rub resistance can be increased while maintaining a high partial dispersion ratio. The upper limit of the number of (meth)acryloyl groups in the polyfunctional (meth)acrylate monomer having three or more (meth)acryloyl groups in the molecule is not particularly limited, but is preferably 8 and more preferably 6. In a case of being obtained commercially, for example, A-TMPT (monomer 5), A-TMMT (monomer 6), AD-TMP (monomer 7), and A-DPH (monomer 8) (all manufactured by Shin-Nakamura Chemical Co., Ltd.) can be preferably used.

Monomer 5

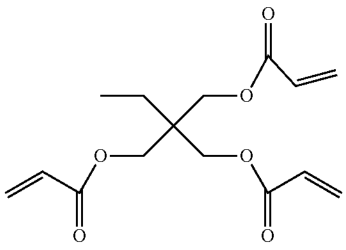

-continued

Monomer 6

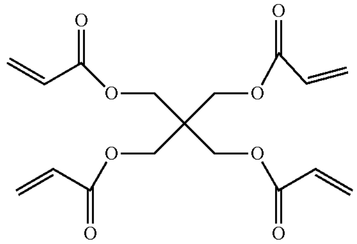

Monomer 7

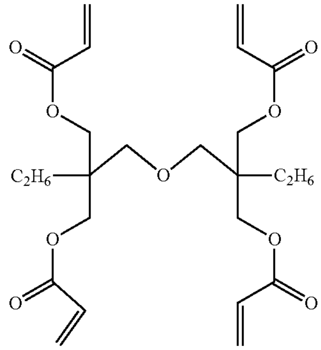

Monomer 8

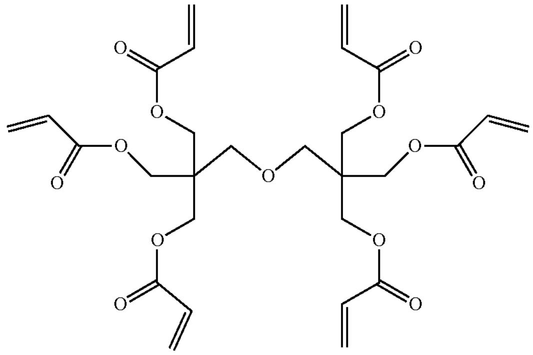

In a case where the curable composition contains a (meth)acrylate monomer, a content of the (meth)acrylate monomer in the curable composition is preferably 1% to 80% by mass, more preferably 2% to 50% by mass, and still more preferably 3% to 40% by mass. By adjusting the amount of the (meth)acrylate monomer in the curable composition, it is possible to adjust a function of relieving a stress in a case where the cured product undergoes a thermal change.

In particular, from the viewpoint of increasing a hardness and rub resistance of a surface of the cured product, in a case where the curable composition includes a polyfunctional (meth)acrylate monomer having three or more (meth)acryloyl groups in the molecule, a content of the polyfunctional (meth)acrylate monomer having three or more (meth)acryloyl groups in the molecule in the curable composition is preferably 5% to 95% by mass, more preferably 10% to 80% by mass, and still more preferably 25% to 70% by mass. In this case, the content of the compound represented by General Formula (1) in the curable composition is preferably 5% to 95% by mass, more preferably 20% to 95% by mass, and still more preferably 30% to 75% by mass. Such a composition can be used as a composition for forming a hard coat.

(Polymer Having Radically Polymerizable Group in Side Chain)

The above-described curable composition may include a polymer having a radically polymerizable group in the side chain. As the polymer having a radically polymerizable group in the side chain, for example, the description of the polymer having a radically polymerizable group in the side chain in [0088] to [0095] of WO2019/044863A can be preferably adopted.

(Polymerization Initiator)

The above-described curable composition preferably includes, as the polymerization initiator, at least one of a thermal radical polymerization initiator or a photoradical polymerization initiator.

(Thermal Radical Polymerization Initiator)

The curable composition preferably includes a thermal radical polymerization initiator. By the action of this thermal radical polymerization initiator, a cured product exhibiting high heat resistance can be molded by thermally polymerizing the above-described curable composition.

As the thermal radical polymerization initiator, a compound usually used as a thermal radical polymerization initiator can be appropriately used according to conditions of a thermopolymerization (heat curing) step described later. Examples thereof include organic peroxides, and specifically, the following compounds can be used.

Examples thereof include 1,1-di(t-hexylperoxy) cyclohexane, 1,1-di(t-butylperoxy) cyclohexane, 2,2-di(4,4-di-(t-butylperoxy)cyclohexyl) propane, t-hexylperoxyisopropyl monocarbonate, t-butylperoxy-3,5,5-trimethylhexanoate, t-butylperoxylaurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, t-butylperoxy-2-ethylhexyl, and 2,3-dimethyl-2,3-diphenylbutane.

In a case of including a thermal radical polymerization initiator, the content of the thermal radical polymerization initiator in the above-described curable composition is preferably 0.01% to 10% by mass, more preferably 0.05% to 5.0% by mass, and still more preferably 0.05% to 2.0% by mass.

(Photoradical Polymerization Initiator)

The curable composition preferably includes a photoradical polymerization initiator. As the photoradical polymerization initiator, a compound usually used as a photoradical polymerization initiator can be appropriately used according to conditions of a photopolymerization (photocuring) step described later, and specifically, the following compounds can be used.

Examples thereof include bis(2,6-dimethoxybenzoyl)-2,4,4-trimethylpentyl phosphine oxide, bis(2,6-dimethylbenzoyl)-2,4,4-trimethylpentyl phosphine oxide, bis(2,4,6-trimethylbenzoyl)-2,4,4-trimethylpentyl phosphine oxide, bis(2,6-dichlorobenzoyl)-2,4,4-trimethylpentyl phosphine oxide, 1-phenyl-2-hydroxy-2-methylpropan-1-one, 1-hydroxycyclohexylphenylketone, 1-(4-isopropylphenyl)-2-hydroxy-2-methylpropan-1-one, 1,2-diphenylethanedione, methylphenyl glyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)-butanone-1,2,4,6-trimethylbenzoyl-diphenyl-phosphine oxide, and bis(2,4,6-trimethylbenzoyl)-phenylphosphine oxide.

Among these, in the present invention, as the photoradical polymerization initiator, 1-hydroxycyclohexylphenylketone (available from BASF as Irgacure 184 (product name)), bis(2,4,6-trimethylbenzoyl)-phenylphosphine oxide (available from BASF as Irgacure 819 (product name)), 2,2,-dimethoxy-1,2-diphenylethan-1-one (available from BASF as Irgacure 651 (product name)), 1-[4-(2-hydroxyethoxy)-phenyl]-2-hydroxy-2-methyl-1-propan-1-one, or 2-methyl-1-(4-methylthiophenyl)-2-morpholinopropan-1-one can be preferably used.

In a case of including a photoradical polymerization initiator, the content of the photoradical polymerization initiator in the above-described curable composition is preferably 0.01% to 5.0% by mass, more preferably 0.05% to 1.0% by mass, and still more preferably 0.05% to 0.5% by mass.

The curable composition preferably includes both photoradical polymerization initiator and thermal radical polymerization initiator. In this case, the total content of the photoradical polymerization initiator and the thermal radical polymerization initiator is preferably 0.01% to 5% by mass, more preferably 0.05% to 1.0% by mass, and still more preferably 0.05% to 0.5% by mass with respect to the total mass of the curable composition.

The curable composition including the compound represented by General Formula (1) may include a polymer or a monomer other than the above-described components, a dispersant, a plasticizer, a heat stabilizer, a release agent, a solvent, or the like as long as the gist of the invention is maintained.

A viscosity of the curable composition including the compound represented by General Formula (1) is preferably 20,000 mPa·s or less, more preferably 15,000 mPa·s or less, still more preferably 13,000 mPa·s or less, and particularly preferably 10,000 mPa·s or less. By setting the viscosity of the curable composition within the above-described range, handleability in a case of molding a cured product can be improved, and a cured product having high quality can be formed. The viscosity of the curable composition is preferably 2,000 mPa·s or more, more preferably 3,000 mPa·s or more, still more preferably 4,000 mPa·s or more, and particularly preferably 5,000 mPa·s or more.

(Indium Tin Oxide Particles)

Preferred examples of the cured product according to the embodiment of the present invention also include a cured product of the above-described curable resin composition containing the compound represented by General Formula (1), which contains indium tin oxide (in the present invention, also abbreviated as "ITO") particles.

A curable resin composition according to the embodiment of the present invention, which is used for preparing the above-described cured product, (hereinafter, simply referred to as a "curable resin composition according to the embodiment of the present invention") includes the above-described compound represented by General Formula (1) and ITO particles. By adding ITO particles to the curable resin composition, it is possible to obtain a cured product having a lower refractive index as the wavelength in the visible light region is longer.

In addition to the above-described compound represented by General Formula (1) and the ITO particles, the curable resin composition according to the embodiment of the present invention may contain other components which may be contained in the above-described curable composition, a polymer dispersant described later, and the like. For the other components which may be contained in the above-described curable composition, the description of the content of each component in the curable composition can be read as the content in the curable resin composition according to the embodiment of the present invention.

A particle diameter of the ITO particles is preferably 5 to 50 nm. By setting the particle diameter to 50 nm or less, it is possible to prevent deterioration of transmittance due to Rayleigh scattering. In addition, by setting the particle diameter to 5 nm or more, it is possible to perform a production of the ITO particles without technical difficulty. The particle diameter of the ITO particles can be obtained by averaging particle diameters which are measured by a transmission electron microscope (TEM). That is, a minor axis and a major axis of one particle in an electron micrograph imaged by TEM are measured, and the average value thereof is determined as a particle diameter of one particle. In the present invention, particle diameters of 500 particles are randomly obtained, and the average value (arithmetic mean) of these 500 particle diameters is calculated and used as an average primary particle diameter.

The curable resin composition according to the embodiment of the present invention is preferably prepared by mixing ITO particles dispersed in a solvent with the above-described compound represented by General Formula (1) and a polymer (dispersant) described later. After mixing, the solvent used for dispersing the ITO particles may or may not be removed from the curable resin composition by distillation or the like, but it is preferable to be removed.

The dispersibility of the ITO particles in a solvent can be improved by using surface-modified ITO particles. The surface modification of the ITO particles is preferably performed using, for example, a monocarboxylic acid having 6 to 20 carbon atoms as a surface-modified compound. As the surface modification of the ITO particles with a monocarboxylic acid, it is preferable that a carboxy group derived from the monocarboxylic acid forms an ester bond with an oxygen atom on the surface of the ITO particles, or the carboxy group is coordinated with In or Ti atom.

Examples of the monocarboxylic acid having 6 to 20 carbon atoms include oleic acid (having 18 carbon atoms), stearic acid (having 18 carbon atoms), palmitic acid (having 16 carbon atoms), myristic acid (having 14 carbon atoms), and decanoic acid (having 10 carbon atoms), and oleic acid (having 18 carbon atoms) is preferable.

In the curable resin composition, a moiety derived from the surface-modified compound in the ITO particles (for example, a group derived from a monocarboxylic acid having 6 to 20 carbon atoms) bonded to the ITO particles by the above-described surface modification may be bonded to the ITO particles as it is, a part thereof may be substituted with a group derived from a polymer described later, or all may be substituted with groups derived from a polymer described later. In the curable resin composition according to the embodiment of the present invention, it is preferable that both the moiety derived from the surface-modified compound (for example, a group derived from a monocarboxylic acid having 6 to 20 carbon atoms) and the group derived from the polymer described later are bonded to the surface of the ITO particles.

As the solvent, a solvent, in which a constituent (δp) of a polarity element in a solubility parameter (SP value) is 0 to 6 $MPa^{(1/2)}$, is preferable.

The constituent (δp) of the polarity element in the SP value is a value calculated by the Hansen solubility parameter. The Hansen solubility parameter is constituted of intermolecular dispersive force energy (δd), intermolecular polar energy (δp), and intermolecular hydrogen bonding energy (δh). In the present invention, the Hansen solubility parameter is a value calculated using HSPiP (version 4.1.07) software.

Specifically, the solvent is preferably toluene (1.4), xylene (1.0), or hexane (0), and more preferably toluene. The value in the parentheses is a value of δp, and the unit is $MPa^{(1/2)}$.

A method for producing the ITO particles is not particularly limited, and for example, the ITO particles can be produced according to the procedure described in ACS Nano 2016, 10, pp. 6942 to 6951. According to the procedure of the reference, a dispersion liquid of surface-modified ITO particles is obtained.

Specifically, a solution obtained by mixing a monocarboxylic acid having 6 to 20 carbon atoms, an indium salt (for example, indium acetate), and a tin salt (for example, tin acetate) is added dropwise to an alcohol (long-chain alcohol such as oleyl alcohol) heated to high temperature, and the mixture is retained at high temperature, thereby capable of forming particles.

Thereafter, a poor solvent (lower alcohol such as ethanol) having low polymer solubility is added thereto to precipitate the particles, the supernatant is removed, and the particles are redispersed in the above-described solvent such as toluene, thereby capable of forming a dispersion liquid of surface-modified ITO particles.

A content proportion of the ITO particles in the curable resin composition according to the embodiment of the present invention is preferably 10% to 70% by mass, more preferably 10% to 60% by mass, and still more preferably 20% to 50% by mass.

(Polymer Dispersant)

The curable resin composition according to the embodiment of the present invention preferably includes a polymer which functions as a dispersant in the curable resin composition (hereinafter, this polymer is also referred to as a "polymer dispersant"). The polymer dispersant has a constitutional unit represented by General Formula (P) and also has an acidic group at one terminal of a polymer chain.

General Formula (P)

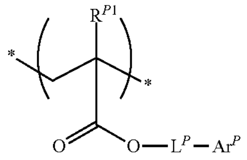

In the formula, $L^P$ represents a single bond or a divalent linking group, $Ar^P$ represents an aryl group, $R^{P1}$ represents a hydrogen atom or a methyl group, $Ar^P$ does not include the acidic group, and * represents a bonding portion for incorporation into a polymer main chain.

As the aryl group of $Ar^P$, a phenyl group, a 1-naphthyl group, or a 2-naphthyl group is preferable. Preferred examples of the substituent which may be included in the aryl group include an alkyl group, an alkoxy group, and an aryl group.

It is preferable that the methyl group which can be adopted as $R^{P1}$ does not include the above-described acidic group as a substituent.

The above-described polymer dispersant is a polymer which has an acidic group exhibiting an adsorbing group for the ITO particles at one terminal of the polymer chain and also has the constitutional unit represented General Formula (P) including $Ar^P$ (aryl group). Since the curable resin composition according to the embodiment of the present invention contains the above-described polymer dispersant together with the ITO particles and the compound represented by General Formula (1), a compatibility of components increases due to a π-π interaction between $Ar^P$ included in the side chain of the polymer dispersant and the aromatic ring included in the compound represented by General Formula (1), an interaction between the acidic group of the polymer dispersant and the ITO particles, and the like, and it is considered that a dispersion stability of the composition is effectively enhanced. Since the curable resin composition according to the embodiment of the present invention contains the above-described polymer dispersant, it is possible to enhance a dispersibility of the curable resin composition during preparation and also possible to sufficiently enhance a medium- to long-term dispersion stability.

As the acidic group included in the polymer dispersant at one terminal of the polymer chain, it is preferable to select from a carboxy group (—COOH), a phosphono group (—$PO(OH)_2$), a phosphonooxy group (—$OPO(OH)_2$), a hydrohydroxyphosphoryl group (—PH(O)(OH)), a sulfino group (—SO(OH)), a sulfo group (—$SO_2(OH)$), or a sulfanyl group (—SH).

The other terminal of the polymer chain in the above-described polymer dispersant is not particularly limited as long as the desired dispersibility can be obtained, but it is preferable that the other terminal thereof does not have an acidic group, and the other terminal thereof can be, for example, a hydrogen atom, an alkyl group, or the like.

For convenience of synthesis, the above-described polymer dispersant may include a small amount of a polymer having acidic groups at both terminals of the polymer chain, in addition to the polymer having an acidic group at one terminal of the polymer chain. However, as long as the above-described polymer dispersant is substantially composed of the polymer having an acidic group at one terminal of the polymer chain, even in a case where the above-described polymer having acidic groups at both terminals is included, the dispersion stability of the composition can be enhanced.

In addition, the above-described polymer dispersant may include an acidic group in the side chain of the polymer chain as long as the desired dispersibility is obtained. However, in a case where the side chain includes an acidic group, it is preferable not to include the acidic group because the ITO particles tend to aggregate.

The above-described acidic group exhibits an adsorption action on a surface of the indium tin oxide particles by at least any of an ionic bond, a covalent bond, a hydrogen bond, or a coordinate bond.

From the viewpoint of further improving the medium- to long-term dispersion stability, the above-described acidic group is more preferably a carboxy group, a phosphono group, or a phosphonooxy group, and still more preferably a carboxy group.

In General Formula (P), examples of the divalent linking group which can be adopted as L include an alkylene group, *-(alkylene-O)$_n$—, and ester (—O—(C═O)—). The number of carbon atoms in the alkylene moiety is preferably 1 to 4 and more preferably 1 or 2. n is preferably 1 to 10, more preferably 1 to 6, still more preferably 1 or 2, and particularly preferably 1.

$L^P$ is preferably an alkylene group or *-(alkylene-O)$_n$—, and more preferably a single bond, —$CH_2$—, *—$CH_2O$—, or *—$CH_2CH_2O$—.

* in the above description of $L^P$ represents a bonding site on a side which does not bond with $Ar^P$.

A main chain skeleton portion of the above-described polymer dispersant may be linear or branched. Among these, it is preferable to be linear.

As long as the desired dispersibility is obtained, the above-described polymer dispersant may have a constitutional unit represented by General Formula (P2) in addition to the constitutional unit represented by General Formula (P).

General Formula (P2)

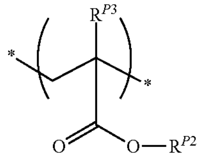

In the formula, $R^{P3}$ represents a hydrogen atom or a methyl group, and $R^{P2}$ represents a monovalent substituent. However, $R^{P2}$ is not -$L^P$-$Ar^P$ in General Formula (P) described above. * represents a bonding portion for incorporation into a polymer main chain.

$R^{P2}$ is preferably an alkyl group or an alicyclic hydrocarbon group, and more preferably an alkyl group. From the viewpoint of suppressing aggregation of the ITO particles, the monovalent substituent which can be adopted as $R^{P2}$ preferably does not include the above-described acidic group. The number of carbon atoms in this alkyl group is preferably 1 to 20, more preferably 1 to 12, and still more preferably 1 to 8.

It is preferable that the methyl group which can be adopted as $R^{P3}$ does not include the above-described acidic group as a substituent.

In the above-described polymer dispersant, it is preferable that the main chain structure and the side chain structure are composed of the constitutional unit represented by General Formula (P), and it is also preferable to be composed of the constitutional unit represented by General Formula (P) and the constitutional unit represented by General Formula (P2). In addition, as long as the desired dispersibility is obtained, the above-described polymer dispersant may have a constitutional unit different from the constitutional units represented by General Formula (P) and General Formula (P2) (constitutional unit derived from a monomer having an ethylenically unsaturated bond, which is not the constitutional unit represented by each of General Formulae (P) and (P2)). In a case where the above-described polymer dispersant is a copolymer, it may be either random or block.

A proportion of General Formula (P) to all constitutional units constituting the above-described polymer dispersant is not particularly limited, but is preferably 5 mol % or more, for example. From the viewpoint of further improving the medium- to long-term dispersion stability, the above-described proportion is more preferably 10 mol % or more and still more preferably 15 mol % or more. The upper limit value of this proportion is not particularly limited, and it is also preferable that all constitutional units in the above-described polymer dispersant are the constitutional unit represented by General Formula (P).

In a case where the above-described polymer dispersant contains the constitutional unit represented by General Formula (P2), a proportion of General Formula (P2) to all constitutional units constituting the polymer dispersant is, for example, preferably 95 mol % or less, more preferably 90 mol % or less, and still more preferably 85 mol % or less. The lower limit value of the above-described proportion in a case of containing the constitutional unit represented by General Formula (P2) is not particularly limited, and may be more than 0 mol %.

The constitutional unit constituting the above-described polymer dispersant means a constitutional unit derived from a monomer component, and can be calculated from a content ratio of the monomer component.

The content of the constitutional unit represented by General Formula (P) in the above-described polymer dispersant is not particularly limited, but is preferably, for example, 20% by mass or more. From the viewpoint of further improving the medium- to long-term dispersion stability, the above-described content is more preferably 30% by mass or more and still more preferably 50% by mass or more. The upper limit value of this content is not particularly limited, and it is also preferable that all constitutional units in the above-described polymer dispersant are the constitutional unit represented by General Formula (P).

The above-described polymer dispersant preferably has, at one terminal of the polymer chain, a structural portion represented by General Formula (PA) as a structural portion including the above-described acidic group.

General Formula (PA)

$$(A^P)_x\text{—LL—S—*}$$

In the formula, $A^P$ represents an acidic group, LL represents a single bond or an (x+1)-valent linking group, and x represents an integer of 1 to 8. * represents a bonding position with the rest of the polymer dispersant.

The acidic group which can be adopted as $A^P$ has the same meaning as the acidic group described above, and the preferred aspect thereof is also the same.

Examples of the (x+1)-valent linking group which can be adopted as LL include an (x+1)-valent saturated fatty acid hydrocarbon group (group obtained by removing x+1 hydrogen atoms from alkane) and an (x+1)-valent alicyclic hydrocarbon group (group obtained by removing x+1 hydrogen atoms from alicyclic hydrocarbon). In addition, examples thereof include an (x+1)-valent group consisting of a combination of these groups and a bond selected from —O—, —(C═O)—O—, or —(C═O)—NH—. LL is preferably an (x+1)-valent alkane or a group consisting of a combination of an (x+1)-valent alkane and —O—.

x is preferably an integer of 1 to 6, more preferably an integer of 2 to 4, and still more preferably an integer of 2.

The structure represented by General Formula (PA) is preferably a structure represented by General Formula (PA1), and from the viewpoint of improving the adsorptivity to the ITO particles by having a carboxy group in the adjacent site, more preferably a structure represented by Formula (PA2).

General Formula (PA1)

$$(\text{HOOC})_x\text{---LL----S----*}$$

Formula (PA2)

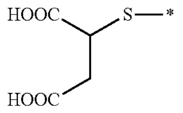

LL and x in the formulae have the same meaning as LL and x in General Formula (PA) described above. * represents a bonding position with the rest of the polymer dispersant.

An acid value of the above-described polymer dispersant is preferably 2.0 mgKOH/g or more and less than 100 mgKOH/g, more preferably 2.0 mgKOH/g or more and less than 70 mgKOH/g, and still more preferably 10 mgKOH/g or more and less than 50 mgKOH/g. The acid value means the number in mg of potassium hydroxide required to neutralize acid components present in 1 g of the polymer.

By adjusting the molecular weight of the polymer dispersant and the number of acidic groups such as a carboxy group so that the acid value of the polymer dispersant is within the above-described preferred range, it is possible to achieve both appropriate viscosity and particle dispersion performance as the curable resin composition. In a case where the acid value of the polymer dispersant is 2.0 mgKOH/g or more, the polymer dispersant can be sufficiently adsorbed and dispersed on the ITO particles. In addition, in a case where the acid value of the polymer dispersant is less than the above-described preferred upper limit value, the number and the molecular size of adsorptive groups can be adjusted to adjust the viscosity of the curable resin composition to an appropriate range.

A weight-average molecular weight of the above-described polymer dispersant is not particularly limited, but for example, is preferably 1000 to 30000, and from the viewpoint of further improving the medium- to long-term dispersion stability, more preferably 1000 to 20000, still more preferably 1000 to 15000, and particularly preferably 1000 to 13000. By setting the weight-average molecular weight of the polymer dispersant to 1000 or more, it is possible to suppress mixing of air bubbles generated during curing the curable resin composition. In addition, by setting the weight-average molecular weight of the polymer dispersant to the above-described preferred upper limit value or less, the fluidity is less likely to decrease even in a case where an amount necessary for dispersing the ITO particles is added to the curable resin composition, and even in a case of forming a cured product having a diffraction grating shape, air gaps are unlikely to occur in a level difference of the mold.

Specific examples of the above-described polymer dispersant are listed below, the structure thereof is not limited to these. Although the specific examples shown below are all homopolymers, the above-described polymer dispersant may be a copolymer and may have a constitutional unit other than the constitutional unit represented by General Formula (P). In addition, the specific examples shown below have a structural portion including an acidic group at one terminal, and the other terminal is a methyl group, but a group other than the methyl group may be used. n has the same meaning as n in $L^P$ of General Formula (P) described above.

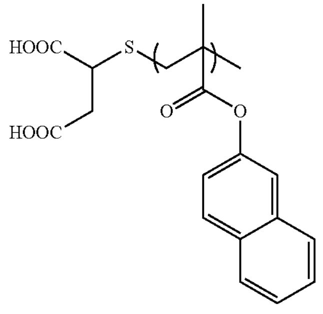

-continued

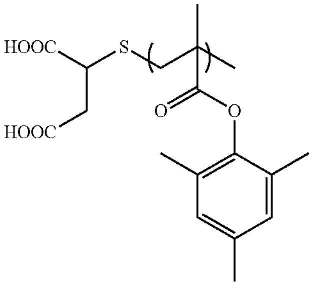

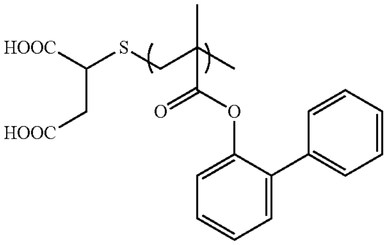

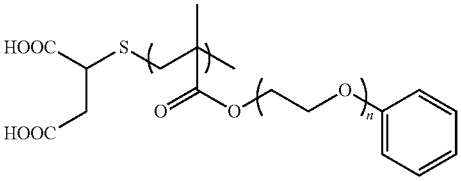

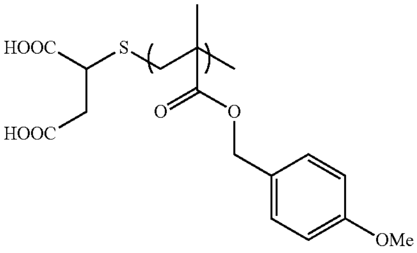

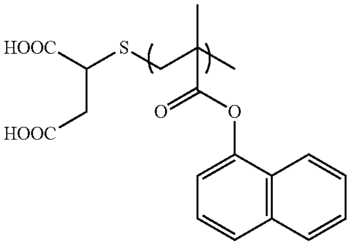

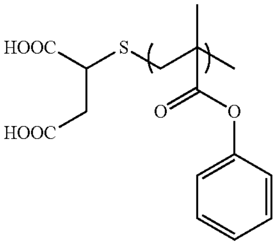

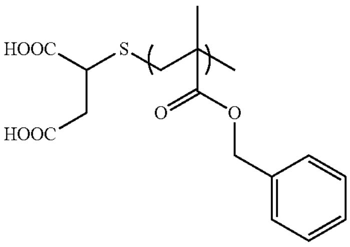

-continued

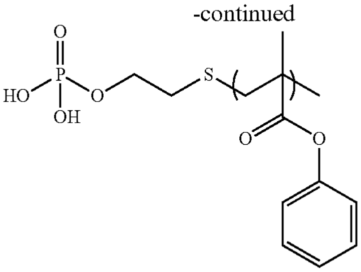

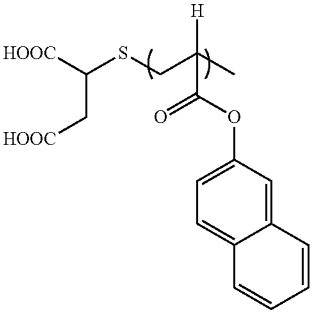

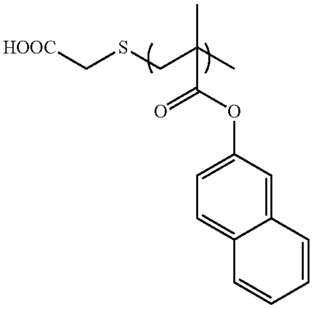

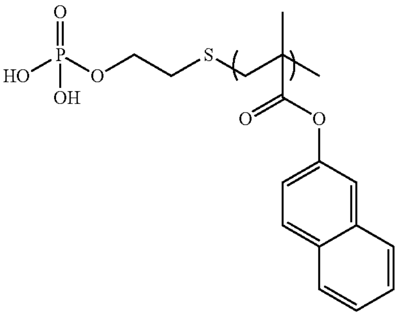

The above-described polymer dispersant can be produced by a conventional method. For example, the polymer dispersant can be produced by a reaction between a (meth) acrylate monomer and a compound capable of terminating the polymerization reaction of this monomer and having an acidic group. Examples of such compounds include mercaptosuccinic acid, mercaptooxalic acid, and mercaptomalonic acid, and mercaptosuccinic acid is preferable. In addition, with regard to a polymer dispersant having a phosphonooxy group at one terminal, a method described in JP 1994-20261A (JP-H6-20261A) can be referred to.

In the curable resin composition according to the embodiment of the present invention, a content of the polymer dispersant is preferably 1 to 50 parts by mass, more preferably 3 to 30 parts by mass, and still more preferably 4 to 20 parts by mass with respect to 100 parts by mass of the content of the ITO particles. By setting the content ratio to the above-described preferred range, it is possible to suppress the mixing of air bubbles generated during curing while stably dispersing the ITO particles in the curable resin composition.

[Method for Producing Cured Product]

The cured product according to the embodiment of the present invention can be produced by a method including at least one of a step of photocuring the above-described curable composition or a step of thermosetting the above-described curable composition. Among these, a method for producing the cured product preferably includes a step of forming a semi-cured product by irradiating the curable composition with light or heating the curable composition; and a step of forming a cured product by irradiating the obtained semi-cured product with light or heating the obtained semi-cured product.

The same applies in a case where the curable resin composition according to the embodiment of the present invention is used in place of the above-described curable composition.

As each of the "step of forming a semi-cured product", the "step of forming a cured product", and the "semi-cured product", the description of the "step of forming a semi-cured product", the "step of forming a cured product", and the "semi-cured product" in [0106] to [0117], [0118] to [0124], and [0125] of WO2019/044863A can be adopted as they are.

[Use of Cured Product]

Since the cured product according to the embodiment of the present invention has a low birefringence index and excellent light resistance, the cured product according to the embodiment of the present invention can be used for various uses. For example, the cured product according to the embodiment of the present invention can be used as a coating layer such as a hard coat layer.

In addition to the above, the cured product according to the embodiment of the present invention, which has a low Abbe number (νd) and a high partial dispersion ratio (θg, F), can be preferably used for an optical member, and more preferably used for an optical member in which a light resistance is required.

In addition, the cured product according to the embodiment of the present invention, which contains the ITO particles, is preferably used as a material for producing a diffractive optical element. In particular, the resin composition according to the embodiment of the present invention is used as a material for producing a low Abbe number diffractive optical element in a multilayer diffractive optical element, and can provide excellent diffraction efficiency.

[Optical Member]

A type of optical member is not particularly limited, but the cured product of the embodiment of the present invention can be suitably used especially for light-transmissive optical members (so-called passive optical members). Examples of optically-functional devices including such optical members include various types of display devices (a liquid crystal display, a plasma display, and the like), various types of projector devices (an overhead projector (OHP), a liquid crystal projector, and the like), optical fiber communication devices (an optical waveguide, a light amplifier, and the like), image-capturing devices such as a camera and a video, and the like.

Examples of passive optical members include lenses, prisms, prism sheets, panels (plate-like molded objects), films, optical waveguides (a film-like optical waveguide, a fiber-like optical waveguide, and the like), optical discs, LED sealants, and the like. The passive optical member may have an optionally coating layer or an optionally additional functional layer as necessary. For example, the passive optical member may have a protective layer for preventing mechanical damage of a coating surface caused by friction or abrasion; a light-absorbing layer for absorbing a light having an undesirable wavelength which is a cause of degradation of inorganic particles, base materials, and the like; a permeation blocking layer for inhibiting or preventing permeation of reactive small molecules such as moisture or oxygen gas; an antiglare layer; an antireflection layer; a layer of low refractive index; and the like. Specific examples of coating layers include a transparent conductive film or gas barrier film consisting of an inorganic oxide coating layer or inorganic nitride coating layer, a gas barrier film or hard coat film consisting of an organic coating layer, and the like. As a coating method for forming the coating layer, it is possible to use a known coating method such as a vacuum deposition method, a CVD method, a sputtering method, a dip coating method, and a spin coating method.

[Lens Base Material]

The optical member may be a lens base material. That is, the cured product according to the embodiment of the present invention may be used as a lens base material. In the present specification, the "lens base material" refers to a single member capable of exhibiting a lens function. The lens base material manufactured using the cured product according to the embodiment of the present invention exhibits a low Abbe number and a high partial dispersion ratio. Preferably, by suitably adjusting the type of monomer constituting the curable composition, it is possible to control a refractive index of the lens base material in an arbitrary value, and furthermore, it is possible to obtain the lens base material having high refractive properties, light transmittance, and lightweight properties.

A film or a member can be provided on the surface or the periphery of the lens base material depending on the environment in which the lens is used or the use of the lens. For example, a protective film, an anti-reflection film, a hard coat film, and the like can be formed on the surface of the lens base material. In addition, a lens base material manufactured using the cured product according to the embodiment of the present invention can be made into a composite lens laminated with one or more other lens base materials selected from a glass lens base material and a plastic lens base material.

The periphery of the lens base material may be fitted into be fixed in a base-material-holding frame or the like. However, these films, frames, and the like are members added to the lens base material, and are distinguished from the lens base material itself in the present specification.

In a case of using the lens base material for lenses, the lens base material itself may be used as a lens by itself, or additional films or frames or additional lens base materials may be added thereto for use as a lens, as described above. The type and a shape of a lens formed of the lens base material are not particularly limited, but the maximum thickness thereof is preferably 0.1 to 10 mm. The maximum thickness is more preferably 0.1 to 5 mm and still more preferably 0.15 to 3 mm. In addition, the lens base material is preferably a circular shape having the maximum diameter of 1 to 1000 mm. The maximum diameter thereof is more preferably 2 to 200 mm and still more preferably 2.5 to 100 mm.

The lens base material is preferably used as an image pick-up lens in a mobile phone, a digital camera, or the like, an imaging lens in a television, a video camera, or the like, and an in-vehicle lens or an endoscopic lens.

[Lens Adhesive]

The cured product according to the embodiment of the present invention can be used as an adhesive for adhering two lenses (hereinafter, also referred to as a lens adhesive) to manufacture a cemented lens.

In the cemented lens, since the cured product according to the embodiment of the present invention has excellent light resistance, the cured product according to the embodiment of the present invention functions as an UV-cutting adhesive, and it is possible to protect a member located inside the adhesive, for example, an optical member such as a lens formed of a cured resin product, from ultraviolet rays and the like. In addition, since the cured product according to the embodiment of the present invention exhibits excellent adhesiveness even after a light irradiation test, the cured product according to the embodiment of the present invention can be suitably used as an adhesive.

The above-described cemented lens can be obtained by superimposing two lenses through the above-described curable composition and then curing the curable composition to form an adhesive layer composed of the cured product according to the embodiment of the present invention. It is preferable that the curing is performed after the above-described superposition and after removing air bubbles mixed in the curable composition.

The curing of the curable composition can be performed by light irradiation or heating. The curing is preferably performed by carrying out at least light irradiation. In addition, a step of further heating may be performed after light irradiation. The above description can be appropriately referred to for the curing step.

A thickness of the adhesive layer is preferably 10 to 50 μm and more preferably 20 to 30 μm. By setting the thickness to 10 μm or more, a light resistance effect, that is, an effect of absorbing ultraviolet rays (UV) can be sufficiently obtained. In addition, by setting the thickness to 50 μm or less, it is possible to improve transmittance in a short wavelength range (400 to 430 nm) of visible light while exhibiting high adhesiveness.

A refractive index of the adhesive layer at a wavelength of 587 nm is preferably 1.51 or more, more preferably 1.53 or more, and still more preferably 1.55 or more. The reason for this is because a difference in refractive indices from a lens to be cemented is small.

In addition, a cutoff wavelength of the adhesive layer having a film thickness of 30 μm is preferably 380 nm or less, more preferably 385 nm or less, and still more preferably 390 nm or less. A wavelength at which a transmittance of the adhesive layer is 0.5% or less is defined as the cutoff wavelength. The transmittance of the adhesive layer can be measured using a spectrophotometer (for example, UV-2550 manufactured by Shimadzu Corporation).

The refractive index and the cutoff wavelength of the adhesive layer can be adjusted within the above-describe range by the content of the compound component represented by General Formula (1) in the lens adhesive.

[Diffractive Optical Element]

The diffractive optical element according to an embodiment of the present invention is a diffractive optical element including a surface which has a diffraction grating shape formed of the cured product according to the embodiment of the present invention, which contains the ITO particles, and is formed by curing the curable resin composition according to the embodiment of the present invention, which contains the compound represented by General Formula (1) and the ITO particles.

The diffractive optical element according to the embodiment of the present invention preferably has a maximum thickness of 2 μm to 100 μm. The maximum thickness is more preferably 2 μm to 50 μm and particularly preferably 2 μm to 30 μm. In addition, a level difference (lattice thickness) of the diffraction grating shape (periodic structure) included in the diffractive optical element is preferably 1 μm to 100 μm and more preferably 1 μm to 50 μm. Furthermore, it is sufficient that a pitch of the diffraction grating shape included in the diffractive optical element is in a range of 0.1 mm to 10 mm, and it is preferable that the pitch is changed according to the required optical aberration in the same diffractive optical element.

The diffractive optical element can be produced according to, for example, the following procedure.

The curable resin composition is sandwiched between a surface of a mold, which is processed into a diffraction grating shape, and a transparent substrate. Thereafter, the curable resin composition may be pressurized and stretched to a desired range. In the sandwiched state, the curable resin composition is irradiated with light from the transparent substrate side to cure the curable resin composition. Thereafter, the cured product is released from the mold. After the mold release, the cured product may be further irradiated with light from the side opposite to the transparent substrate side.

Examples of the transparent substrate include a flat glass, and a flat transparent resin (such as (meth)acrylic resin, polycarbonate resin, and polyethylene terephthalate).

The transparent substrate used in the above-described production may be included in the diffractive optical element as it is, or may be peeled off.

The surface of the mold, which is processed into a diffraction grating shape, is preferably a chromium nitride-treated surface. As a result, good mold releasability can be obtained, and the producing efficiency of the diffractive optical element can be improved.

Examples of the chromium nitride treatment include a method for forming a chromium nitride film on the mold surface. As the method for forming a chromium nitride film on the mold surface, a chemical vapor deposition (CVD) method and a physical vapor deposition (PVD) method can be exemplified. The CVD method is a method in which a raw material gas including chromium and a raw material gas including nitrogen are reacted at a high temperature to form a chromium nitride film on a surface of a base substance. In addition, the PVD method is a method (arc-type vacuum vapor deposition method) for forming a chromium nitride film on a surface of a base substance using arc discharge. The arc-type vacuum vapor deposition method is a method for forming a film of a compound by reacting ionized metals with a reaction gas on the surface of the base substance. Specifically, a cathode (evaporation source) formed with, for example, chrome in a vacuum container, is disposed, arc discharge occurs between the cathode and a wall surface of the vacuum container through a trigger, ionization of metal by arc plasma is performed at the same time of evaporating the cathode, a negative voltage is applied to the base substance, and a reaction gas (for example, nitrogen gas) is introduced into the vacuum container at approximately several tens mTorr (1.33 Pa).

As the light used for the light irradiation curing the curable resin composition, ultraviolet light or visible light preferable and ultraviolet light is more preferable. For example, a metal halide lamp, a low pressure mercury lamp, a high pressure mercury lamp, an ultra-high pressure mercury lamp, a germicidal lamp, a xenon lamp, a light emitting diode (LED) light source lamp, and the like are suitably used. The illuminance of ultraviolet light used for the light irradiation curing the curable resin composition is preferably 1 to 100 $mW/cm^2$, more preferably 1 to 75 $mW/cm^2$, and still more preferably 5 to 50 $mW/cm^2$. The curable resin composition may be irradiated with ultraviolet light having different illuminance multiple times. The exposure amount of ultraviolet light is preferably 0.4 to 10 $J/cm^2$, more preferably 0.5 to 5 $J/cm^2$, and still more preferably 1 to 3 $J/cm^2$. The atmosphere during the light irradiation is preferably an atmosphere replaced with air or an inert gas, and more preferably an atmosphere in which air is replaced with nitrogen until the oxygen concentration is 1% or less.

[Multilayer Diffractive Optical Element]

The multilayer diffractive optical element according to an embodiment of the present invention includes a first diffractive optical element and a second diffractive optical element, in which the first diffractive optical element is a diffractive optical element formed of the cured product according to the embodiment of the present invention, and the surface of the first diffractive optical element, which has a diffraction grating shape, and a surface of the second diffractive optical element, which has a diffraction grating shape, face each other. It is preferable that the surfaces having the diffraction grating shapes are in contact with each other.

It is preferable that a multilayer diffractive optical element is formed by including, as a first diffractive optical element, the diffractive optical element formed by curing the curable resin composition according to the embodiment of the present invention, and further overlapping a second diffractive optical element formed of a different material such that the first diffractive optical element and the second diffractive optical element face each other in lattice-shaped surfaces. In this case, it is preferable that the lattice-shaped surfaces are in contact with each other.

By forming the second diffractive optical element with a material having a higher refractive index and higher Abbe number than the first diffractive optical element, it is possible to suppress the occurrence of flare, and the like, and sufficiently utilize a chromatic aberration reducing effect of the multilayer diffractive optical element.

An Abbe number νd of the second diffractive optical element is not particularly limited, but is preferably more than 30, more preferably 35 or more, and still more preferably 40 or more. In addition, the Abbe number νd of the second diffractive optical element is not particularly limited, but is preferably 70 or less, more preferably 60 or less, and still more preferably 50 or less. Among these, the Abbe number νd of the second diffractive optical element is preferably 35 to 60.

A refractive index nd of the second diffractive optical element is preferably 1.55 to 1.70 and more preferably 1.56 to 1.65. In addition, the refractive index nd of the second diffractive optical element is larger than the refractive index nd of the first diffractive optical element simultaneously used in the multilayer diffractive optical element, that is, it is satisfied that the refractive index nd of the second diffractive optical element>the refractive index nd of the first diffractive optical element.

The material for forming the second diffractive optical element is not particularly limited as long as a cured product having a high refractive index and a high Abbe number is obtained. For example, a curable resin composition including a (meth)acrylate monomer having a sulfur atom, a halogen atom, an aromatic structure, a curable resin composition including zirconium oxide and a (meth)acrylate monomer, and the like can be used.

The multilayer diffractive optical element can be produced according to, for example, the following procedure.

A material for forming the second diffractive optical element is sandwiched between a diffraction grating shape surface (surface obtained after the mold release) of a diffractive optical element formed by curing the curable resin composition according to the embodiment of the present invention, and a transparent substrate. Thereafter, the material may be pressurized and stretched to a desired range. In the sandwiched state, the material is irradiated with light from the transparent substrate side to cure the material. Thereafter, the cured product is released from the mold.

That is, as the multilayer diffractive optical element according to the embodiment of the present invention, it is preferable that the first diffractive optical element, the second diffractive optical element, and the transparent substrate are arranged in this order.

Examples of the transparent substrate include the same examples as the transparent substrate used in a case of producing the diffractive optical element (first diffractive optical element).

The transparent substrate used in the above-described production may be included in the multilayer diffractive optical element as it is, or may be peeled off.

The multilayer diffractive optical element preferably has a high diffraction efficiency. For example, the diffraction efficiency of the multilayer diffractive optical element with the primary light at the d line (wavelength: 587 nm), the F line (486 nm), and the C line (656 nm) is preferably 95% or more. The diffraction efficiency with the primary light can be calculated, for example, by a method described in Examples described later.

Since the diffraction efficiency of the multilayer diffractive optical element with the primary light shows high diffraction efficiency in the d line, F line, and C line, the diffraction efficiency of primary light in the entire visible light region is approximately 95% or more, unnecessary diffracted light can be sufficiently suppressed, and a high-performance lens can be realized.

The multilayer diffractive optical element preferably has a maximum thickness of 50 μm to 20 mm. The maximum thickness is more preferably 50 μm to 10 mm and particularly preferably 50 μm to 3 mm.

[Lens]

The above-described diffractive optical element and multilayer diffractive optical element can be used as a lens, respectively.

A film or a member can be provided on the surface or the periphery of the lens depending on the environment in which the lens is used or the use of the lens. For example, a protective film, an anti-reflection film, a hard coat film, and the like can be formed on the surface of the lens. In addition, the lens can be used as a composite lens in which a glass lens or a plastic lens is laminated on the lens. Furthermore, the periphery of the lens can be fitted into a base material holding frame or the like, and fixed. However, these films, frames, and the like are members added to the lens, and are distinguished from the lens itself in the present specification.

The lens is preferably used as an image pick-up lens in a mobile phone, a digital camera, and the like, an imaging lens in a television, a video camera, and the like, and an in-vehicle lens.

EXAMPLE

Hereinafter, the present invention will be described in more detail based on Examples. The materials, amounts used, proportions, treatment details, treatment procedures, and the like described in the following examples can be appropriately modified as long as the gist of the invention is maintained. Therefore, the scope of the present invention should not be construed as being limited to the following specific examples.

All steps from the preparation of the curable composition to the test of the cured product were carried out in an environment where a yellow lamp was used as lighting. The same applies to the curable resin composition.

Synthesis Example

The compound represented by General Formula (1) was synthesized as follows.

The abbreviations used in the synthesis of each compound described below indicate the following compounds.

EDAC: 1-ethyl-3-(3-dimethylaminopropyl)carbodiimide hydrochloride
HEMA: hydroxyethyl methacrylate
HPA: hydroxypropyl acrylate
HPMA: hydroxypropyl methacrylate
DMAc: N,N-dimethylacetamide
THF: tetrahydrofuran
Ac: acetyl group
Et: ethyl group

Synthesis Example 1: Synthesis of Compound (I-6)

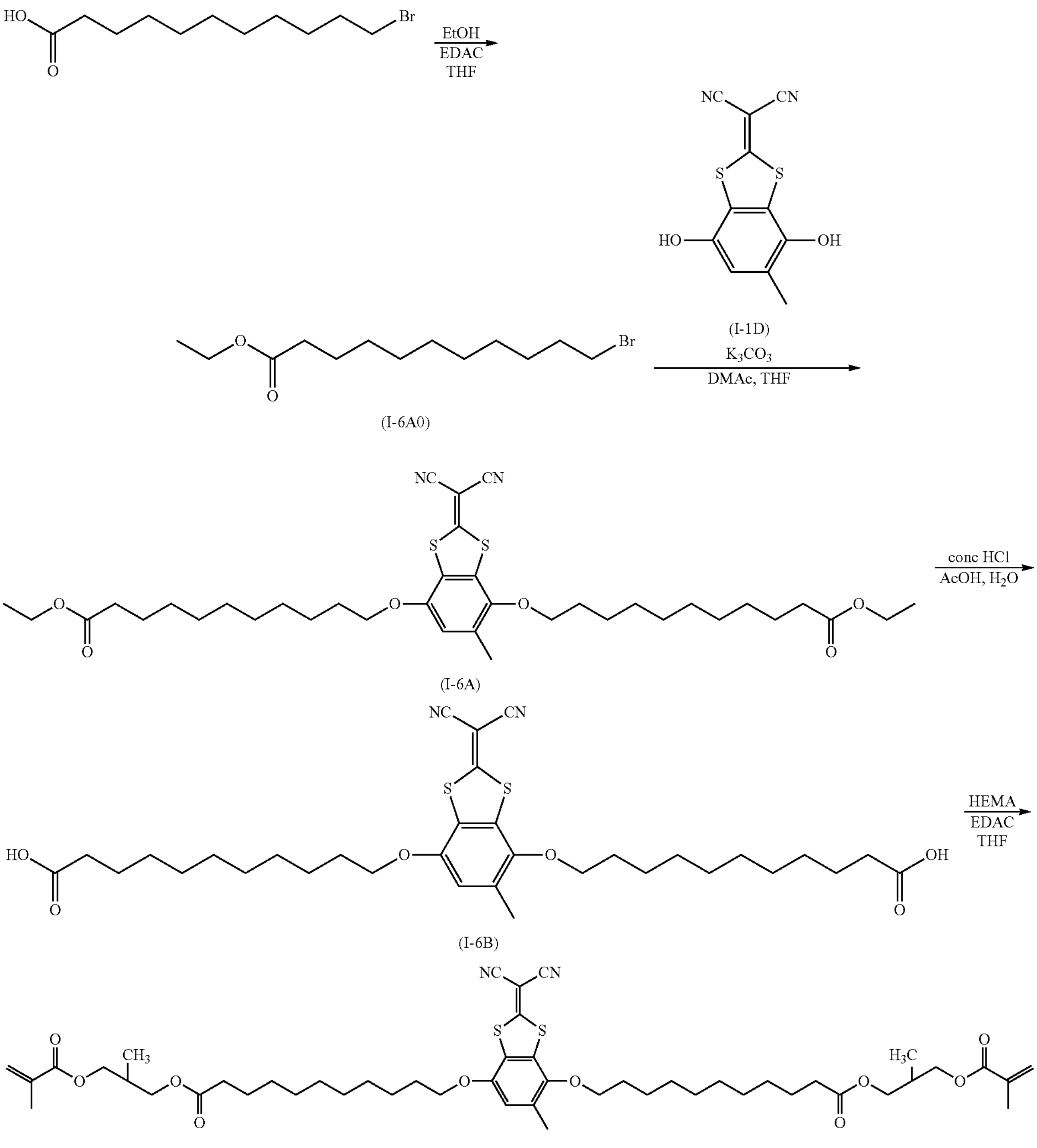

(I-1D)

(I-6A0)

(I-6A)

(I-6B)

(I-6)

<Synthesis of Compound (I-6A0)>

Ethyl 11-bromoundecanoate (compound (I-6A0)) was synthesized by the same method described in Bulletin of the Chemical Society of Japan, 81, 1518 (yield: 90%).

<Synthesis of Compound (I-6A)>

While mixing 36.9 g (125.8 mmol) of the compound (I-6A0), 15 g (57.2 mmol) of a compound (I-1D), 17.4 g (125.8 mmol) of potassium carbonate, 60 mL of THF, and 90 mL of N,N-dimethylacetamide, and the mixture was heated so that an internal temperature (liquid temperature) was 80° C. After stirring for 3 hours, 150 mL of ethyl acetate, 180 mL of water, and 30 mL of concentrated hydrochloric acid were added and stirred thereto, and then washing and liquid separation were performed. Next, 150 mL of a 5% sodium hydrogen carbonate aqueous solution was added and stirred thereto, and then washing and liquid separation were performed. Thereafter, 230 mL of methanol was added to the organic layer, and the precipitated crystals were filtered to obtain a compound (I-6A) (yield: 65%).

<Synthesis of Compound (I-6B)>

After mixing 20 g (30.6 mmol) of the compound (I-6A), 20 mL of concentrated hydrochloric acid, 240 mL of acetic acid, and 80 mL of water, the mixture was stirred at 80° C. for 1 hour. Thereafter, the temperature was returned to 25° C., 200 mL of water was added thereto, and then the precipitated solid was filtered, washed with methanol and water, and dried at 50° C. to obtain a compound (I-6B) (yield: 90%).

<Synthesis of Compound (I-6)>

18 g (28.5 mmol) of the carboxylic acid compound (I-6B), 45 mL of ethyl acetate, 9.1 g (62.8 mmol) of hydroxypropyl methacrylate, 0.4 g (2.9 mmol) of N,N-dimethylaminopyridine, and 12 g (62.8 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. An oily composition was obtained by dehydration with magnesium sulfate, filtration, concentration, and then purified by column chromatography to obtain a compound (I-6) (yield: 70%).

$^1$H-NMR (300 MHz, $CDCl_3$): δ (ppm) 1.25 to 1.50 (m, 30H), 1.50 to 1.70 (m, 8H), 1.95 (s, 6H), 2.20 to 2.40 (m, 7H), 3.85 (t, 2H), 4.0 (t, 2H), 4.10 to 4.30 (m, 4H), 5.10 to 5.30 (m, 2H), 5.60 (s, 2H), 6.10 (s, 2H), 6.70 (s, 1H)

Synthesis Example 2: Synthesis of Compound (I-5)

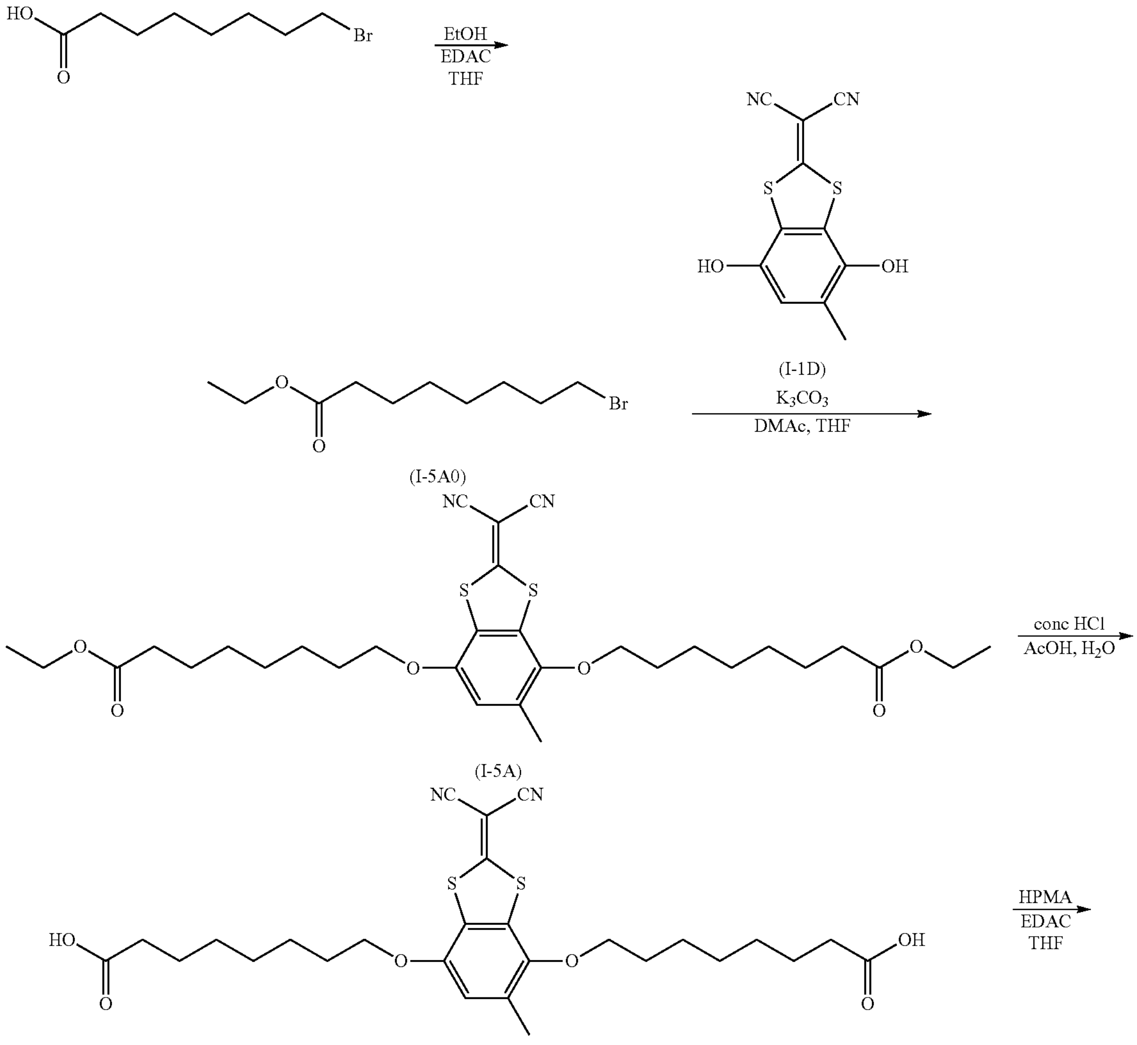

(I-1D)

(I-5A0)

(I-5A)

(I-5B)

-continued

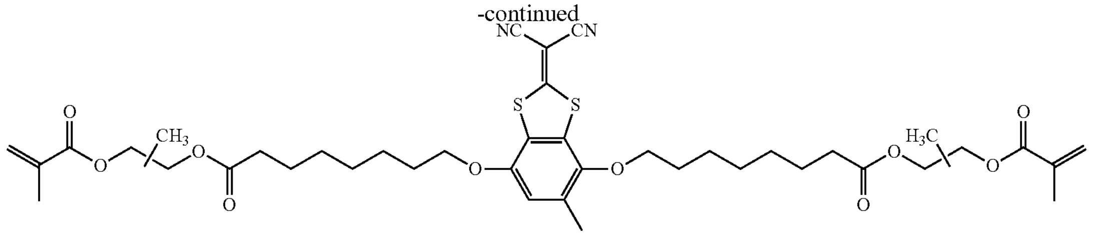

(I-5)

<Synthesis of Compound (I-5A0)>

Ethyl 8-bromooctanoate (compound (I-5A0)) was synthesized by the same method as in the synthesis of the compound (I-6A0), except that 11-bromoundecanoic acid was changed to 8-bromooctanoic acid (yield: 88%).

<Synthesis of Compound (I-5A)>

A compound (I-5A) was synthesized in the same method as in the synthesis of the compound (I-6A), except that the compound (I-6A0) was changed to the compound (I-5A0) (yield: 67%).

<Synthesis of Compound (I-5B)>

A compound (I-5B) was synthesized in the same method as in the synthesis of the compound (I-6B), except that the compound (I-6A) was changed to the compound (I-5A) (yield: 97%).

<Synthesis of Compound (I-5)>

A compound (I-5) was synthesized in the same method as in the synthesis of the compound (I-6), except that the compound (I-6B) was changed to the compound (I-5B) (yield: 60%).

$^1$H-NMR (300 MHz, $CDCl_3$): δ (ppm) 1.25 to 1.50 (m, 18H), 1.50 to 1.70 (m, 4H), 1.50 to 1.70 (quint, 4H), 1.95 (s, 6H), 2.20 to 2.40 (m, 7H), 3.85 (t, 2H), 4.0 (t, 2H), 4.10 to 4.30 (m, 4H), 5.10 to 5.30 (m, 2H), 5.60 (s, 2H), 6.10 (s, 2H), 6.70 (s, 1H)

Synthesis Example 3: Synthesis of Compound (I-9)

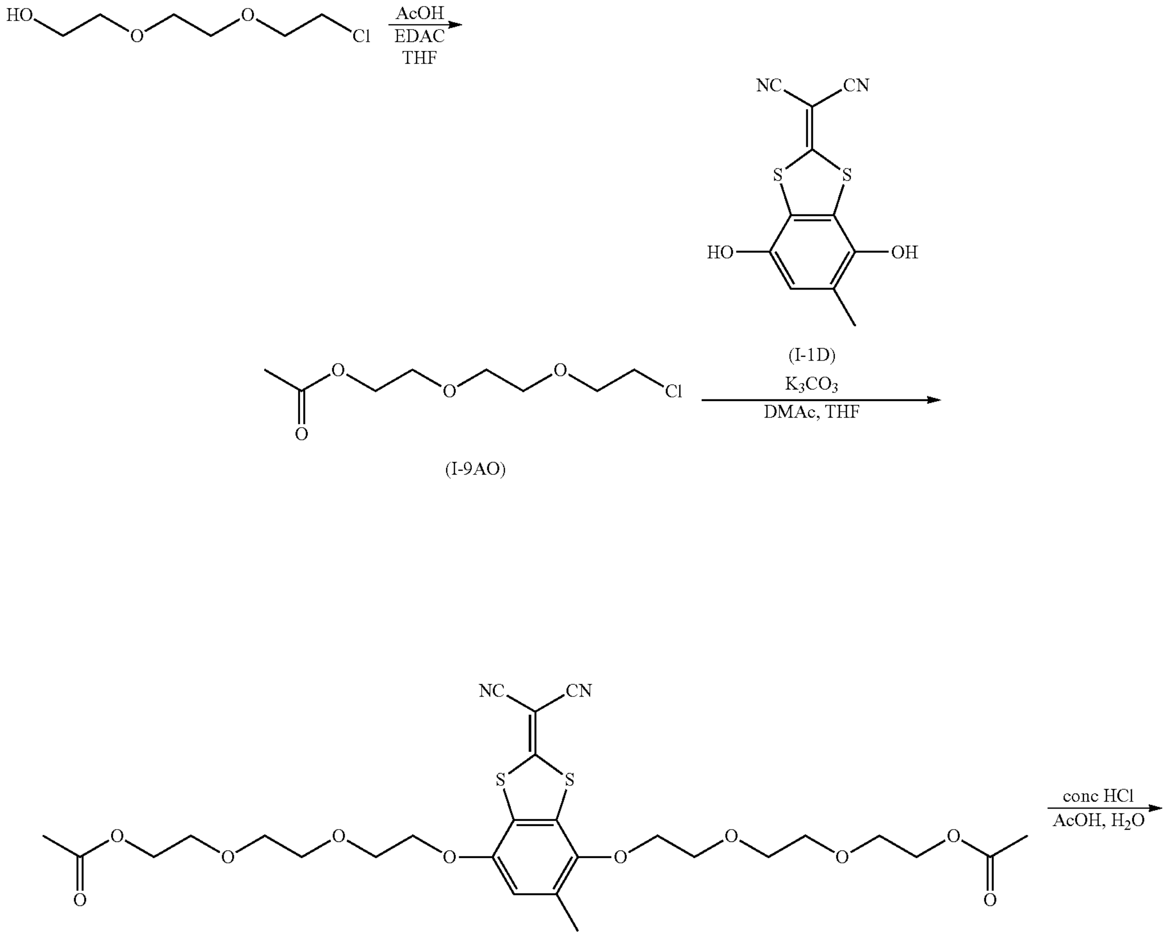

(I-1D)

(I-9AO)

(I-9A)

-continued

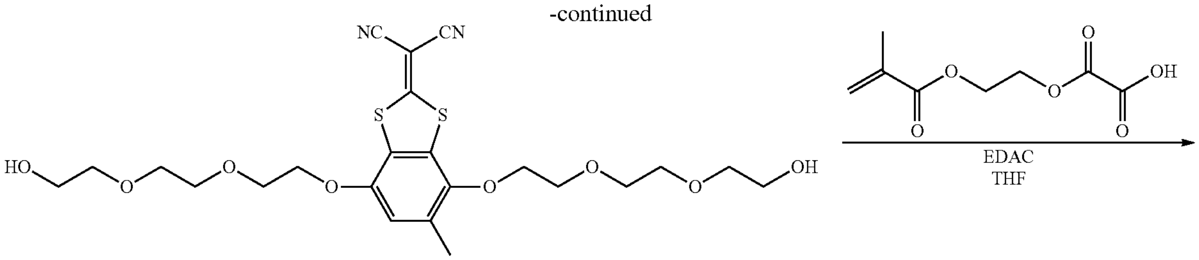

(I-9B)

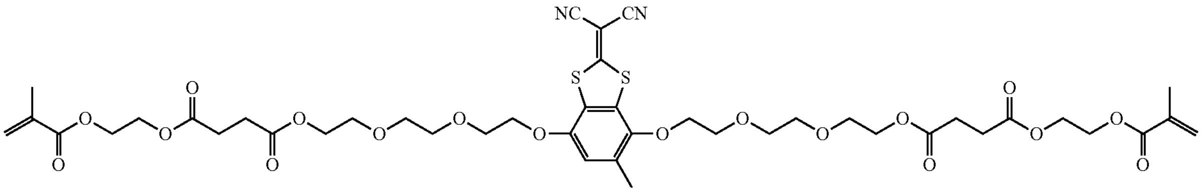

(I-9)

<Synthesis of Compound (I-9A0)>

1.7 g (28.5 mmol) of acetic acid, 45 mL of ethyl acetate, 10.6 g (62.8 mmol) of 2-[2-(2-chloroethoxy)ethoxy]ethanol, 0.4 g (2.9 mmol) of N,N-dimethylaminopyridine, and 12 g (62.8 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. Δn oily composition was obtained by dehydration with magnesium sulfate, filtration, concentration, and then purified by column chromatography to obtain a compound (I-9A0) (yield: 68%).

<Synthesis of Compound (I-9A)>

While mixing 26.5 g (125.8 mmol) of the compound (I-9A0), 15 g (57.2 mmol) of a compound (I-1D), 17.4 g (125.8 mmol) of potassium carbonate, 60 mL of THF, and 90 mL of N,N-dimethylacetamide, and the mixture was heated so that an internal temperature (liquid temperature) was 100° C. After stirring for 3 hours, 150 mL of ethyl acetate, 180 mL of water, and 30 mL of concentrated hydrochloric acid were added and stirred thereto, and then washing and liquid separation were performed. Next, 150 mL of a 5% sodium hydrogen carbonate aqueous solution was added and stirred thereto, and then washing and liquid separation were performed. Thereafter, an oily composition obtained by distilling off the solvent was purified by column chromatography to obtain a compound (I-9A) (yield: 52%).

<Synthesis of Compound (I-9B)>

After mixing 18.7 g (30.6 mmol) of the compound (I-9A), 20 mL of concentrated hydrochloric acid, 240 mL of acetic acid, and 80 mL of water, the mixture was stirred at 80° C. for 1 hour. Thereafter, the temperature was returned to 25° C., 200 mL of 7% saline solution and 200 mL of ethyl acetate were added and stirred thereto, and then washing and liquid separation were performed. Next, 150 mL of a 5% sodium hydrogen carbonate aqueous solution was added and stirred thereto, and then washing and liquid separation were performed. The organic layer was dehydrated with magnesium sulfate and filtered, and then an oily product obtained by distilling off the solvent was purified by column chromatography to obtain a compound (I-9B) (yield: 45%).

<Synthesis of Compound (I-9)>

17.4 g (28.5 mmol) of the compound (I-9B), 45 mL of THF, 14.5 g (62.8 mmol) of Light Ester HO-MS(N) (product name, manufactured by KYOEISHA CHEMICAL Co., LTD.), 0.4 g (2.9 mmol) of N,N-dimethylaminopyridine, and 12 g (62.8 mmol) of 1-ethyl-3-(3-dimethylaminopropyl) carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. Δn oily composition was obtained by dehydration with magnesium sulfate, filtration, concentration, and then purified by column chromatography to obtain a compound (I-9) (yield: 63%).

$^1$H-NMR (300 MHz, $CDCl_3$): δ (ppm) 1.95 (s, 6H), 2.30 (s, 3H), 2.80 (t, 8H), 3.60 to 3.90 (m, 16H), 4.10 to 4.30 (m, 16H), 5.60 (s, 2H), 6.10 (s, 2H), 6.70 (s, 1H)

Synthesis Example 4: Synthesis of Compound (I-7)

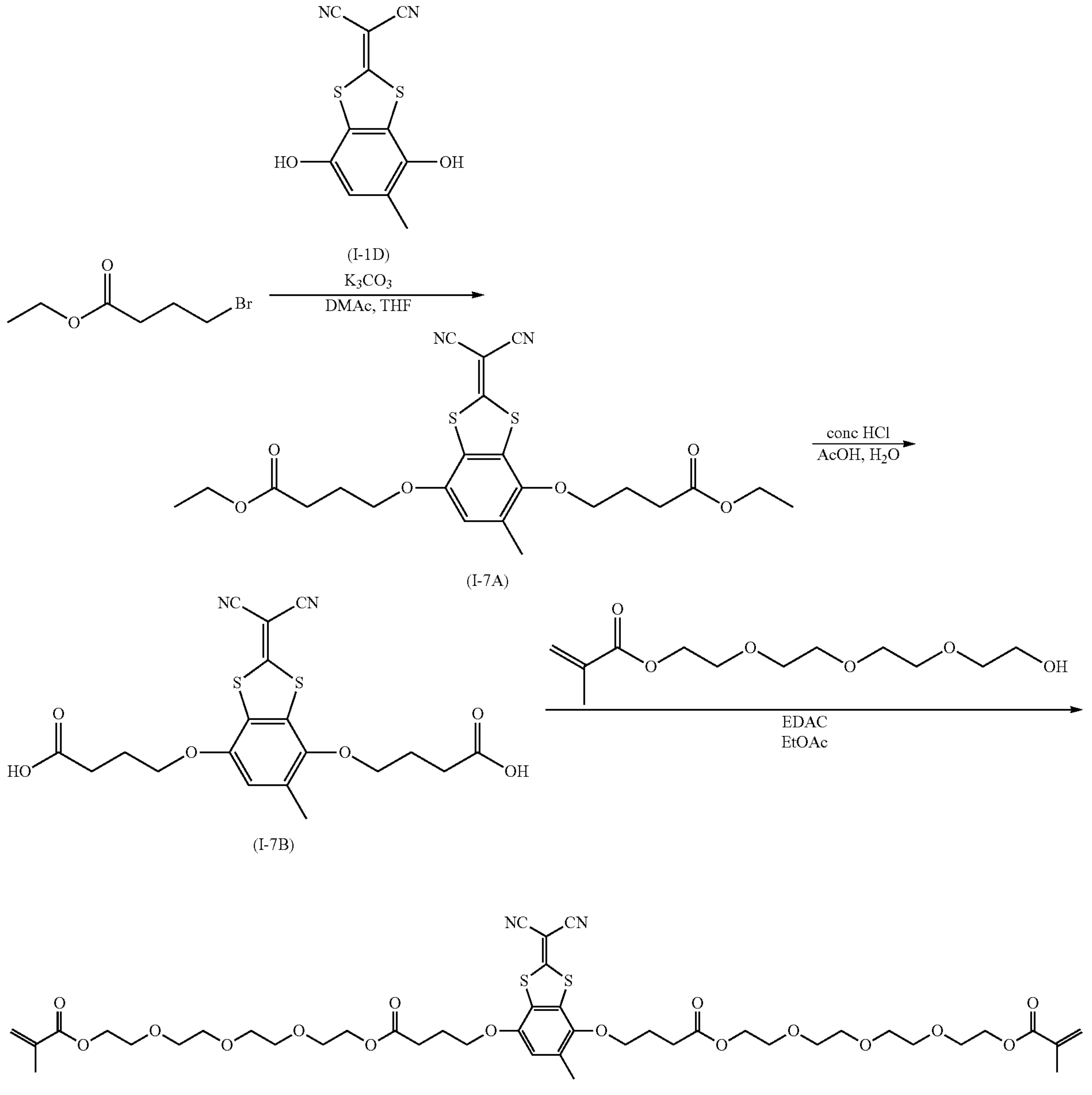

<Synthesis of Compound (I-7A)>

A compound (I-7A) was synthesized in the same method as in the synthesis of the compound (I-6A), except that the compound (I-6A0) was changed to ethyl bromobutyrate (manufactured by Wako Pure Chemical Corporation) (yield: 62%).

<Synthesis of Compound (I-7B)>

A compound (I-7B) was synthesized in the same method as in the synthesis of the compound (I-6B), except that the compound (I-6A) was changed to the compound (I-7A) (yield: 98%).

<Synthesis of Compound (I-7)>

12.4 g (28.5 mmol) of the compound (I-7B), 45 mL of ethyl acetate, 16.5 g (62.8 mmol) of Blemmer PE-200 (product name, manufactured by NOF Corporation), 0.4 g (2.9 mmol) of N,N-dimethylaminopyridine, and 12 g (62.8 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. An oily composition was obtained by dehydration with magnesium sulfate, filtration, concentration, and then purified by column chromatography to obtain a compound (I-7) (yield: 48%).

$^1$H-NMR (300 MHz, $CDCl_3$): δ (ppm) 1.93 (s, 6H), 2.10 to 2.20 (m, 4H), 2.32 (s, 3H), 2.50 to 2.70 (m, 4H), 3.60 to 3.90 (m, 24H), 4.10 to 4.30 (m, 12H), 5.60 (s, 2H), 6.10 (s, 2H), 6.70 (s, 1H)

Synthesis Example 5: Synthesis of Compound (II-1)
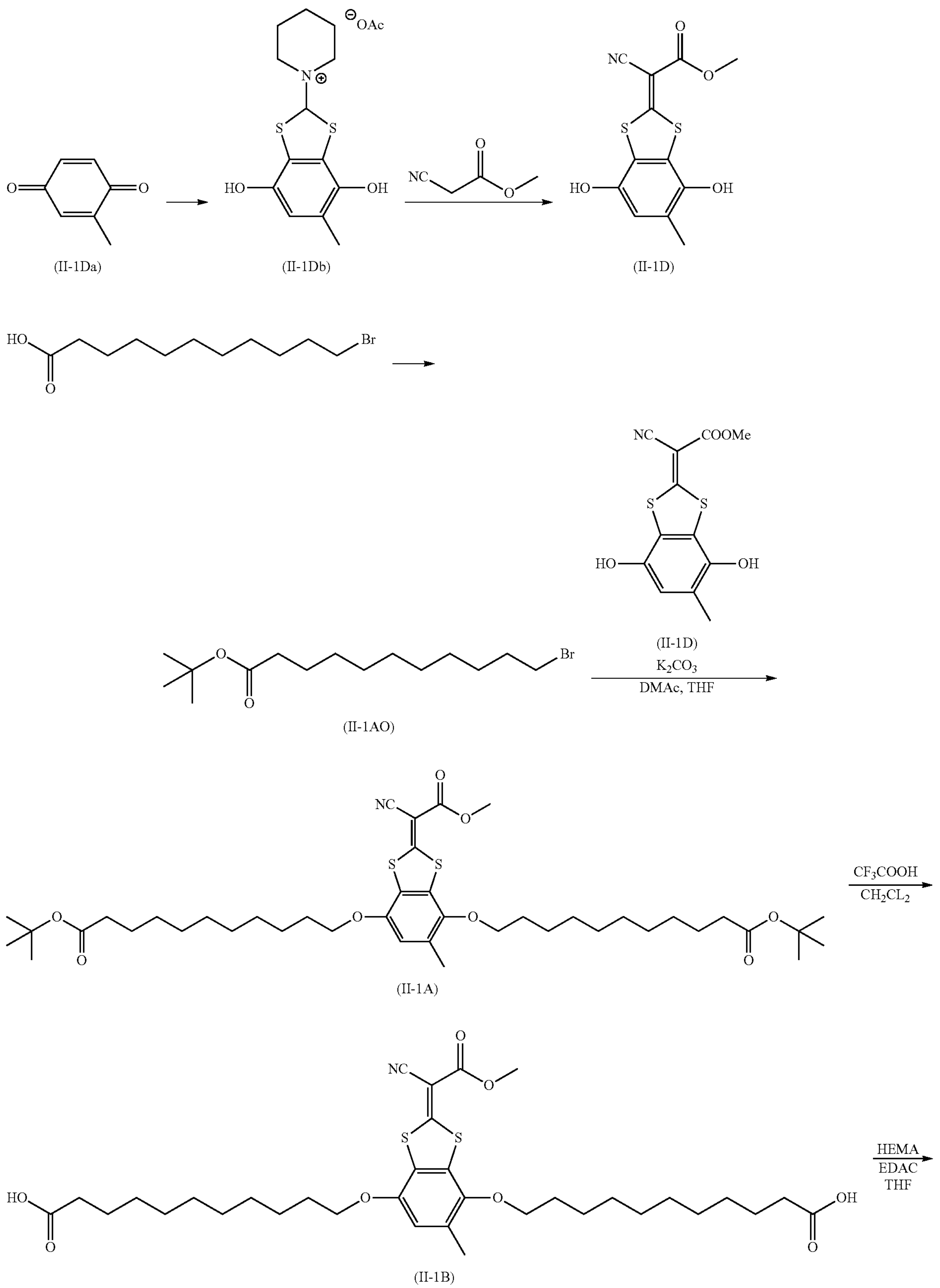

-continued

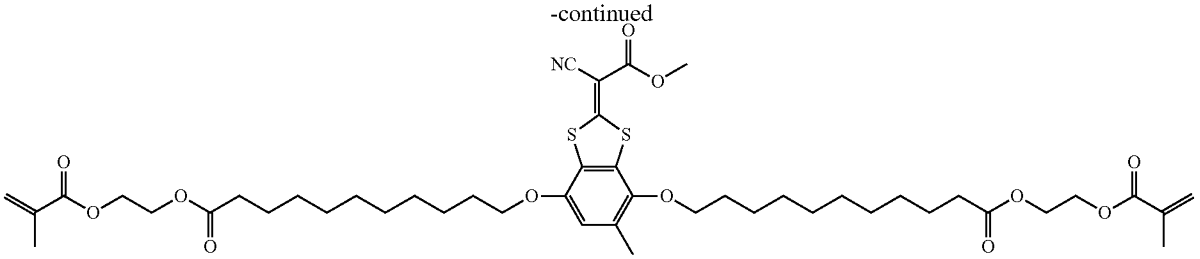

(II-1)

<Synthesis of Compound (II-1Db)>

The synthesis of a compound (II-1Db) was performed according to the method described in "Journal of Organic Chemistry" (2004); 69 (6); pp. 2164 to 2177.

<Synthesis of Compound (II-1D)>

5.2 g (15.3 mmol) of the compound (II-1Db), 1.66 g (16.80 mmol) of methyl cyanoacetate, and 25 mL of isopropyl alcohol were mixed, and the mixture was stirred while heating under reflux for 3 hours. Thereafter, the mixture was cooled to 25° C., 50 mL of water was added to the mixture, and the precipitated crystals were filtered. The obtained crystals were washed with a mixed solution of water-isopropyl alcohol=10:1 and a 0.5 N hydrochloric acid solution, and then dissolved in N,N-dimethylacetamide and filtered. Water was added to the obtained filtrate, and the precipitated crystals were filtered to obtain 2.3 g (7.82 mmol) of a compound (II-1D) (yield: 51%).

<Synthesis of Compound (II-1A0)> t-Butyl 11-bromoundecanoate (compound (II-1A0)) was synthesized by the same method described in Electrochimia Acta, 227, 391 (yield: 75%).

<Synthesis of Compound (II-1A)>

While mixing 40.4 g (125.8 mmol) of the compound (II-1A0), 16.9 g (57.2 mmol) of a compound (II-1D), 17.4 g (125.8 mmol) of potassium carbonate, 30 mL of ethyl acetate, 30 mL of THF, and 90 mL of N,N-dimethylacetamide, and the mixture was heated so that an internal temperature (liquid temperature) was 80° C. After stirring for 3 hours, 150 mL of ethyl acetate, 180 mL of water, and 30 mL of concentrated hydrochloric acid were added and stirred thereto, and then washing and liquid separation were performed. Next, 150 mL of a 5% sodium hydrogen carbonate aqueous solution was added and stirred thereto, and then washing and liquid separation were performed. Thereafter, 230 mL of methanol was added to the organic layer, and the precipitated crystals were filtered to obtain a compound (II-1A) (yield: 67%).

<Synthesis of Compound (II-1B)>

100 mL of dichloromethane was added to 10 g (12.9 mmol) of the compound (II-1A), 50 mL of trifluoroacetic acid was further added thereto, and the mixture was stirred at 25° C. for 2 hours. Thereafter, the solvent was distilled off, water was added thereto, and the precipitated solid was filtered to obtain a compound (II-1B) (yield: 90%).

<Synthesis of Compound (II-1)>

A compound (II-1) was synthesized in the same method as in the synthesis of the compound (I-6), except that the compound (I-6B) was changed to the compound (II-1B) and hydroxypropyl methacrylate was changed to hydroxyethyl methacrylate (yield: 65%).

$^1$H-NMR (300 MHz, $CDCl_3$): δ (ppm) 1.25 to 1.50 (m, 24H), 1.50 to 1.70 (m, 4H), 1.50 to 1.70 (quint, 4H), 1.95 (s, 6H), 2.20 to 2.40 (m, 7H), 3.85 (t, 2H), 3.90 (s, 3H), 4.0 (t, 2H), 4.10 to 4.30 (m, 8H), 5.60 (s, 2H), 6.10 (s, 2H), 6.70 (s, 1H)

Synthesis Example 6: Synthesis of Compound (I-11)

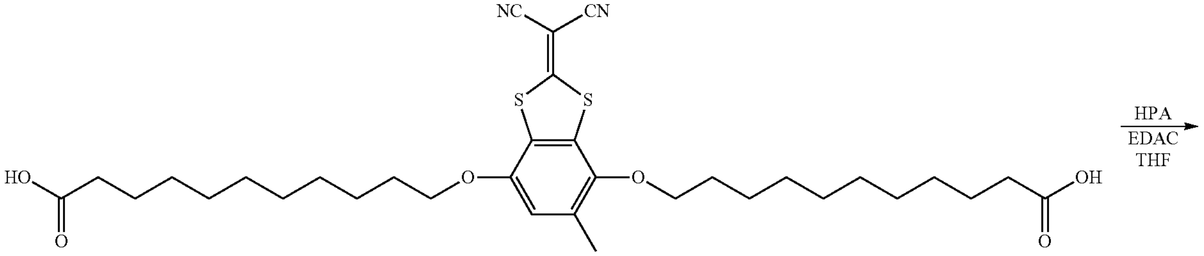

(I-6B)

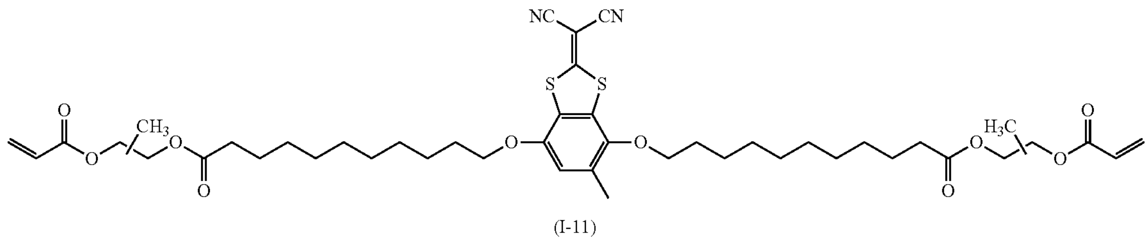

(I-11)

<Synthesis of Compound (I-11)>

A compound (I-11) was synthesized in the same method as in the synthesis of the compound (I-6), except that hydroxypropyl methacrylate (HPMA) was changed to hydroxypropyl acrylate (HPA) (yield: 65%).

$^1$H-NMR (300 MHz, $CDCl_3$): δ (ppm) 1.25 to 1.50 (m, 30H), 1.50 to 1.70 (m, 4H), 2.20 to 2.40 (m, 7H), 3.85 (t, 2H), 4.0 (t, 2H), 4.10 to 4.30 (m, 4H), 5.10 to 5.30 (m, 2H), 5.80 to 5.90 (m, 2H), 6.0 to 6.20 (m, 2H), 6.42 (d, 2H), 6.70 (s, 1H)

Synthesis Example 7: Synthesis of Compound (I-12)

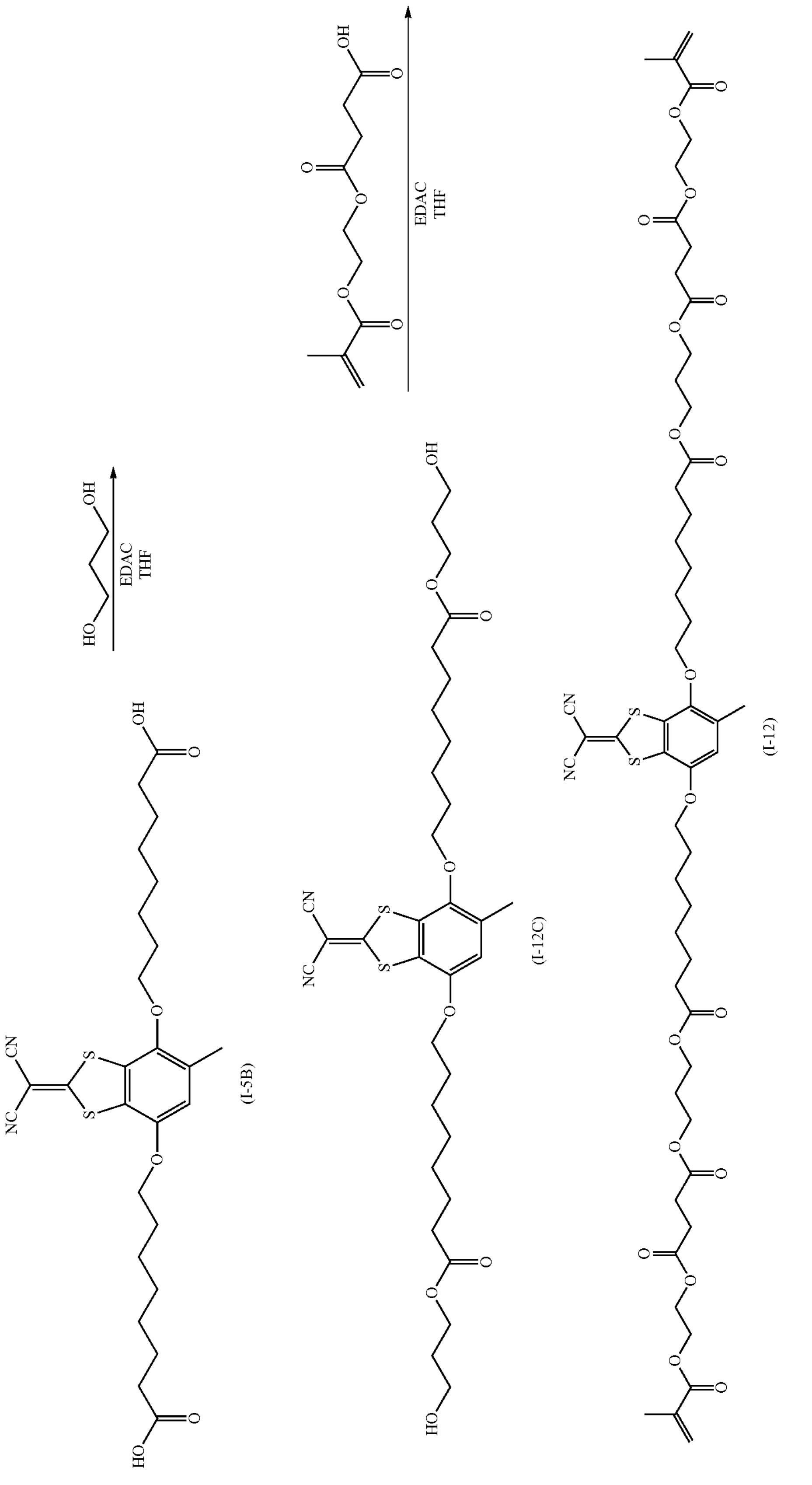
(I-5B)
(I-12C)
(I-12)

<Synthesis of Compound (I-12C)>

15.6 g (28.5 mmol) of the carboxylic acid compound (I-5B), 20 mL of THF, 25 mL of ethyl acetate, 10.8 g (142.5 mmol) of propanediol, 0.4 g (2.9 mmol) of N,N-dimethylaminopyridine, and 12 g (62.8 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (I-12C) (yield: 35%).

<Synthesis of Compound (I-12)>

6.3 g (9.5 mmol) of the compound (I-12C), 7 mL of THF, 8 mL of ethyl acetate, 4.9 g (20.9 mmol) of Light Ester HO-MS(N) (product name, manufactured by KYOEISHA CHEMICAL Co., LTD.), 0.2 g (0.97 mmol) of N,N-dimethylaminopyridine, and 4 g (20.9 mmol) of 1-ethyl-3-(3-dimethylaminopropyl)carbodiimide hydrochloride (abbreviation: EDAC) were mixed. After stirring at 40° C. for 2 hours, 100 ml of 1N hydrochloric acid was added thereto, the mixture was washed and separated, a 5% sodium hydrogen carbonate aqueous solution was added thereto, and the mixture was washed and separated. An oily composition was obtained by dehydration with magnesium sulfate, filtration, concentration, and then purified by column chromatography to obtain a compound (I-12) (yield: 63%).

$^1$H-NMR (300 MHz, $CDCl_3$): δ (ppm) 1.25 to 1.50 (m, 16H), 1.55 to 1.70 (m, 4H), 1.9 to 2.0 (m, 10H), 2.20 to 2.40 (m, 7H), 2.80 (t, 8H), 3.85 (t, 2H), 4.0 (t, 2H), 4.10 to 4.30 (m, 16H), 5.60 (s, 2H), 6.10 (s, 2H), 6.70 (s, 1H)

Synthesis Example 8: Synthesis of Compound (I-13)

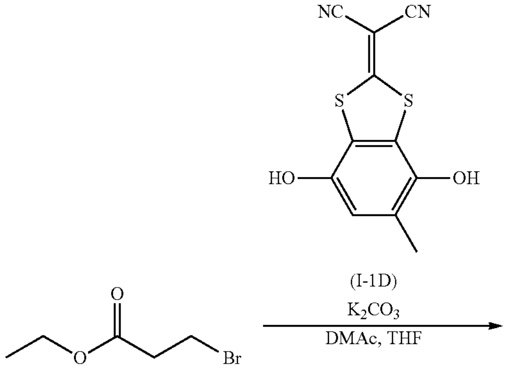

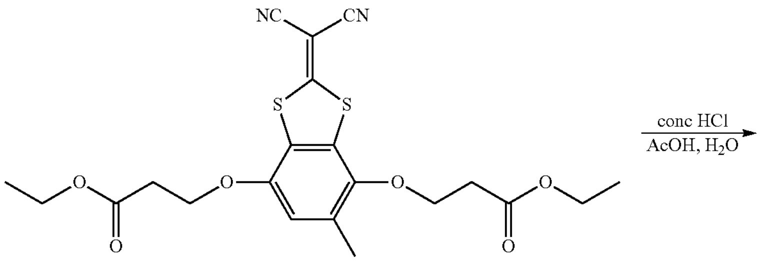

(I-13A)

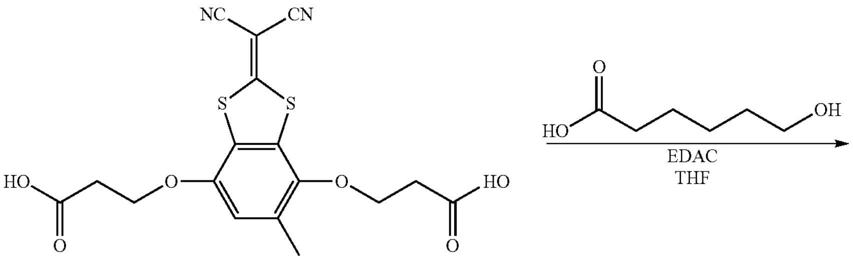

(I-13B)

-continued

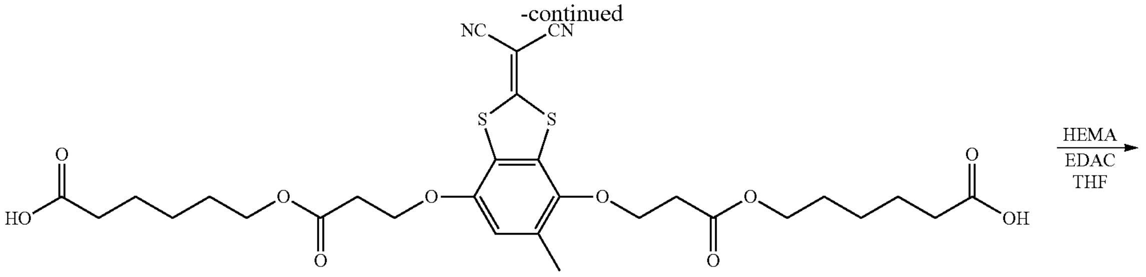

(I-13C)

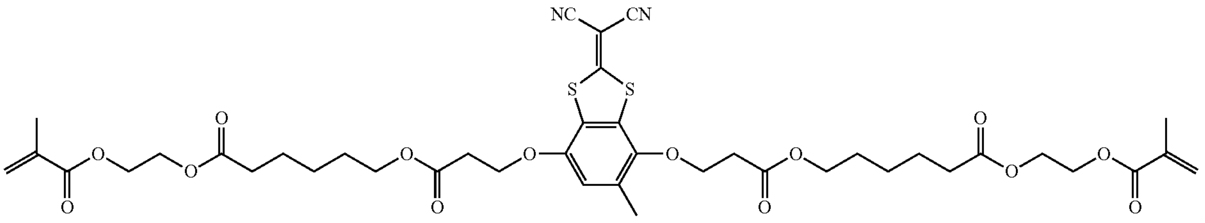

(I-13)

<Synthesis of Compound (I-13A)>

A compound (I-13A) was synthesized in the same method as in the synthesis of the compound (I-6A), except that the compound (I-6A0) was changed to ethyl bromopropionate (manufactured by Tokyo Chemical Industry Co., Ltd.) (yield: 62%).

<Synthesis of Compound (I-13B)>

A compound (I-13B) was synthesized in the same method as in the synthesis of the compound (I-6B), except that the compound (I-6A) was changed to the compound (I-13A) (yield: 98%).

<Synthesis of Compound (I-13C)>

11.6 g (28.5 mmol) of the carboxylic acid compound (I-13B), 45 mL of THF, 18.8 g (142.5 mmol) of 6-hydroxycaproic acid, 0.4 g (2.9 mmol) of N,N-dimethylaminopyridine, and 12 g (62.8 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (I-13C) (yield: 30%).

<Synthesis of Compound (I-13)>

4.5 g (7.1 mmol) of the carboxylic acid compound (I-13C), 6 mL of THF, 6 mL of ethyl acetate, 2.1 g (12.6 mmol) of hydroxyethyl methacrylate, 0.1 g (0.8 mmol) of N,N-dimethylaminopyridine, and 3 g (15.7 mmol) of 1-ethyl-3-(3-dimethylaminopropyl)carbodiimide hydrochloride (abbreviation: EDAC) were mixed. After stirring at 40° C. for 2 hours, 300 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (I-13) (yield: 70%).

$^1$H-NMR (300 MHz, $CDCl_3$): δ (ppm) 1.30 to 1.40 (m, 4H), 1.50 to 1.70 (m, 8H), 1.95 (s, 6H), 2.20 to 2.40 (m, 11H), 3.90 (t, 2H), 4.1 (t, 2H), 4.20 to 4.40 (m, 12H), 5.60 (s, 2H), 6.10 (s, 2H), 6.72 (s, 1H)

Synthesis of Comparative Example Compound (Y-1)

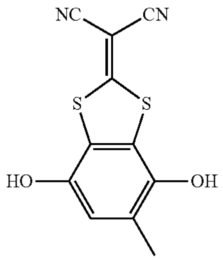

(I-1D)

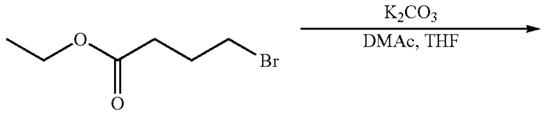

-continued
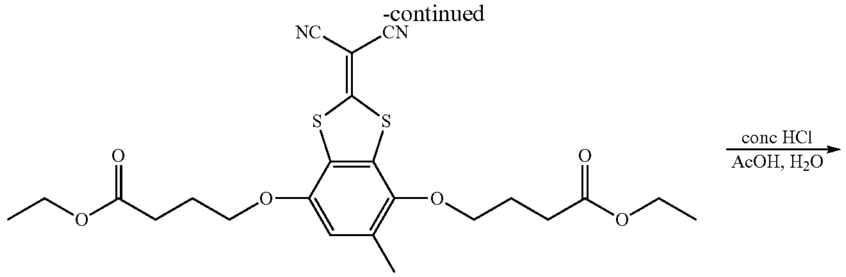
(Y-1A)
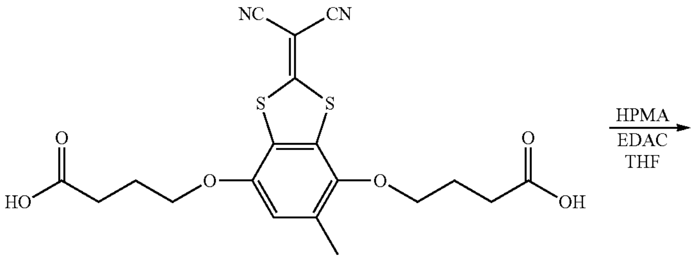
(Y-1B)
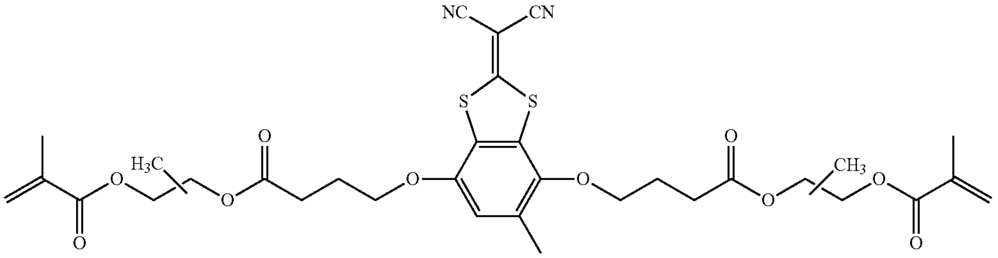
(Y-1)
A compound (Y-1) was synthesized in the same method as in the synthesis of the compound (I-6), except that the raw material compound (I-6A0) in the synthesis of the compound (I-6) was changed to ethyl bromobutyrate.
$^1$H-NMR (300 MHz, $CDCl_3$): δ (ppm) 1.25 to 1.35 (d, 6H), 1.95 (s, 6H), 2.10 to 2.20 (m, 4H), 2.31 (s, 3H), 2.50 to 2.70 (m, 4H), 3.90 (t, 2H), 4.0 to 4.4 (m, 6H), 5.10 to 5.30 (m, 2H), 5.60 (s, 2H), 6.10 (s, 2H), 6.70 (s, 1H)
Synthesis of Comparative Example Compound (Y-2)
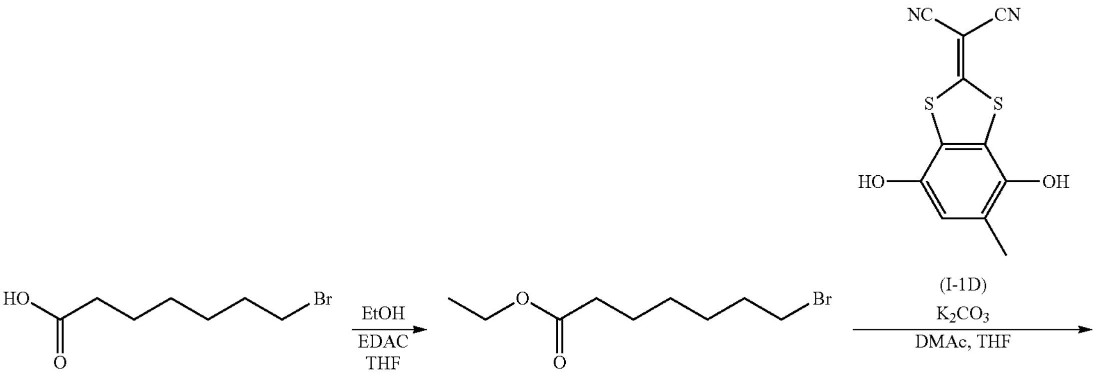
(Y-2AO)

-continued
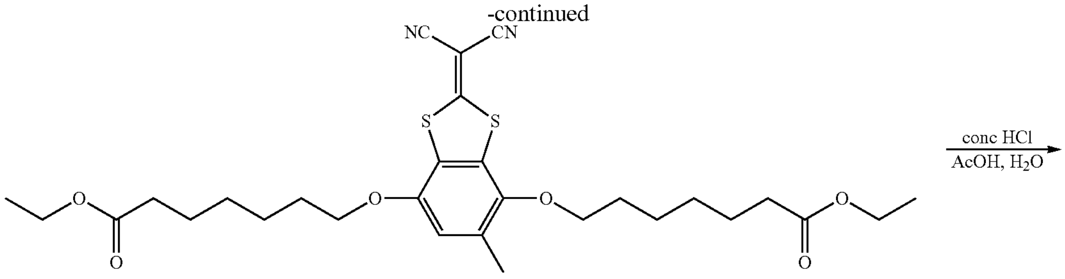
(Y-2A)
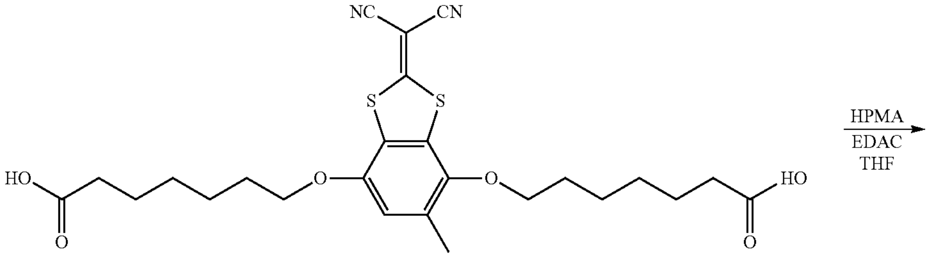
(Y-2B)
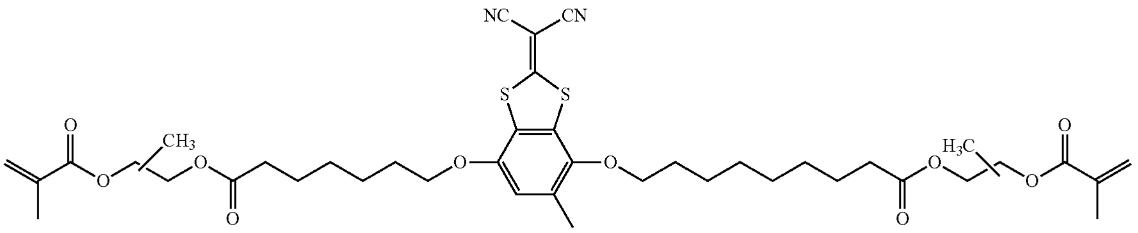
(Y-2)
A compound (Y-2) was synthesized in the same method as in the synthesis of the compound (I-6), except that the raw material compound 11-bromoundecanoic acid in the synthesis of the compound (I-6) was changed to 7-bromoundecanoic acid.
$^1$H-NMR (300 MHz, $CDCl_3$): δ (ppm) 1.25 to 1.50 (m, 14H), 1.50 to 1.70 (m, 8H), 1.95 (s, 6H), 2.20 to 2.40 (m, 7H), 3.85 (t, 2H), 4.0 (t, 2H), 4.10 to 4.30 (m, 4H), 5.10 to 5.30 (m, 2H), 5.60 (s, 2H), 6.10 (s, 2H), 6.70 (s, 1H)
Synthesis of Comparative Example Compound (R-1)
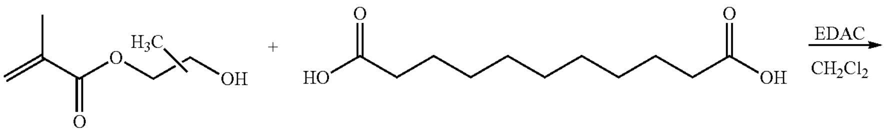
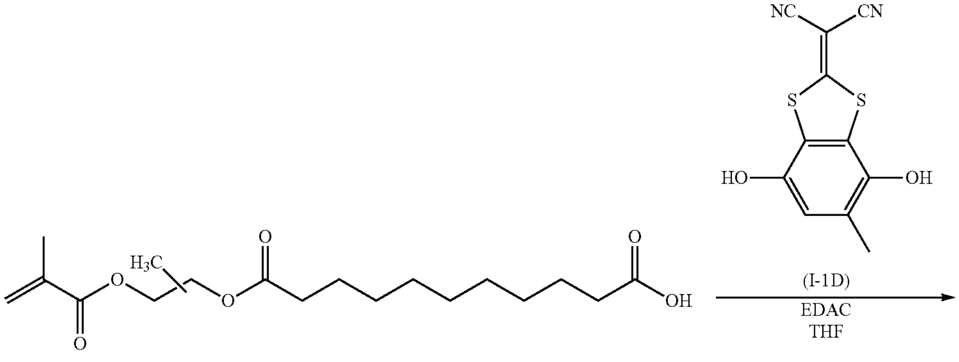
(R-1A)

-continued

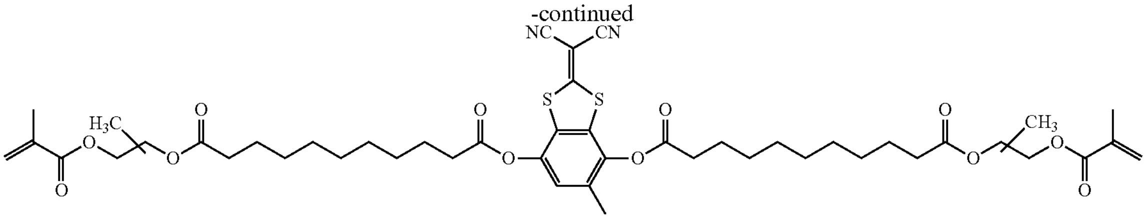

(R-1)

<Synthesis of Compound (R-1A)>

20.5 g (142.5 mmol) of hydroxypropyl methacrylate, 30.8 g (142.5 mmol) of 1,9-nonanedicarboxylic acid, 1.8 g (14.5 mmol) of N,N-dimethylaminopyridine, and 27.3 g (142.5 mmol) of 1-ethyl-3-(3-dimethylaminopropyl)carbodiimide hydrochloride (abbreviation: EDAC) were mixed in 100 mL of dichloromethane. After stirring at 40° C. for 2 hours, 600 ml of 1N hydrochloric acid was added thereto, the mixture was washed and separated, 100 mL of water was added thereto, and the mixture was washed and separated. After dehydration with magnesium sulfate, filtration, and concentration, the product was purified by column chromatography to obtain a compound (R-1A) (yield: 25%).

<Synthesis of Compound (R-1)>

3.8 g (14.3 mmol) of the compound (I-1D), 10 mL of THF, 12 mL of ethyl acetate, 10.8 g (31.4 mmol) of the carboxylic acid compound (R-1A), 0.2 g (1.5 mmol) of N,N-dimethylaminopyridine, and 6 g (31.4 mmol) of 1-ethyl-3-(3-dimethylaminopropyl)carbodiimide hydrochloride (abbreviation: EDAC) were mixed. After stirring at 40° C. for 2 hours, 150 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (R-1) (yield: 65%).

$^1$H-NMR (300 MHz, $CDCl_3$): δ (ppm) 1.20 to 1.50 (m, 20H+6H), 1.50 to 1.70 (m, 4H), 1.95 (s, 6H), 2.20 (s, 3H), 2.30 to 2.50 (m, 8H), 4.10 to 4.30 (m, 4H), 5.10 to 5.30 (m, 2H), 5.60 (s, 2H), 6.10 (s, 2H), 7.20 (s, 1H)

Synthesis of Comparative Example Compound (R-2)

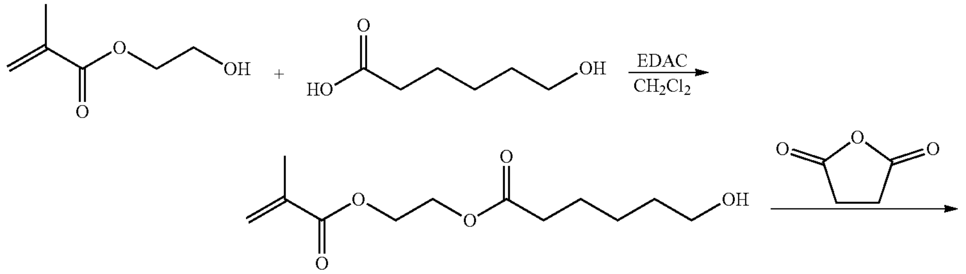

(R-2A)

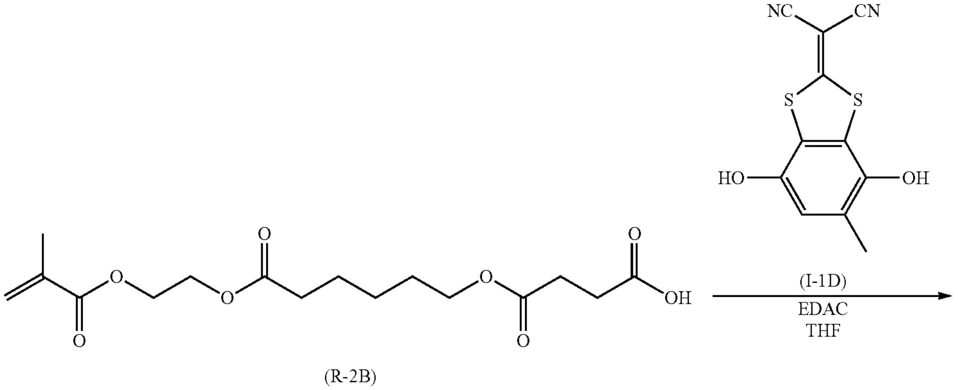

(R-2B)

-continued

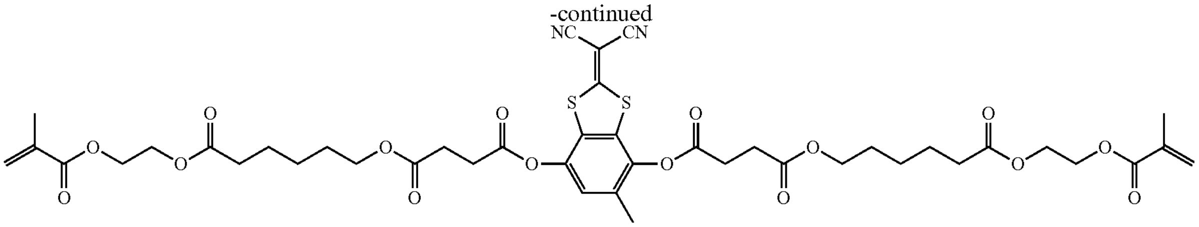

(R-2)

<Synthesis of Compound (R-2A)>

18.5 g (142.5 mmol) of hydroxyethyl methacrylate, 19 g (142.5 mmol) of hydroxyhexanoic acid, 1.8 g (14.5 mmol) of N,N-dimethylaminopyridine, and 27.3 g (142.5 mmol) of 1-ethyl-3-(3-dimethylaminopropyl)carbodiimide hydrochloride (abbreviation: EDAC) were mixed in 100 mL of dichloromethane. After stirring at 40° C. for 2 hours, 600 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (R-2A) (yield: 40%).

<Synthesis of Compound (R-2B)>

10 g (40.9 mmol) of the compound (R-2A), 4.3 g (43.0 mmol) of succinic anhydride, 50 mL of toluene, and 0.4 g (2.9 mmol) of N,N-dimethylaminopyridine were added and stirred at 100° C. for 5 hours, and then the temperature was lowered to 40° C., 50 mL of toluene and 50 mL of water were added thereto, and the mixture was stirred for 30 minutes. After liquid separation, 50 mL of water was added thereto and the liquid separation was performed again. The resultant was concentrated on an evaporator to obtain a compound (R-2B) (yield: 65%).

<Synthesis of Compound (R-2)>

3.8 g (14.3 mmol) of the compound (I-1D), 10 mL of THF, 12 mL of ethyl acetate, 10.8 g (31.4 mmol) of the carboxylic acid compound (R-2B), 0.2 g (1.5 mmol) of N,N-dimethylaminopyridine, and 6 g (31.4 mmol) of 1-ethyl-3-(3-dimethylaminopropyl)carbodiimide hydrochloride (abbreviation: EDAC) were mixed. After stirring at 40° C. for 2 hours, 150 ml of 1N hydrochloric acid was added thereto, the mixture was washed and separated, a 5% sodium hydrogen carbonate aqueous solution was added thereto, and the mixture was washed and separated. After dehydration with magnesium sulfate, filtration, and concentration, the product was purified by column chromatography to obtain a compound (R-2) (yield: 58%).

$^1$H-NMR (300 MHz, $CDCl_3$): δ (ppm) 1.30 to 1.40 (m, 4H), 1.50 to 1.70 (m, 8H), 1.97 (s, 6H), 2.21 (s, 3H), 2.43 (t, 4H), 2.7 to 2.9 (m, 4H), 2.90 to 3.0 (m, 4H), 4.10 to 4.30 (m, 12H), 5.60 (s, 2H), 6.10 (s, 2H), 7.21 (s, 1H)

Example 1: Preparation of Curable Composition (1) Preparation of Curable Composition A curable composition was prepared by mixing a component (A) or a comparative compound, a component (B), and a photoinitiator in an amount having composition shown in the tables below, and stirring the mixture homogeneously.

A cured product obtained from the curable composition described in the tables below was a cured product which was three-dimensionally crosslinked by light irradiation, and a monomer used was incorporated into the cured product, so that a structure thereof could not be specified by analysis or the like.

[Evaluation 1: Light Resistance Test (ΔAbs)]

(1) Production of Cured Product Sample for Light Resistance Test (ΔAbs)

0.8 μL of the curable composition prepared above was placed on a 2.5 cm×2.5 cm glass plate, the glass plate was sandwiched between glass plates of the same size to prevent air bubbles from being mixed, and the curable composition was spread over the entire surface of the glass plate. At this time, a thickness was adjusted so that an absorbance Abs1 measured in (2) below was 1.7 to 2.0.

In an atmosphere with an oxygen concentration of 1% or less, using EXECURE 3000 (product name, manufactured by HOYA CORPORATION) as an UV irradiation device, a cured product sandwiched on a glass plate (cured product sample for light resistance test (ΔAbs)) was obtained by irradiating with ultraviolet rays of 2 J/cm$^2$.

(2) Absorbance Measurement and Light Resistance Test

With regard to the cured product sample prepared above, using a spectrophotometer UV-2600 (product name, manufactured by Shimadzu Corporation), an absorbance in a wavelength range of 200 to 800 nm was measured for each 1 nm, and an absorbance Abs1 at λmax was determined. Thereafter, an UV cut filter (half-value central wavelength: 400 nm, transmittance 1% wavelength: 390 nm) was placed on the cured product sample, and using a xenon accelerated weather fastness tester Q-SUN Xe-1 (product name, manufactured by Q-Lab Corporation, light source: xenon arc lamp), the cured product sample was irradiated for 140 hours under the condition of illuminance of 0.4 W/m$^2$ (340 nm), an absorbance was measured in the same manner as above, and an absorbance Abs2 at λmax was measured.

In the above, λmax means a wavelength showing the largest absorbance among wavelengths showing the maximal absorption.

A change in absorbance (ΔAbs) before and after the light irradiation test was calculated according to the following expression, and the light resistance (ΔAbs) was evaluated based on the following standard. In the present invention, "B" or higher is acceptable.

$$\Delta Abs=(Abs1-Abs2)/Abs1\times 100 \quad \text{(Expression)}$$

—ΔAbs Evaluation—

AAA: ΔAbs was less than 4%.

AA: ΔAbs was 4% or more and less than 5%.

A: ΔAbs was 5% or more and less than 8%.

B: ΔAbs was 8% or more and less than 10%.

C: ΔAbs was 10% or more and less than 15%.

D: ΔAbs was 15% or more.

[Evaluation 2: Light Resistance Test (ΔT %)]

(1) Production of Cured Product Sample for Light Resistance Test (ΔT %)

25 μL of the curable composition prepared above was placed on an 8 cm×5 cm glass plate, the glass plate was sandwiched between glass plates of the same size such that a thickness was 20 μm, and the curable composition was spread.

In an atmosphere with an oxygen concentration of 1% or less, using EXECURE 3000 (product name, manufactured by HOYA CORPORATION) as an UV irradiation device, a cured product sandwiched on a glass plate (cured product sample for light resistance test (ΔT %)) was obtained by irradiating with ultraviolet rays of 2 J/cm$^2$.

(2) Transmittance Measurement and Light Resistance Test

With regard to the cured product sample prepared above, using a spectrophotometer UV-2600 (product name, manufactured by Shimadzu Corporation), a transmittance T1(%) at 450 nm was measured. Thereafter, an UV light cut filter (transmittance at a wavelength of 390 nm or less: less than 1%) was placed on the cured product sample, and using a xenon accelerated weather fastness tester Q-SUN Xe-1 (product name, manufactured by Q-Lab Corporation), the cured product sample was irradiated for 360 hours under the condition of illuminance of 0.4 W/m$^2$ (340 nm), and a transmittance T2(%) at 450 nm was measured.

A change in transmittance (ΔT %) before and after the light irradiation test was calculated according to the following expression, and the light resistance (ΔT %) was evaluated based on the following standard. In the present invention, "B" or higher is acceptable.

$$\Delta T\% = T1 - T2 \quad \text{(Expression)}$$

—ΔTT % Evaluation—

AAA: ΔT % was less than 4%.

AA: ΔT % was 4% or more and less than 5%.

A: ΔT % was 5% or more and less than 8%.

B: ΔT % was 8% or more and less than 1$^0$%.

C: ΔT % was 10% or more and less than 15%.

D: ΔT % was 15% or more.

[Evaluation 3: Adhesiveness Test]

(1) Production of Cured Product Sample for Adhesiveness Test

10 μL of the curable composition prepared above was placed on a circular flat glass (BK7) having a diameter of 30 mm, the glass plate was sandwiched between glass plates of the same size, and the curable composition was spread.

In an atmosphere with an oxygen concentration of 1% or less, using EXECURE 3000 (product name, manufactured by HOYA CORPORATION) as an UV irradiation device, a cured product sandwiched on a glass plate (cured product sample for adhesiveness test) was obtained by irradiating with ultraviolet rays of 2 J/cm$^2$.

(2) Adhesiveness Test

Each of the 20 cured product samples prepared by the above-described method was heated at 60° C. and 90% RH for 240 hours, the temperature was returned to room temperature (25° C.), and a morphology of the test sample was observed using a digital microscope manufactured by KEYENCE CORPORATION and a laser microscope.

A cured product with shape changes such as cracks and interfacial peeling was regarded as a defective product, and a cured product without the shape changes was regarded as a non-defective product. The number of non-defective products in the 20 cured product samples was applied to the following standard, and the adhesiveness was evaluated. In the present invention, "B" or higher is a preferable level.

—Evaluation Standard—

AA: number of non-defective products was 18 or more.

A: number of non-defective products was 16 or 17.

B: number of non-defective products was 14 or 15.

C: number of non-defective products was 13 or less.

<Optical Characteristics Measurement>

The curable resin composition prepared above was injected into a circular transparent glass mold having a diameter of 20 mm so that a thickness of the cured product was 2 mm, and using an UV irradiation device (EXECURE 3000 (product name), manufactured by HOYA CORPORATION), ultraviolet rays of 15 mW/cm$^2$ was irradiated for 150 seconds in an atmosphere with an oxygen concentration of 1% or less to obtain a cured product sample for optical measurement.

For a "birefringence Δn", using a birefringence evaluation device (WPA-100 (product name), manufactured by Photonic Lattice, Inc.), a birefringence within a circle having a diameter of 10 mm including the center of the cured product sample for optical measurement produced above was measured, and the average value thereof was measured.

For a "refractive index (nd)", "Abbe number (νd)", and "partial dispersion ratio (θg, F)", the cured product sample for optical measurement produced above was processed into a V-shaped block, and a measurement was performed using a Kalnew precision refractometer KPR-2000 (product name, manufactured by Shimadzu Device Corporation). The measurement was performed three times for each sample at 25° C., and an average value was taken as a measurement result.

The "refractive index (nd)" is a refractive index at a wavelength of 587.56 nm. In addition, the "Abbe number (νd)" and the "partial dispersion ratio (θg, F)" are values calculated from the refractive index measurement values at different wavelengths according to the following equations.

$$\nu d = (nd - 1)/(nF - nC)$$

$$\theta g,F = (ng - nF)/(nF - nC)$$

Here, nd represents a refractive index at a wavelength of 587.56 nm, nF represents a refractive index at a wavelength of 486.13 nm, nC represents a refractive index at a wavelength of 656.27 nm, and ng represents a refractive index at a wavelength of 435.83 nm.

In the cured products obtained from the curable compositions Nos. 101 to 112, the birefringence Δn was 0.0003 to 0.0006, the refractive index at a wavelength of 587.56 nm was 1.55 to 1.60, the Abbe number was as low as 21 to 18, the partial dispersion ratio was as high as 0.8 to 0.9, and an anomalous dispersibility of the refractive index required for the chromatic aberration correction lens was satisfied.

<Glass Transition Temperature>

(1) Production of Cured Product Sample for Glass Transition Temperature Measurement The curable composition prepared above was placed on an 8 cm×5 cm hydrophobized glass plate, the glass plate was sandwiched between glass plates of the same size such that a thickness was 150 μm, and the curable composition was spread.

In an atmosphere with an oxygen concentration of 1% or less, using EXECURE 3000 (product name, manufactured by HOYA CORPORATION) as an UV irradiation device, the curable composition was irradiated with ultraviolet rays of 2 J/cm$^2$, and the glass plate was removed to obtain a cured product single film (cured product sample for glass transition temperature measurement).

(2) Dynamic Viscoelasticity Measurement

The above-described cured product sample was cut to 2.2 cm×0.5 cm, and using a dynamic viscoelasticity measuring device (manufactured by UBM Co., Ltd.), a storage elastic modulus (E'), loss elastic modulus (E"), and loss tangent (tan δ) were measured from −50° C. to 150° C. at a frequency of 10 Hz. The temperature of the main dispersion of tan δ was defined as Tg.

TABLE 1-1

| | Curable composition No. | | 101 | 102 | 103 | 104 | 105 | 106 | 107 | 108 |
|---|---|---|---|---|---|---|---|---|---|---|
| Composition | Component (A) | I-5 | 66 | — | — | — | — | — | — | — |
| | | I-6 | — | 73 | — | — | — | — | — | — |
| | | I-9 | — | — | 79 | — | — | — | — | — |
| | | I-7 | — | — | — | 77 | — | — | — | — |
| | | II-1 | — | — | — | — | 76 | — | — | — |
| | | I-11 | — | — | — | — | — | 73 | — | — |
| | | I-12 | — | — | — | — | — | — | 90 | — |
| | | I-13 | — | — | — | — | — | — | — | 71 |
| | Comparative compound | Y-1 | — | — | — | — | — | — | — | — |
| | | Y-2 | — | — | — | — | — | — | — | — |
| | | R-1 | — | — | — | — | — | — | — | — |
| | | R-2 | — | — | — | — | — | — | — | — |
| | Component (B) | 2-Ethylhexyl methacrylate | 34 | 27 | 21 | 23 | 24 | 27 | 10 | 29 |
| | | Decyl methacrylate | — | — | — | — | — | — | — | — |
| | | Dodecyl methacrylate | — | — | — | — | — | — | — | — |
| | Photopolymerization initiator | Irgacure819 | 0.1 | 0.1 | 0.1 | 0.1 | 0.1 | 0.1 | 0.1 | 0.1 |
| | Total | | 100.1 | 100.1 | 100.1 | 100.1 | 100.1 | 100.1 | 100.1 | 100.1 |
| Evaluation | Cured product characteristics | ΔAbs | AA | AA | A | A | B | AA | AA | AA |
| | | ΔT% | AA | AA | A | A | B | AA | AA | AA |
| | | Tg [°C] | 70 | 70 | 50 | 50 | 65 | 55 | 65 | 68 |
| | | Adhesiveness test | AA | AA | A | A | B | AA | AA | AA |

TABLE 1-2

| | Curable composition No. | | 109 | 110 | 111 | 112 | c01 | c02 | c03 | c04 |
|---|---|---|---|---|---|---|---|---|---|---|
| Composition | Component (A) | I-5 | — | — | — | — | — | — | — | — |
| | | I-6 | 73 | 73 | 66 | 60 | — | — | — | — |
| | | I-9 | — | — | — | — | — | — | — | — |
| | | I-7 | — | — | — | — | — | — | — | — |
| | | II-1 | — | — | — | — | — | — | — | — |
| | | I-11 | — | — | — | — | — | — | — | — |
| | | I-12 | — | — | — | — | — | — | — | — |
| | | I-13 | — | — | — | — | — | — | — | — |
| | Comparative compound | Y-1 | — | — | — | — | 57 | — | — | — |
| | | Y-2 | — | — | — | — | — | 63 | — | — |
| | | R-1 | — | — | — | — | — | — | 76 | — |
| | | R-2 | — | — | — | — | — | — | — | 76 |
| | Component (B) | 2-Ethylhexyl methacrylate | — | — | — | — | 43 | 37 | 24 | 24 |
| | | Decyl methacrylate | 27 | — | — | — | — | — | — | — |
| | | Dodecyl methacrylate | — | 27 | 34 | 40 | — | — | — | — |
| | Photopolymerization initiator | Irgacure819 | 0.1 | 0.1 | 0.1 | 0.1 | 0.1 | 0.1 | 0.1 | 0.1 |
| | Total | | 100.1 | 100.1 | 100.1 | 100.1 | 100.1 | 100.1 | 100.1 | 100.1 |
| Evaluation | Cured product characteristics | ΔAbs | AAA | AAA | AAA | AAA | D | C | C | C |
| | | ΔT% | AAA | AAA | AAA | AAA | D | D | D | D |
| | | Tg [° C.] | 68 | 65 | 63 | 60 | 70 | 70 | 70 | 68 |
| | | Adhesiveness test | AA | AA | AA | AA | C | C | C | C |

<Note to Table>
Each component in the tables is as follows. The blending amount ratio of each component is based on mass.
In addition, the component (B) means a (meth)acrylate monomer.
(Component (A): Compound Represented by General Formula (1))
I-5
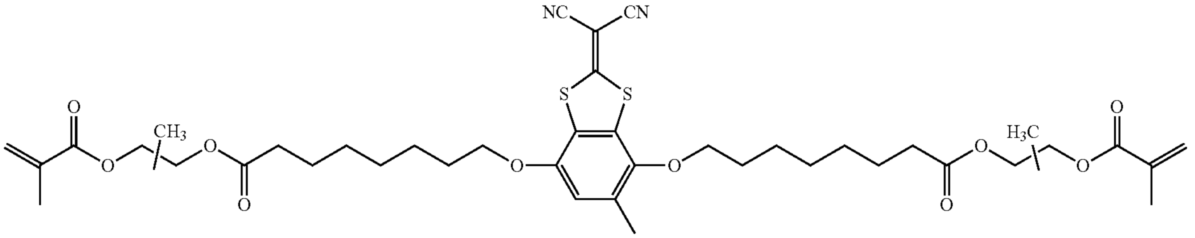
I-6
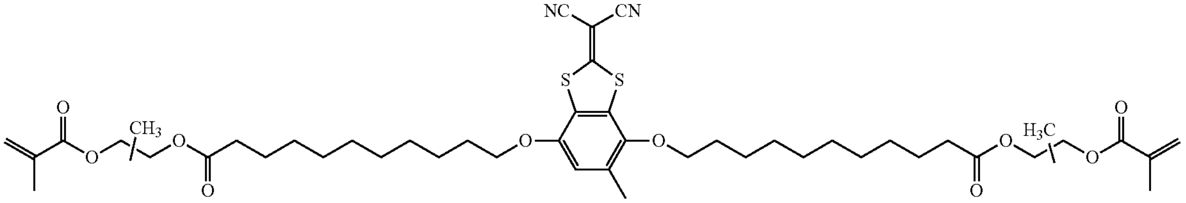
I-9
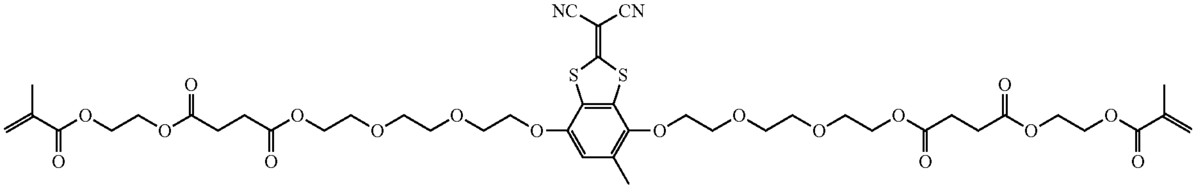
I-7
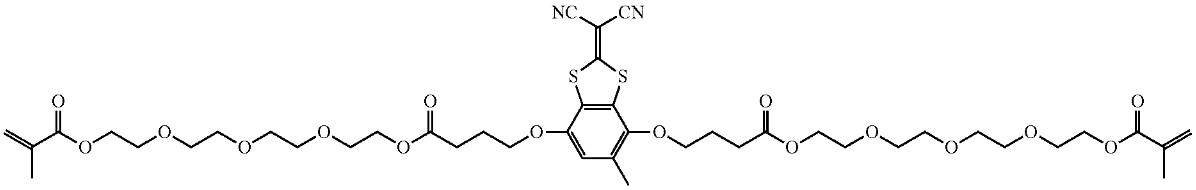
II-1
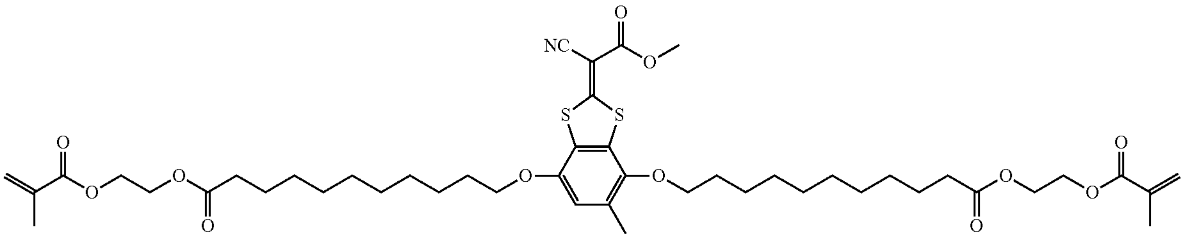
I-11
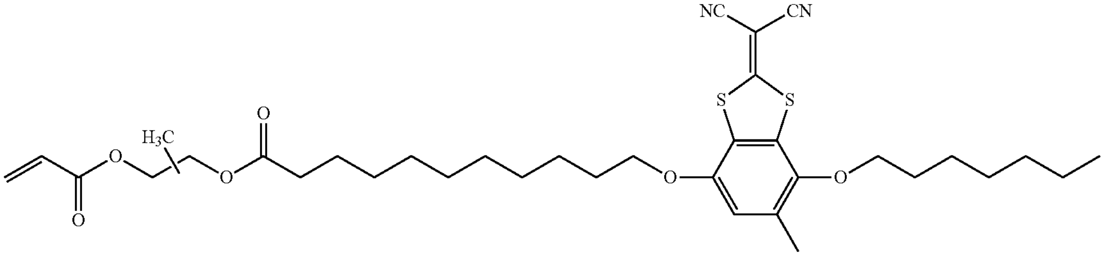

-continued
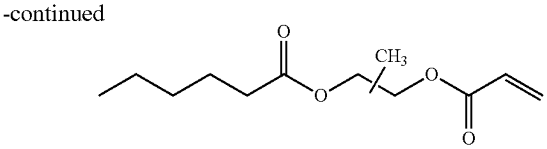
I-12
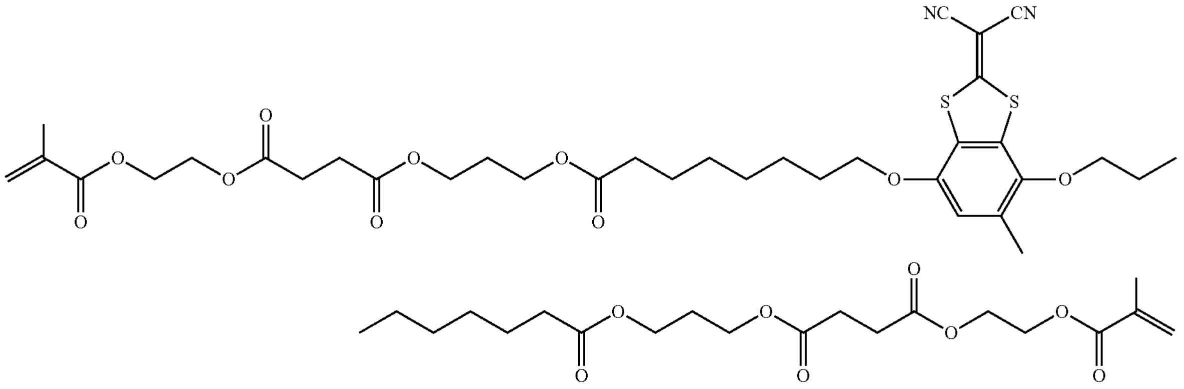
I-13
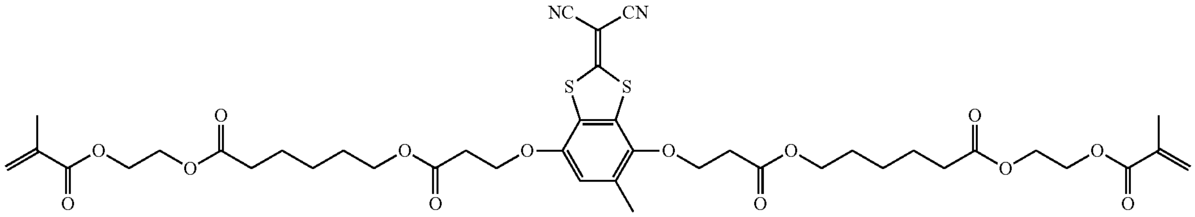
(Comparative Compound)
Y-1
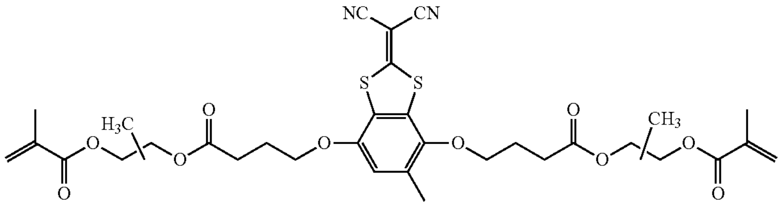
Y-2
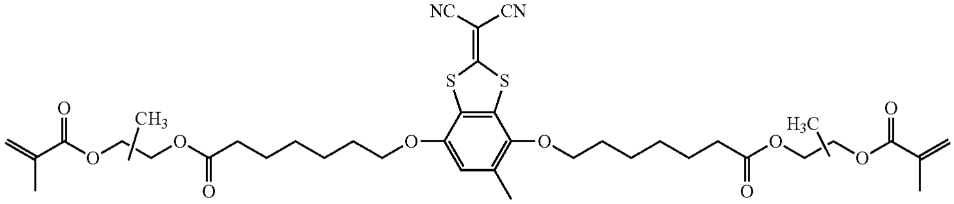
R-1
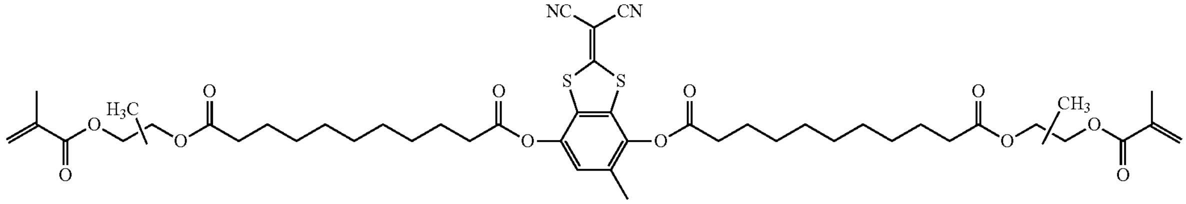

-continued

R-2

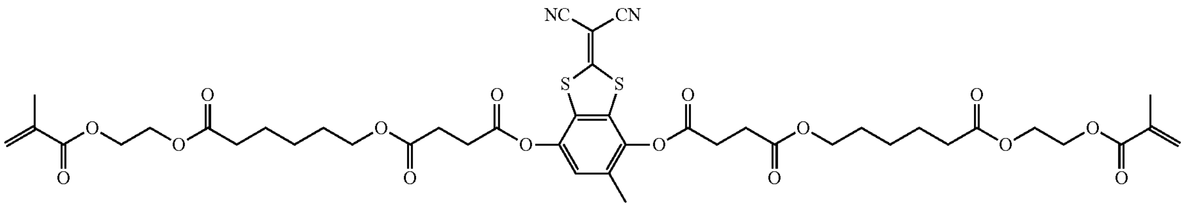

(Photopolymerization Initiator)

Irgacure 819 (product name, manufactured by BASF SE)

From the results shown in Table 1, the following is found.

Both the comparative cured products obtained from the curable composition No. c01 or c02 have a linking group having 7 or 10 atoms as $Sp^a$ and $Sp^b$ in General Formula (1), respectively, and are not the cured products specified in the present in that $Sp^a$ and $Sp^b$ in General Formula (1) do not have a linking group having 11 or more atoms. The comparative cured product obtained from the curable composition No. c01 has ΔAbs of 15% or more and ΔT % of 15% or more before and after the light irradiation test, and the comparative cured product obtained from the curable composition No. c02 has ΔAbs of 10% or more and ΔT % of 15% or more before and after the light irradiation test, and both were inferior in light resistance.

In addition, both the comparative cured products obtained from the curable composition No. c03 or c04 have an ester bond in the bonding portion to Ar in General Formula (1), and are not cured products specified in the present invention in that it is not an ether bond. Both the comparative cured products obtained from the curable composition No. c03 or c04 have ΔAbs of 10% or more and ΔT % of 15% or more before and after the light irradiation test, and both were inferior in light resistance.

On the other hand, all the cured products according to the embodiment of the present invention, which are obtained from the curable compositions Nos. 101 to 112, have low ΔAbs and ΔT % before and after the light irradiation test of the cured product, and it is found that the light resistance is excellent. In addition, it is found that all the cured products according to the embodiment of the present invention, which are obtained from the curable compositions No. 101 to 112, also have excellent adhesiveness.

In addition, from the comparison between the cured product according to the embodiment of the present invention obtained from the curable composition No. 105 and the cured product according to the embodiment of the present invention obtained from the curable composition No. 103, among aromatic ring groups represented by General Formula (2-2), since Ar has a structure in which $A^1$ and $A^2$ are S and X is $>C(CN)_2$, it is found that ΔAbs and ΔT % before and after the light irradiation test can be further reduced, and that the light resistance is more excellent.

Further, from the comparison between the cured products according to the embodiment of the present invention obtained from the curable compositions No. 103 and No. 104 and the cured products according to the embodiment of the present invention obtained from the curable compositions No. 101 and No. 102, since $Sp^a$ and $Sp^b$ have a group selected from esters and alkylenes, it is found that ΔAbs and ΔT % before and after the light irradiation test can be further reduced, and that the light resistance is more excellent.

Example 2: Production of Diffractive Optical Element (1) Preparation of Curable Resin Composition A (ITO Particle-Containing Composition)

0.435 g of the above-described compound (I-6), 0.07 g of the following polymer dispersant (P-1), and 0.138 g of dodecyl methacrylate (DDMA, manufactured by FUJIFILM Wako Pure Chemical Corporation) were added and dissolved to 7.10 g of a toluene dispersion liquid of ITO-1 prepared below. Toluene was distilled off by suction under reduced pressure while heating in a water bath at approximately 70° C. After the distillation, 0.002 g of IRGACURE 819 (product name, manufactured by BASF) was added to the obtained mixture and dissolved, thereby preparing a curable resin composition A.

TABLE 2

| | | Curable resin composition A |
|---|---|---|
| ITO particles: ITO-1 | Blending amount (part by mass) | 35.5 |
| Polymer dispersant (P-1) | Acid value | 29 |
| | Mw | 7000 |
| | Blending amount (part by mass) | 7 |
| Blending amount of polymer dispersant with respect to 100 parts by mass of ITO particles (part by mass) | | 19.7 |
| Compound represented by General Formula (1): I-6 | Blending amount (part by mass) | 43.5 |
| (Meth)acrylate monomer: dodecyl methacrylate | Blending amount (part by mass) | 13.8 |
| Photopolymerization initiator: IRGACURE 819 | Blending amount (part by mass) | 0.2 |

<Note to Table>

Each component in the tables is as follows. The blending amount ratio of each component is based on mass.

The blending amount of ITO particles means the amount of solid content in the ITO particle dispersion liquid.

(ITO Particles (ITO-1))

75 ml of oleic acid (manufactured by Sigma-Aldrich, Inc., technical grade, 90%), 10.060 g (34.5 mmol) of indium acetate (manufactured by Alfa Aesar, 99.99%), and 1.079 g (3.0 mmol) of tin (IV) acetate (manufactured by Alfa Aesar) were added in a flask. The mixture in the flask was heated at 160° C. for 1 hour under an environment of nitrogen flow to obtain a yellow transparent precursor solution.

Subsequently, 90 ml of oleyl alcohol (manufactured by FUJIFILM Wako Pure Chemical Corporation, standard content: 65% or more) was charged into another flask, and heated at 290° C. in a nitrogen flow. Using a syringe pump, the precursor solution was added dropwise to the heated oleyl alcohol at a rate of 1.75 mL/min. After the completion of the dropwise addition of the precursor solution, the obtained reaction solution was retained at 290° C. for 120 minutes, and thereafter, the heating was stopped and the reaction solution was cooled to room temperature.

After adding ethanol to the obtained reaction solution, centrifugation was performed to precipitate particles. The removal of the supernatant and the redispersion of the particles in toluene were repeated 3 times to obtain a toluene dispersion liquid of ITO particles (ITO-1) coordinated with oleic acid. The concentration of solid content (ITO particles+surface treatment component) in the dispersion liquid was 5% by mass, and the proportion of the surface modification component to the solid content was 5% by mass.

In a case where the above-descried ITO particles (ITO-1) were observed by TEM (product name: JFM-ARM300F2 GRAND, manufactured by JEOL Ltd.), the average primary particle diameter was 28.5 nm. Specifically, the measurement was performed based on the above-described method for measuring the particle diameter of ITO particles.

(Polymer Dispersant (P-1))

10.8 g of benzyl methacrylate (manufactured by FUJIFILM Wako Pure Chemical Corporation), 9.2 g of t-butyl methacrylate (manufactured by FUJIFILM Wako Pure Chemical Corporation), and 0.95 g of mercapto succinic acid (manufactured by FUJIFILM Wako Pure Chemical Corporation) were dissolved in 23 mL of methyl ethyl ketone and heated to 70° C. under a nitrogen stream. The solution was added dropwise over 30 minutes to a solution in which 0.20 g of a polymerization initiator (manufactured by FUJIFILM Wako Pure Chemical Corporation, product name: V-65) was dissolved in 9 mL of methyl ethyl ketone. After the completion of the dropwise addition, the reaction was further performed at 70° C. for 4.5 hours. After allowing to cool, the reaction solution was added dropwise to a cooled mixed solution of 200 mL of water and 600 mL of methanol, and the precipitated powdery substance was collected by filtration and dried to obtain 17 g of a polymer dispersant (P-1) having a carboxy group as an acidic group at one terminal. The polymer dispersant (P-1) was substantially composed of a polymer having a carboxy group at one terminal.

The weight-average molecular weight (Mw) of the obtained polymer was 5900 in terms of standard polystyrene according to a gel permeation chromatography (GPC) method measured by the following measurement conditions, and the dispersity (Mw/Mn, Mn: number-average molecular weight) was 1.70. In addition, in a case where the number in mg of potassium hydroxide required to neutralize free fatty acid present in 1 g of the obtained polymer was measured to obtain an acid value, the acid value was 20 mgKOH/g.

(Measurement Condition)

Measuring instrument: HLC-8320GPC (product name, manufactured by Tosoh Corporation)

Column: connection of TOSOH TSKgel Super HZM-H (product name, manufactured by Tosoh Corporation), TOSOH TSKgel Super HZ4000 (product name, manufactured by Tosoh Corporation), and TOSOH TSKgel Super HZ2000 (product name, manufactured by Tosoh Corporation)

Carrier: THF

Measurement temperature: 40° C.

Carrier flow rate: 0.35 ml/min

Sample concentration: 0.1%

Detector refractive index (RI) detector

P-1

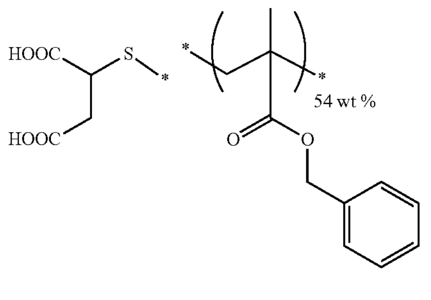

-continued

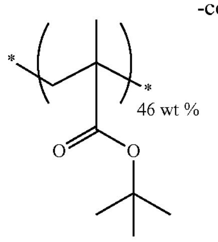

(2) Preparation of Curable Resin Composition B 45.6 g of FA-512AS (product name, manufactured by Hitachi Chemical Co., Ltd.) and 2.4 g of KAYARAD HX-620 (product name, manufactured by Nippon Kayaku Co., Ltd.) were added to 150 g of a zirconium oxide dispersion liquid (product name: SZR-K, manufactured by SAKAI CHEMICAL INDUSTRY CO., LTD.) and stirred until uniform. Methanol and methyl ethyl ketone (MEK) were distilled off by suction under reduced pressure while heating in a water bath at approximately 70° C. After the distillation, 1.0 g of IRGACURE 651 (product name, manufactured by BASF) was added to the obtained mixture and dissolved, thereby preparing a curable resin composition B.

(3) Production of Multilayer Diffractive Optical Element

The curable resin composition A was supplied to a mold processed into the shape of the diffraction grating of FIG. 1, a flat glass (BK7 (borosilicate crown glass)) was placed in contact with the supplied curable resin composition A, and the resin was pressed to stretch the resin to the outermost circumference of the mold. In an atmosphere with an oxygen concentration of 1% or less, using EXECURE 3000 (product name, manufactured by HOYA CORPORATION) as an UV irradiation device, a cured product was obtained by irradiating with ultraviolet rays of 1.0 J/cm$^2$. A diffractive optical element was produced by releasing the cured product integrated with the flat glass from the mold.

Next, the curable resin composition B was supplied to the surface side of the cured product of the diffractive optical element, a flat glass (BK7 (borosilicate crown glass)) was placed in contact with the supplied curable resin composition B, and the resin was pressed and stretched to a desired range. In an atmosphere with an oxygen concentration of 1% or less, using EXECURE 3000 (product name, manufactured by HOYA CORPORATION) as an UV irradiation device, the curable resin composition B was cured by irradiating with ultraviolet rays of 2.0 J/cm$^2$ to produce a multilayer diffractive optical element.

Figure 2:
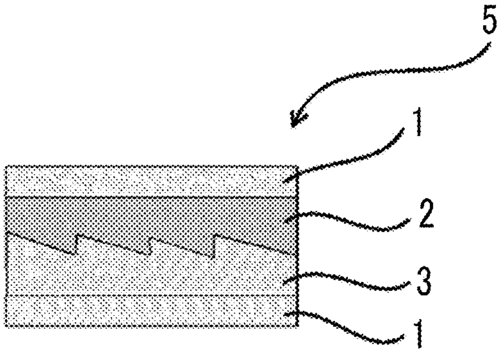
FIG. 2 is a schematic explanatory view of a multilayer diffractive optical element produced in Example 2.

As shown in FIG. 2, a multilayer diffractive optical element 5 produced has a configuration in which a cured product 2 of the curable resin composition A and a cured product 3 of the curable resin composition B are sandwiched between two flat glass plates 1. The multilayer diffractive optical element has a disc-shaped structure in which a diameter is 20 mm, a thickness of the cured product of the curable resin composition A is 5 μm (not including the diffraction grating portion), a thickness of the cured product of the curable resin composition B is 150 μm (including the diffraction grating portion), a lattice thickness of the diffraction grating is 10.2 μm, and the total thickness is 165.2 μm.

[Evaluation 4: Evaluation of Diffraction Efficiency]

(1) Measurement of Refractive Index and Abbe Number

With regard to each of the cured product (optical material 1) of the curable resin composition A and the cured product (optical material 2) of the curable resin composition B produced as described below, using a multi-wavelength Abbe refractometer (product name: DR-M2, manufactured by ATAGO CO., LTD.), refractive indices nd, nF, and nC and an Abbe number νd at the d line (wavelength: 587 nm), the F line (486 nm), and the C line (656 nm) were measured under the condition of 25° C. The results are shown in Table 3.

<Production of Cured Product of Curable Resin Composition A>

10 μL of the curable composition A prepared above was placed on an SUS plate, and the curable resin composition A was sandwiched using borosilicate glass in which a surface is hydrophobized with dichlorodimethylsilane, and a thickness of the composition was adjusted to 10 μm. In an atmosphere with an oxygen concentration of 1% or less, using EXECURE 3000 (product name, manufactured by HOYA CORPORATION) as an UV irradiation device, the curable composition A was irradiated with ultraviolet rays of 2 J/cm$^2$, and the glass plate was peeled off to produce a cured product. The refractive index was measured for the cured product on the SUS plate.

<Production of Cured Product of Curable Resin Composition B>

The curable resin composition B prepared above was sandwiched between two borosilicate glasses in which a surface is hydrophobized with dichlorodimethylsilane, and a thickness was adjusted to 150 μm. In an atmosphere with an oxygen concentration of 1% or less, using EXECURE 3000 (product name, manufactured by HOYA CORPORATION) as an UV irradiation device, the curable composition A was irradiated with ultraviolet rays of 2 J/cm$^2$, and the two glass plates were peeled off to produce a cured product.

TABLE 3

| | Optical material 1 | Optical material 2 |
|---|---|---|
| nd | 1.5448 | 1.6035 |
| nF | 1.5658 | 1.6127 |
| nC | 1.5353 | 1.5993 |
| νd | 17.9 | 45.0 |

(2) Calculation of Diffraction Efficiency with Primary Light

For a diffraction efficiency of the multilayer diffractive optical element produced above with the primary light, based on the expressions 23 and 24 of JP2008-241734A, a diffraction efficiency with the primary light at each wavelength was calculated using the values of the refractive index and the lattice thickness measured above. The diffraction efficiency with the primary light on the d line, F line, and C line were 99.9%, 99.9%, and 100%, respectively. It can be said that the diffraction efficiency is good in a case of being 95% or more. As described above, the multilayer diffractive optical element obtained using the curable resin composition according to the embodiment of the present invention is also excellent in diffraction efficiency.

The present invention has been described with the embodiments thereof, any details of the description of the present invention are not limited unless described otherwise, and it is obvious that the present invention is widely construed without departing from the gist and scope of the present invention described in the accompanying claims.

1: flat glass

2: cured product of curable resin composition A

3: cured product of curable resin composition B

5: multilayer diffractive optical element

What is claimed is:

1. A curable resin composition comprising:

a compound represented by General Formula (1);

a polymer having a constitutional unit represented by General Formula (P) and having an acidic group at one terminal, and indium tin oxide particles, $$Pol^1\text{-}Sp^a\text{-}L^1\text{-}Ar\text{-}L^2\text{-}Sp^b\text{-}Pol^2 \qquad \text{Genera Formula (1)}$$

in the formula, Ar represents an aromatic ring group represented by any of General Formula (2-1), (2-2), (2-3), or (2-4), $L^1$ and $L^2$ represent —O—, $Sp^a$ represents a linking group having a shortest atom number of 11 or more and linking $Pol^1$ and $L^1$, and $Sp^b$ represents a linking group having a shortest atom number of 11 or more and linking $Pol^2$ and $L^2$, $Pol^1$ and $Pol^2$ represent a polymerizable group, and a linking portion of $Sp^a$ to $L^1$ and a linking portion of $Sp^b$ to $L^2$ are both —$CH_2$—, and a linking portion of $Sp^a$ to $Pol^1$ and a linking portion of $Sp^b$ to $Pol^2$ are both a carbon atom, and both $Sp^a$ and $Sp^b$ have no ring structure, General Formula (2-1)

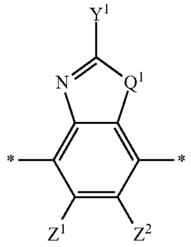

General Formula (2-2)

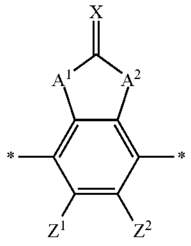

General Formula (2-3)

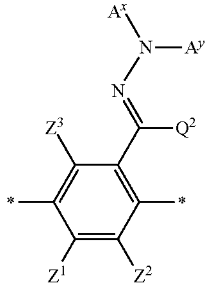

-continued

General Formula (2-4)

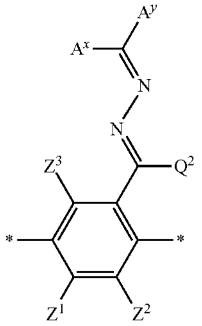

in the formula, $Q^1$ represents —S—, —O—, or >$NR^{11}$, and $R^{11}$ represents a hydrogen atom or an alkyl group having 1 to 6 carbon atoms, $Y^1$ represents an alkyl group having 1 to 6 carbon atoms, an aromatic hydrocarbon group having 6 to 12 carbon atoms, or an aromatic heterocyclic group having 3 to 12 carbon atoms, $Z^1$, $Z^2$, and $Z^3$ each independently represent a hydrogen atom, an aliphatic hydrocarbon group having 1 to 20 carbon atoms, an alkoxy group having 1 to 20 carbon atoms, an alicyclic hydrocarbon group having 3 to 20 carbon atoms, an aromatic hydrocarbon group having 6 to 20 carbon atoms, a halogen atom, a cyano group, a nitro group, —$NR^{12}R^{13}$, or —$SR^{12}$, $Z^1$ and $Z^2$ may be bonded to each other to form an aromatic hydrocarbon ring or an aromatic heterocyclic ring, $R^{12}$ and $R^{13}$ each independently represent a hydrogen atom or an alkyl group having 1 to 6 carbon atoms, $A^1$ and $A^2$ each independently represent a group selected from —O—, >$NR^{21}$, —S—, and >C(═O), and $R^{21}$ represents a hydrogen atom or a substituent, X represents ═O, ═S, a carbon atom to which a hydrogen atom or a substituent is bonded, or a nitrogen atom to which a hydrogen atom or a substituent is bonded, $A^x$ represents an organic group having 1 to 30 carbon atoms, which has at least one aromatic ring selected from an aromatic hydrocarbon ring or an aromatic heterocyclic ring, $A^y$ represents a hydrogen atom, an alkyl group having 1 to 6 carbon atoms, or an organic group having 1 to 30 carbon atoms, which has at least one aromatic ring selected from an aromatic hydrocarbon ring or an aromatic heterocyclic ring, $A^x$ and $A^y$ may be bonded to each other to form a ring, $Q^2$ represents a hydrogen atom or an alkyl group having 1 to 6 carbon atoms, and

* represents a bonding position with $L^1$ or $L^2$,

General Formula (P)

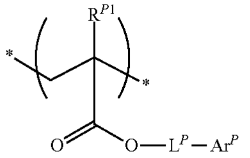

in the formula, $L^P$ represents a single bond or a divalent linking group, $Ar^P$ represents a phenyl group, $R^{P1}$ represents a hydrogen atom or a methyl group, $Ar^P$ does not include the acidic group, and * represents a bonding portion.

2. The curable resin composition according to claim 1, further comprising:

a monofunctional or bi- or higher functional (meth) acrylate monomer compound.

3. A cured product of the curable resin composition according to claim 1.

4. A diffractive optical element comprising:

the cured product according to claim 3, wherein the diffractive optical element includes a surface having a diffraction grating shape and formed of the cured product.

5. A multilayer diffractive optical element comprising:

a first diffractive optical element; and a second diffractive optical element, wherein the first diffractive optical element is the diffractive optical element according to claim 4, and the surface of the first diffractive optical element, which has a diffraction grating shape, and a surface of the second diffractive optical element, which has a diffraction grating shape, face each other.

* * * * *